US009218468B1

(12) United States Patent
Rappaport

(10) Patent No.: US 9,218,468 B1
(45) Date of Patent: Dec. 22, 2015

(54) SYSTEMS AND METHODS FOR VERIFYING ATTRIBUTES OF USERS OF ONLINE SYSTEMS

(71) Applicant: Matthew B. Rappaport, Austin, TX (US)

(72) Inventor: Matthew B. Rappaport, Austin, TX (US)

( * ) Notice: Subject to any disclaimer, the term of this patent is extended or adjusted under 35 U.S.C. 154(b) by 82 days.

(21) Appl. No.: 14/184,254

(22) Filed: Feb. 19, 2014

Related U.S. Application Data

(60) Provisional application No. 61/916,777, filed on Dec. 16, 2013.

(51) Int. Cl.
G06F 15/16 (2006.01)
G06F 21/30 (2013.01)
H04L 12/58 (2006.01)

(52) U.S. Cl.
CPC .............. *G06F 21/30* (2013.01); *H04L 51/32* (2013.01)

(58) Field of Classification Search
CPC ....................................................... G06F 3/00
See application file for complete search history.

(56) References Cited

U.S. PATENT DOCUMENTS 7,246,067 B2    7/2007  Austin et al.
8,010,460 B2 *  8/2011  Work et al. ................... 705/319
8,485,896 B2    7/2013  Mathews et al.
8,490,004 B2 *  7/2013  Shuster ......................... 715/760
2006/0042483 A1 *  3/2006  Work et al. ..................... 101/91
2006/0136419 A1 *  6/2006  Brydon et al. ..................... 707/9
2009/0265639 A1 * 10/2009  Shuster ......................... 715/747
2012/0036127 A1 *  2/2012  Work et al. .................... 707/732
2013/0036459 A1    2/2013  Liberman et al.
2013/0091540 A1 *  4/2013  Chen et al. ......................... 726/1
2014/0012601 A1    1/2014  Gartner
2014/0025741 A1 *  1/2014  Shuster ......................... 709/204

FOREIGN PATENT DOCUMENTS

EP          2568405 A1    3/2013

* cited by examiner

*Primary Examiner* — Jerry Dennison
(74) *Attorney, Agent, or Firm* — Whitham Curtis Christofferson & Cook, PC

(57) ABSTRACT

For sharing of information in a virtual or online environment, methods and systems are provided which enable verifying attributes of an individual. An individual registered for participation in a virtual or online environment may provide evidence of the attributes from a verification source that exists outside the virtual or online environment. An administrator associated with the virtual or online environment verifies the attributes by receipt of the evidence. Alternatively, the attribute for the individual may be verified after receipt of one or more signals indicating individuals registered for participation in the virtual or online environment have corroborated the attributes. A verification indication for an attribute may be shared with other individuals in the virtual or online environment.

30 Claims, 28 Drawing Sheets

SYSTEMS AND METHODS FOR VERIFYING ATTRIBUTES OF USERS OF ONLINE SYSTEMS

CROSS-REFERENCE TO RELATED APPLICATIONS

This application claims the priority of U.S. Provisional Patent Application No. 61/916,777 filed Dec. 16, 2013, which is incorporated by reference herein in its entirety.

DESCRIPTION

1. Field of the Invention

The invention generally relates to systems and methods for verifying attributes of users of online systems.

2. Background

"On the Internet, nobody knows you're a dog" is an adage that appeared as the caption of a cartoon published by The New Yorker on Jul. 5, 1993. The now famous cartoon features two dogs: one using a computer, speaking to a second dog sitting next to him. The adage speaks to the ability of internet users to communicate with one another in relative anonymity, with their true identities never revealed to those they communicate with. Despite the dated nature of this reference, internet users today are still free to self-represent, usually without consequence when their self-representations differ from reality.

Generally, on the internet, it is easy to lie about one's self or to present an exaggerated, misleading, or false impression of who you are. On the internet, information as straightforward as one's name or age may be falsified, usually without detection or consequence. However, with the growing popularity of online video games, online dating websites, online social networks, and peer-to-peer transaction websites, internet users increasingly seek to know whether the people they interact with on the internet are who they claim to be. In general, one solution to this problem is for internet users to share personal information with one another in order to prove that they are indeed who they purport to be. One drawback with such an approach is that the personal information provided may be abused through identity theft or otherwise.

SUMMARY

Generally, a method which enables the sharing of information in a virtual or online environment may be described according to steps of registering, verifying, and sharing. Individuals may register for participation in a virtual or online environment operated on one or more computers. The virtual or online environment permits interactions between two or more of the individuals within the virtual or online environment. Verification generally involves verifying one or more attributes specific for a particular individual. This verification may be accomplished by receiving evidence of one or more attributes of the particular individual. Particularly, the received evidence may be received by an administrator associated with the virtual or online environment. The evidence of the one or more attributes may originate from a verification source that exists outside the virtual or online environment. The administrator associated with the virtual or online environment may verify the one or more attributes of the first individual by receipt of the evidence. Alternatively, the verification may by accomplished by providing access to the one or more attributes of the particular individual to other individuals. After receipt of one or more signals indicating one or more of such other individuals has corroborated the one or more attributes of the particular individual are as presented, the one or more attributes of the first individual may be verified. One of such other individuals is an individual different from the first individual.

Using one or more computers, a verification indication for at least one attribute of one or more attributes of a particular individual may be shared with one or more other individuals registered with the virtual or online environment. The verification indication may be provided at interfaces operated by one or more of the other individuals.

Verification sources which generally exist outside a virtual or online environment are entities which are not directly associated with or beholden to an owner or provider of the virtual or online environment. It should be understood that authoritative entities for a virtual or online environment, for example the host of an online video game, are not characterized as sources outside the virtual or online environment. One example verification source may be a governmental entity. Other examples of verification sources include databases, websites, publications, public record repositories, individuals, and many others. Furthermore, the verification indication may include an indication of a confidence level (e.g. confidence score or percentage) for the verification indication. The evidence of the one or more attributes may comprise one or more images of one or more documents (e.g. scanned photographs, videos, etc.).

Fees may be collected at one or more steps, such as at a step of registering individuals with the virtual or online environment or at a verifying step or sharing step. Fees may also be collected as one or more steps which proceed, follow, or occur concomitantly with other steps. When attributes or verification information are shared, fees may be collected from one or more individuals that are different from the particular individual to which the attributes, verification, or attribute values pertain. One or more attributes verified and shared with others may be physical attributes of the particular individual. Physical attributes may include but are not limited to age, gender, height, weight, hair color, and eye color. Alternatively, one or more attributes verified and shared may be non-physical attributes of the particular. Non-physical attributes may include but are not limited to geographic location, income, occupation, personal property ownership, marital status, membership in a club or organization, and affiliation with an academic institution, business, or union.

In some embodiments the virtual or online environments (which may generally be referred to simply as "online systems") may be games such as video games. In some embodiments virtual or online environments may be online social networks, a particular example being a dating site. The virtual or online environment may also take additional or alternative forms. As disclosed herein, the attributes of the users of the online systems subject to verification may vary greatly, as may the means for verifying the user's attributes.

Interfaces which allow for sharing of information (e.g. an attribute, attribute value, and/or verification indication) and/or interaction with the virtual or online environment may be any one or more a wide variety of forms. Examples include but are not limited to output devices of computers, including displays or screens, speakers, motion devices, and other output or I/O devices. Computers themselves may be regarded as interfaces. Motion devices may include motorized devices such as vibrators which can share information in a tactile form. Generally, an interface may allow the transfer of information between a user of an online system and the online system in one or more of visual, auditory, and tactile forms. Providing, serving, conveying, transferring, or otherwise communicating information with one or more interfaces to one or more individuals is sharing of that information with that one or more individuals.

DETAILED DESCRIPTION

Figure 1:
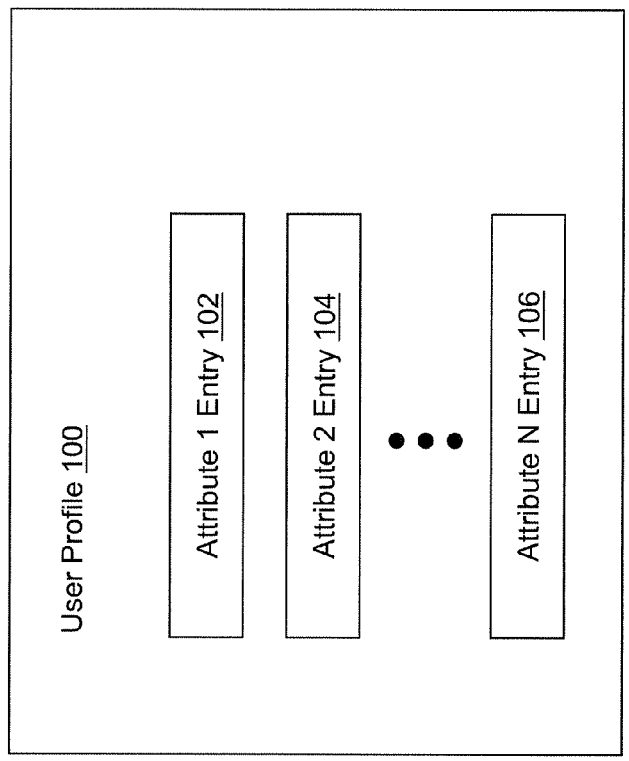
FIG. 1 is a block diagram depicting a system for use in an embodiment of the invention employing a user profile.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Brief Introduction to Computing Terminology

In the following detailed description, numerous specific details are set forth to provide a thorough understanding of claimed subject matter. However, it will be understood by those skilled in the art that such specific details are generally provided by way of example and claimed subject matter may not require all such specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

It has proven convenient at times, principally for reasons of common usage, to refer to signals, inputs, outputs, and the like as originating from certain source entities. It should be understood that through this usage a signal, input, output or the like originating from an entity may pass through, be amplified by, be repeated by, be promulgated by, be diverted by, or otherwise be processed by one or more intermediary device or entity, yet it will still be referred to as originating from that source entity.

Introduction to Technologies for Enabling Verification of Attributes of Users of Online Systems 1. Video Games Many different types of video games exist for the purpose of providing video game players with entertainment and enjoyment. Many of these games provide game-play that enables a player to control a game character or other movable element (referred to herein as a "character") in the video game environment in a manner that enables the player to perform various actions within the game. In some video games, a player uses one or more input device to control actions and movement of one or more character in a video game environment that is a virtual game world.

A video game is an electronic game that involves human interaction with a user interface to generate, at a minimum, visual output on a screen or other visual output device. Many video games provide players with output in the form of screen displays and sounds from speakers, though haptic feedback (e.g., vibrational feedback) and other outputs may also be present. Video games are played on video game computers, which may come in a variety of forms, as discussed further herein. Computer games are types of video games that are typically played on general purpose computers. Video game players are sometimes referred to as video game users. A user of a video game is a video game player.

Input devices for video games may be connected to a video game computer by means of a wire or cord, or through a wireless connection. In some instances the input devices for a video game may be removable, while in other instances the input devices for a video game may be permanently affixed to the video game computer. The range of input devices for video games is wide. Such devices are sometimes known as game controllers, and can include keyboards, mice, buttons, joysticks, pedals, touch pads, motion sensors, accelerometers, gyroscopes, microphones, balance boards, track balls, analog sticks, directional pads, yokes, throttle quadrants, game pads, steering wheels, light guns, dance pads, etc. Some video game consoles, which are a type of video game computer, have special purpose game controllers for use with that particular video game console.

While video games vary widely in nature, one aspect of traditional video game play is the ability of game players to save the state of their game on a memory card, hard drive, or other form of computer memory. This memory may be physically located on a video game computer, located on removable electronic storage media, located on a game server, or otherwise. Specifically, in certain games, players may save their character (complete with that character's characteristics); save the objects, skills, abilities, weapons, titles, attributes, rewards, and awards they have acquired; save the location, level, or stage that they have achieved; and/or save the total points, health, strength, virtual currency, ranking etc. that one has acquired during the course of a game or set of successive game plays. Other information indicating a game state may also be saved. Once a game state is saved to memory, traditionally the player may access the saved game state to continue to play the game from the saved game state.

In many video games the game-play takes place in a video game environment that is a virtual game world or some other 2-D or 3-D computer-generated playing space, wherein a player controls one or more player characters. The video game may display a representation of the player character and/or the virtual game world. The player provides inputs to the video game computer using one or more input devices, where those inputs are processed by the video game computer (and/or game server) and video game software to determine a player character's actions within the video game. The video game and video game computer (and/or game server) determine the outcomes of events according to the video game software and player inputs and presents the player with a game display, sounds, and other outputs illuminating the game state. In some video games, there may be multiple players, wherein each player may control one or more player characters.

In many video games, there are various types of in-game awards and rewards that a player character can obtain. For example, a player character may acquire points, health, strength, virtual currency, experience points, characters, attributes, skills, abilities, weapons, or other in-game items of value. In some games, the goal of the game may be to acquire in-game rewards. For example, a player may strive to achieve a high score by accumulating points that are granted for performing in-game tasks or overcoming in-game obstacles. In some games the goal of the game may be to accomplish certain missions or defeat certain foes. Some games have no well-defined goal.

2. Online and Offline Video Games

Some video games are offline video games where the use of computer networking is not engaged (e.g., the game does not access the Internet or other networks). A business aspect of offline video games is that game publishers usually generate revenue through the sales of copies of the video game on the wholesale market. Wholesalers typically sell the copies of the game to distributors and retailers who in turn sell the copies of the game to the end consumer. The video games must be manufactured onto cartridges, CDs or DVDs and packaged and physically distributed by distributors and retailers. The physical distribution requirements of an offline video game limits game production and development to an approach whereby all aspects of the game, including characters, levels, other components, and "bug" fixes must be introduced according to the overall release schedule for the video game.

Some video games are online video games that make use of computer networking (e.g., the game accesses the Internet or other networks). With the use of the Internet and video games that make use of the computer networking, video game players may play with or against one another without being bounded by the physical constraints of the players' respective locations. For example, video game players playing on different video game computers that each have access to the Internet may play against each other or with each other in a wide variety of video games, should both players have the appropriate video game and should both players' video game computers be connected through the Internet. Players in this scenario may be located in different physical locations. Though online video games offer the above described benefits for multiple players, single-player online video games are also common.

One compelling aspect of online video games is that the social, cultural, and economic interactions that typically do not occur in the context of a traditional offline game may occur within the game-play of an online video game itself. As a result, the social, cultural, and economic interactions of an online video game can actually become part of the overall gaming experience. Specifically the game components, levels, achievements, skills etc. of a player may be known to others. Interactions between players in the form of discussions, trading, selling, advertising, and purchasing of items and a show of a player's character's attributes may be part of the experience of playing the game itself. Moreover, communication between players and the element of community has become an aspect of some online video games.

With online video games, game publishers may forego the manufacturing and distribution costs of releasing a physical copy of a game (e.g., on cartridge, CD, or DVD). Using the Internet or other networks as a distribution mechanism, game publishers may sell and distribute their games to consumers directly (e.g., by allowing a video game to be downloaded from a game publisher's server to a player's video game computer). Moreover, the flexibility of online distribution allows game publishers to release games in a more granular fashion, for example through staging their overall release schedules into several mini releases and/or more finely pricing game characters, levels, actions and components into individual product offerings and/or groupings.

3. Video Game Computers and Game Servers

Video games can be played on a variety of computers, including general purpose computers (e.g., personal computers, tablets, etc.). Video games can also be played on special purpose computers such as video game consoles. Examples of video game consoles include PSP, PlayStation 3, Playstation 4, Xbox 360, Xbox One, Nintendo DS, Wii U, Wii, and many others. Video games can also be played on computers that are mobile devices or smartphones, for example, those that run operating systems such as Android, iOS and Windows Phone. Video games may be played such that some or all of the software responsible for running the video game is located a computer other than a player's video game computer. For example, cloud gaming, also known as gaming on demand, is a type of gaming that allows on-demand streaming of video games onto a player's video game computer, through the use of a thin client, in which the actual game is stored on the game operator's or game company's server and is sent directly to players' video game computers accessing the server. For the purpose of this application, the computer(s) that a player interacts with to play a video game will be referred to as that player's "video game computer." This nomenclature does not necessarily connote ownership of the physical hardware.

Video games may be played in an individual manner, such that a game player may immerse himself interactively against characters, scenarios, and/or challenges presented by the game itself. In other video games, interactive play with real human opponents and real human teammates may occur. Interactive game play with multiple real humans may occur through the use of a single video game computer, with the players playing together in physical proximity, such that they can all access the same video game computer and any accessories needed to provide input to the video game. Interactive game play with multiple real humans may also occur through the use of multiple video game computers, where video game computers may be connected through computer networking. In some cases, video game computers are connected through network topologies (e.g. point-to-point, bus, star, ring/circular, mesh, tree, dais chain, hybrid, etc.). Video game computers may also communicate with one or more game servers through networking, again with a variety of network topologies applied to the arrangement of computers within the network. The above described networks may be set up according to peer-to-peer or client-server models.

Game servers are computers that may serve as the authoritative source of the game state in an online video game. As such, game servers are sometimes called hosts. The game server transmits sufficient data about the game's internal state to allow its connected clients (e.g., players' video game computers) to maintain their own accurate representation of the game state, for display to players (e.g., through the display of the game world). Game servers also receive and process players' input, updating the data about the game state on the game server(s). One or more game server may be used in the operation of an online video game. Not all video games make use of game servers, and even those that do need not make use of a game server at all times.

Game servers are not used in connection will all video games. In some video games, whether they are online video games or offline video games, one or more video game computer provides the game state, not a game server. Such games are well known. For completeness, it should be noted that it is possible for a player's video game computer to also serve as a game server. However, in practice, game servers are almost always computers other than a player's video game computer.

Online video games that are accessible to multiple players via one or more game server are well known. This is a not uncommon use of game servers. For example, many thousands of players across the globe access video games known as massive multiplayer online games (MMOGs). Players of MMOGs usually access such games repeatedly (for durations that typically range from a few minutes to several days) over a given period of time, which may be days, weeks, months or even years. The games are often constructed such that players pay a periodic subscription price (e.g., $10 every month) rather than, or in addition to, paying a one time purchase price for the game. Online games may also collect revenues through advertisements placed in the game and transaction fees for transactions that take place during games. Often, though not necessarily, online games (and MMOGs in particular) have no ultimate "winner" or "winning goal," but instead attempt to create a playing experience and a player community that game players find enjoyable. Some MMOGs are massive multiplayer online roleplaying games, (MMORPGs), wherein players control a character representing the player (sometimes known as an avatar) within a game world, exploring the landscape, fighting various foes, completing quests or missions, and interacting with non-player characters or other human players. World of Warcraft is an example of a popular MMORPG.

Some video games present a video game environment that is a 3-D or 2-D virtual game environment that simulates a portion of the real world. For example, the Madden NFL series of video games produced by EA Sports has gameplay that takes place in a 3-D rendering of NFL football stadiums that exist in the real world. Conversely other video games offer virtual game environments that are 2-D or 3-D virtual game environments that are not meant to simulate the real world. An example of this is the video game environment found in the video game Second Life.

A role-playing video game is a video game in which a player assumes the role of a character where the character moves and performs tasks within a video game environment. The video game environment in a role-playing video game is commonly a fictional setting. Moreover, the character the player controls is sometimes a fictional character of the player's own creation or subject to the player's customization. Within the game, players may take responsibility for performing certain tasks within a gameplay narrative using a character. Gameplay commonly includes structured decision-making and character development. Some role-playing video games have complex storylines, where the character travels to different locations in the virtual game environment. Common tasks in some role-playing video games include defeating foes, acquiring items within gameplay, and communicating with other users who can be either friends or adversaries. In some role-playing video games a player controls more than one character, where together the characters a player controls comprise a party. Different characters in a role-playing game may have different attributes, skills, or strengths that contribute to that character's utility within gameplay. Some role-playing video games offer combat as an element of gameplay. Combat and other character interactions within a role-playing video game may involve one or more human controlled character and one or more computer controlled character. Like all genres of video games, the genre of role-playing games is not a hard-and-fast categorization, as there may be some disagreement even among video game players whether a particular game is a role-playing video game.

Today many video games are considered simulations and many simulations are considered video games. The two terms are not mutually exclusive. For example, the Madden NFL series of video games produced by EA Sports are simulations of football, recreating real-life NFL teams, stadiums, and players. For example, the Digital Combat Simulator developed by Eagle Dynamics is a video game based around digital military aircraft battlefield simulations. As a further example the Gran Turismo series of video games produced by Polyphony Digital are simulations of real-life automobiles, including accurate driving physics emulation.

4. Utility of Video Games

Many video games allow video game players to relax. By providing a video game environment with intriguing characters, a gripping story, and a rich setting, some video games attempt to immerse the video game player in the story, allowing them to temporarily disregard the troubles barraging their lives outside the video game. Video games have the ability to actually bring to life (in the video game player's mind) a virtual world that exists as the video game environment, and place the video game player in the middle of it. This is commonly achieved through the use of the video game player's character within the game, as the video game player attributes what happens to their character within the virtual game environment as happening to them. Some video games attempt to offer stunning storylines and plots, as well as enthralling settings and level design for the virtual game environment. All of these aspects of the video game may be brought to life through the operation of gameplay. Some video games offer pleasing or catchy soundtracks, adding drama to the events that unfold within the game.

Some video games allow the player to control aspects of the story as it unfolds. Players can control the story by choosing to carry out certain tasks, making certain decisions, or embarking on certain missions. The choices made by the video game player through the actions of their character may determine the attributes of the video game player's character. By allowing a video game player to control certain aspects of the story, some video games tend to immerse video game players, keeping their focus within the video game environment for the duration of their gaming sessions.

For some video game players, the worlds created within video games present an ideal break from a reality filled with deadlines, stress, financial concerns, health concerns, complex relationships, and responsibilities. Many video game players play video games because they are fun, interesting, and present an accessible way to relax. Often, video game players use video games to pursue or enhance their experience with certain passions. For example, sports fans may play sports video games. Some chess players who cannot find adequate human opponents to compete with may play video game chess. The ability to meet and play video games with others who share the same interests presents video game players with a further avenue for enjoyment.

For some video game players, video games offer a way to fend off boredom, particularly where other recreational outlets are unavailable. Many video games today are accessible on mobile devices, making it easy to play video games wherever the video game player is physically located.

For some video game players, video games offer a sense of fulfillment. By completing the tasks set out in the game, the video game player may be able to receive feedback and be recognized for accomplishment through their actions. This can differ from a video game player's experiences in the real world outside of the video game, where acknowledgement and appreciation of their actions may not be received.

Video game players also can use video games to shift their focus away from unpleasantries in the real-world outside of video games. During the time they play the video game, a video game player may lose themselves in the game, as they experience the sensation of being in control of elements of the video game environment. Some video games may offer video game players a virtual game environment that makes sense to them, unlike the world outside the video game. Moreover, some video games offer video game players a place where they can be whoever or whatever they choose, free form worry about how they fit in, look, or act. In video games, constraints such as money and a player's station in life have no bearing, allowing a video game player to live out a life in the virtual game environment that they otherwise may feel that they cannot attain.

The element of fantasy in some video games, including role-playing games enhances the effect of removing the video game player from their reality outside of the video game environment. The larger the gap between the video game environment and the reality surrounding the video game player in the real world, the greater the video game player's attention is diverted from reality. Moreover, aspects of a video game such as magic, sorcery, and the like adds to the excitement and unpredictability of games. The rules of reality outside the video game (e.g., physics, rule of law, limitations on physical human strength, etc.) simply do not exist within the virtual game environment. More than offering an escape, the experience of playing video games may allow the video game player to enact a level of control within the video game environment that is not attainable in the world outside the video game environment. This is accomplished through the player's control of what happens to their character within the video game. For children and even some adults, the feeling of control can differ greatly from their experiences in the real world. Moreover, though the video game player may be physically alone while playing the game, through gameplay they can in fact feel surrounded by elements of the video game (e.g., other human controlled characters, computer controlled characters, etc.). The social skills involved with interacting with people outside of the video game environment can differ greatly from interacting with people within gameplay, again allowing the video game player to disconnect from the world outside the video game environment. In essence, though the video game player remains themselves while playing a video game, they can mentally take on the essence of the character they are controlling within gameplay.

Some multiplayer video games offer video game players a form of social interaction. Such games offer a chance for video game players to socialize, meet, and enjoy conversation with other humans participating in the video game. This can satisfy some video game player's need to engage other humans. In fact, some video game players enjoy maintaining a social life that exists only within the video game environment. Friendships between different video game players may be formed entirely through video game interactions.

Some video games are used to hone skills that are adaptable in real life. For example, some militaries have employed video games to train their recruits in aspects of combat. In this sense, video games are used as combat simulators. The efficacy of video game simulation in such skills training is only bolstered by the prevalence of youth gaming, as video games are increasingly part of a child's experience. Purported benefits of certain video games include enhanced hand-eye coordination in video game players.

Some video games have an educational aspect and are used for academic training purposes. For example, some schools employ video games designed to attract video game users while delivering teaching points in arithmetic, history, science, and many other disciplines. In this sense, video games may be used as devices for study that can engage the video game player in a way other academic lessons may not be able to. Video games are also accessible outside of the classroom, differing from the traditional school setting.

5. Online Social Networks

An online social network is a type of community accessed through computers connected through networking. An online social network may be available through one or more interne website and/or through one or more app. Examples of online social network apps include the Facebook® app, the Twitter® app, and the Foursquare® app. An online social network typically includes, as one of its features, a representation of each of its members (e.g., a profile for that member). Online social networks vary in their features and offerings, but commonly allow for members to edit their profiles, view information on other members, and/or communicate with other members. The ability to view content from an online social network may or may not be limited to users who are members of the online social network. Some or all of the content available through an online social network may be viewed only by members, as opposed to users who are non-members. Information available through an online social network may further be viewable to only certain other members of the online social network.

For example, a relationship between two members (e.g., establishing the two members are friends) may be required before the two members are able to view some or all of the information the other provides on the online social network. There may or may not be a fee associated with being a member of an online social network. Popular online social networks include, for example, Facebook®, Google+® (a registered trademark of Google, Inc.), Google® (a registered trademark of Google, Inc.) Buzz, LinkedIn® (a registered trademark of LinkedIn Corp), MySpace® (a registered trademark of MySpace, Inc.), Orkut® (a registered trademark of Google, Inc.), Twitter®, Foursquare®, eHarmony® (a registered trademark of eHarmony, Inc.), Bebo® (a registered trademark of Bebo.com LLC), JuiceCaster, Match.com® (a registered trademark of Match.Com, L.L.C.), AsianAvenue, BlackPlanet.com® (a registered trademark of Community Connect Inc.), Renren® (a registered trademark of Delson Group, Inc.), and Friendster® (a registered trademark of Friendster, Inc.). Some online social networks geared towards online dating have online dating websites or online dating apps. Examples include eHarmony, OkCupid and Match.com. By accessing these services' online dating websites or online dating apps, users are accessing the online social network of the service.

As mentioned above, online social networks may recognize relationships between members. For example, an online social network may recognize that two members are denoted as friends, business connections, related through a familial relationship, or in a romantic relationship. Furthermore, information regarding members of online social networks may specify particular information to the social network provider that is not displayed at all, but which the social network provider, itself, maintains or determines through the usage and behavior its members. Such information may be used for marketing purposes, for example. An online social network may further allow members to form relationships with others by having common membership in groups or by recognizing the members have shared attributes (e.g., same alma mater, living in the same city, purchase of or interest in the same brands or goods). Alternatively, members may be able to define their relationships with one another on an online social network. Relationships between members may or may not be visible to other members on the online social network.

Online social networks are increasingly becoming popular platforms for their members to communicate and receive information from one another. Typically an online social network allows members to provide information and allows members to view the information provided by other members. For example, a member may provide contact information, background information (e.g., date of birth, astrological sign, etc.), education information, location, occupation, interests, hobbies, work history, relationship status (e.g., married, single, etc.) and so forth.

Online social networks may also provide members with the ability to share and exchange various information. Members may be able to exchange and share messages and files through online social networks. Online social networks may further allow members to share information with one another through chat or other real-time messaging, emailing or other non-real-time messaging, walls, blogging, video feeds, photo and video sharing, as well as through forums, groups, and the like.

Members of online social networks may generally share information with other members or users who are non-members by providing information through "posts." Posts contain information made available to other users on the online social network. Beyond the aforementioned nomenclature, a post may be variously known as a "tweet" (in the case of Twitter®), a "check-in" (in the case of Foursquare®) or otherwise, according to the parlance associated with that online social network. Posts associated with a user can be created by the user themselves, of their own volition, or they can alternatively be created without that user taking action to create the post. An example of the latter occurs in the online social network Facebook®, when one member creates a post to appear on another member's profile page. In this instance, the member whose profile page the post appears on has done nothing of their own volition to create the post.

Recently, online social networks have developed the ability to allow members to provide information on their real-life geographic location. Geographic location information may be provided to an online social network through posts, where the posts contain geographic location information collected from the member's computer or entered by a member. In this instance, the geographic information may be collected by computer hardware that is part of a computer. Alternatively, geographic location information may be provided to an online social network through the provision of geographic location information through the user's own acts or through the acts of others which determine the user's position (e.g., a post stating where the user is or is going, made by the user, or someone else). For example, a first user of an online social network may create a post stating their location and that they are present at that location with a second user of the online social network. Information on the location of both the first and the second user of the online social network is contained within the post. The capability to create such a post is present in the online social network Facebook®.

Foursquare® is a location-based online social network. The Foursquare® online social network may be accessed from the website Foursquare.com, text messaging, or through the Foursquare® app. Foursquare® was created by Dennis Crowley and Naveen Selvadurai. Foursquare® users are able to "check-in" anywhere in the world by accessing a website, text messaging, or by using the Foursquare® app on their computer.

Within Foursquare®, check-ins can be posted to a Foursquare® users' account on Facebook® and Twitter®. This allows Foursquare® users to share their location with people who can access these social networks. Foursquare® also enables push-notifications which can appear on a Foursquare® users' computer when one of the people they follow checks-in at a location.

Gowalla® is another example of a location-based online social network. Like Foursquare®, Gowalla® users can "check-in" at real-life physical locations. Other location-based online social networks include Brightkite® (a registered trademark of HDMessaging Inc.), MyTown® (a registered trademark of Booyah Inc.), Limbo® (a registered trademark of Limbo, Inc.), and Loopt® (a registered trademark of Loopt, Inc.). The social networking site Facebook® also released a location-based aspect to its site, known as Facebook® Places. With Facebook® Places, Facebook® users can share their location using any computer that can access the Facebook® online social network.

Benefits of the Invention

Within this application it should be understood that a video game player is a video game user. Likewise a video game user is a video game player. Outside of the video game context, the term "user" is often times more appropriate than "player" when describing someone accessing or interacting with a system. For example, the user of an online social network or an online dating website is generally not referred to as a "player", they are referred to as a "user". Within a virtual or online environment (e.g., as they exist within an online social network or a video game) it should be understood that an individual accessing the virtual or online environment may variously be referred to as a user or a player.

Unlike traditional video games, in which a game character need not have attributes reflective of the video game player, a video game in which a player's character has attributes based at least in part on real-life attributes of the player brings to bear certain aspects of realism. The verification of the player's attributes that are reflected in the player's game character enhances the trustworthiness of the system when the game is a multiplayer game. This presents many avenues for enjoyment and other sources of utility that are not found in prior systems.

Unlike traditional multiplayer video games, in which a video game player may provide information about their attributes that is accessible to other players without any verification, a multiplayer video game in which a user's attributes are verified brings to bear certain aspects of realism. The verification of the player's attributes that are made available to other players in the game enhances the trustworthiness of the system. This presents many avenues for enjoyment and other sources of utility that are not found in prior systems.

Unlike traditional multiplayer video games, in which a video game player commonly controls a character that represents a fictional or created person, a video game that presents the player's character as having attributes of the player presents many avenues for enjoyment and other sources of utility that are not found in prior systems. The player's sensation of starring as themselves in a video game is not available in systems where the player controls a fictional or created character. Moreover, a player's sensation of presenting a true version of themselves, where attributes about themselves are verified and accessible to other players, allows a deeper sense of community.

Unlike traditional multiplayer video games, in which a video game player commonly controls a character in a fictional or created environment, a video game environment that is based on the environment that the player exists within in real life presents avenues for enjoyment and other sources of utility. This enjoyment and utility is further magnified when a player's character is based on the attributes of the player and that character is made to exist in a virtual game environment that is based on the environment that the player exists within in real life. In such a video game a player may play "as themselves" in a virtual game environment that is based on their real life surroundings or areas that otherwise exist in the real world. This gives rise to a new level of fantasy, where an aspect of the fantasy is performing actions in the game where the player is controlling a character that represents the player. Even though the player may be in a virtual game environment that looks like the real world, the player may be removed from general responsibilities they would have in real life (e.g., reporting to work, taking out the trash), allowing them to choose the attributes of their life they would like to focus on within the virtual game environment. This also gives rise to enhanced ability to connect with other players, as a community of video game players in such a game have insight to one another through the accessibility of one another's attributes.

Another benefit is that in a multiplayer video game with the verification of a user's attributes, each video game player may communicate with other players armed with verified knowledge about the person they are communicating with. This allows users to communicate with greater confidence and, at times, more openness. In a game where the verification of a user's attributes is possible, a user whose attributes have not been verified becomes more suspect. Thus, the verification of user's attributes within a game adds a dimension to in-game interactions that is not otherwise possible.

Another benefit is that a multiplayer video game in which each player's character physically resembles that player, character to character interactions more closely resemble the manner two players would interact in real life. The reason is that in real life when people interact face to face there is no need to verify what the other person looks like, it is evident. In a multiplayer video game where each player's character physically resembles the player controlling the character a similar result is achieved. In order to enhance the trustworthiness of the system, however, the physical attributes of the player can be verified as that player's character takes on the player's attributes.

Another benefit is that a multiplayer video game where each player's attributes are verified and made accessible to other players allows each video game player to make known certain attributes about themselves that they want other video game players to know. The video game player who wants their attributes to be known will further know that other video game players are more likely to believe that those attributes are genuine when those attributes are verified, as compared to systems where there is no verification of a video game player's attributes. This allows users to assert the attributes they have in a way that is believable. This also allows users to assert their attributes in a manner that is not boastful, but merely truthful.

Another benefit is that a multiplayer video game where each player's attributes are verified provides a source of valuable information about the attributes of the video game players. When video game players verify attributes about themselves they generate information that can contain valuable analytics information to both themselves and third parties. For example, when a video game player verifies that he is a male who wears a size 11 shoe and he is in a running group, that information is valuable to shoe merchants that wish to contact the player because the shoe merchant can now provide the player with offers for men's running shoes in size 11. For example, when a player verifies that she is a 45 year old female living in Texas a women's clothing store may be able to predict certain dresses that would be of interest to the player, given their age and the area of the country that she lives in. Moreover, there is utility in using verified attributes of a user, as opposed to unverified attributes of a user. For example, absent verification, a user may submit inaccurate information about themselves (e.g., claim to be younger, taller, or not as heavy as they truly are). The same benefit for using analytics information discussed with respect to a video game player verifying their attributes comes when the user of an online social network verifies their attributes.

Unlike traditional online social networks, in which a user is unable to verify their ownership of certain items, an online social network where an attribute of a user is their ownership of an item presents avenues for enjoyment and other sources of utility. A user's sensation of presenting a true version of themselves, where attributes about themselves are verified and accessible to other users, allows a deeper sense of community. The same benefit comes in video games where a player is able to verify their ownership of an item.

Unlike traditional online social networks, in which a user's assertions of their attributes generally have no way of being indicated as inaccurate by others, an online social network where a user's claims of their own attributes is subject to verification by others presents utility. Specifically, an online social network where the user's purported attributes may be dispelled as falsified or exaggerated provides a community where such deception is deterred. The same benefit comes in video games where the attributes of a player are subject to verification.

Unlike traditional online social networks, in which the attributes of a user are provided only by the user themselves, an online social network where attributes of a user may be indicated by other users, and the value of those attributes may be verified, presents utility. Specifically, a user's claims of their own attributes may leave out certain facts about themselves (e.g., criminal record) that the rest of the community on the online social network may wish to know. In an online social network where a user's attributes may be indicated by other users this provides a means of bringing such information to light. Beyond this, the verification of attributes associated with a user prevents other users from baselessly slandering users through the assignment of undesirable attributes. The same benefit comes in video games where the attributes of a player may be indicated by other players, and the value of those attributes may be verified.

It will be apparent to one of skill in the art that these and other benefits of the invention exist, and that the examples given here do not represent exhaustive list of all benefits of the invention.

Attributes of Users of Online Systems in Example Embodiments

In some embodiments a user provides information about themselves, known as attributes. In some embodiments the user is a video game player. In some embodiments attributes are associated with users without the users themselves providing such information. Attributes of a user may be indicated to have certain values and may take on certain forms. Such attributes may further be accessible to other users in a multiplayer video game or in an online social network. Attributes of a user may be physical characteristics, subjective descriptions, factual assertions, opinions, verifiable facts, or otherwise. In some embodiments the attributes of a user are verified by a system in an automated fashion. In some embodiments the attributes of a user are verified by humans. As explained further below, attributes may be expressed and verified in a number of ways. The verification of an attribute attributed to a user may occur using various types of evidence and using various procedures. In some embodiments the evidence of one or more attributes originates from a verification source that exists outside of a virtual or online environment, that is to say, such evidence exists in the real world. Examples of such evidence include tangible documents, the input of individuals, and electronic records, for instance.

In some embodiments an attribute to be verified is a user's name or identity. For example, the user's name may be indicated as their first name. For example, the user's name may be indicated as their last name. For example, the user's name may be indicated by their first and last names. For example, the user's name may be indicated by their first initial and their last name. For example, the user's name may be indicated by their first initial, their middle initial, and their last name. For example, the user's name may be indicated by their first name, their middle name(s) and their last name. For example, the user's name may be indicated by their first name, their middle initial(s), and their last name. For example, the user's name may be indicated as the user's first name and the initial of their last name. For example, a user's name may be indicated as a nickname, stage name, pen name, a given name, or otherwise. For example, a user's name may be indicated using the user's maiden name or former name.

In some embodiments a user's name or identity is evidenced through the provision of information such as a biometric identifier (e.g., fingerprint information, facial recognition information, DNA samples, hair sample, skin sample, another sample of genetic material, palm print information, iris or retina recognition information, scent information, information on an individual's gait, voice information, etc.). In some embodiments a user's name or identity is evidenced through the provision of a token based identifier (e.g., government issued identification card, passport, etc.), or a knowledge based identifier (e.g., passwords and login information to websites, personal identification numbers, answers to questions likely to be known only to a certain individual, etc.). Token based identifiers may broadly include any item that a certain individual is likely to have access to that other people would not have access to. For example medical records, sales receipts, credit card receipts, sales invoices, packing slips, deeds and other items likely to be accessible only to certain individuals may serve as token based identifiers to evidence a user's name or identity. Sworn statements, un-sworn statements, affidavits, testimony, and averments may also be provided as evidence of a user's name or identity.

In some embodiments an attribute to be verified is a user's ownership of an item. An item may be a tangible item, such as a vehicle, an apartment, real estate, or otherwise. An item may also be an intangible item such as a United States Patent, a digital music file, or otherwise. An item may be a living creature such as a pet (e.g., a puppy, fish, rabbit, etc.), farm animal, or otherwise. In some embodiments the item is described in more general terms (e.g., a red car, jeans, etc.). In some embodiments the item is described in more detailed terms (e.g., a crimson 1991 Cadillac Eldorado, Levi's mid rise size 6 skinny jeans, etc.). The ownership of an item may be verified as owned, rented, leased, borrowed or otherwise, An item may be described in many ways, including through a written description, a visual depiction, a unique identifier (e.g., ISBN, UPC (Universal Product Code), ASIN (Amazon Standard Identification Number), product number, etc.)

In some embodiments a user's ownership of an item is evidenced through the provision of information such as knowledge based identifiers, where the knowledge based identifier pertains to the item the user purports to own (e.g., serial number on an item, etc.). In some embodiments a user's ownership of an item is evidenced through the provision of information such as token based identifiers. Token based identifiers may broadly include any item that a certain individual is likely to have access to if they own the particular item the user purports to own that other people would not have access to if they did not own the particular item the user purports to own. Examples include keys (e.g., car keys, house keys), sales receipts, credit card receipts, sales invoices, packing slips, deeds, images of the user with the item, and otherwise. In some embodiments a user's ownership of an item is evidenced through the provision of statements, such as sworn statements, un-sworn statements, affidavits, testimony, and averments. In some embodiments a user's ownership of an item is evidenced through the provision of records, such as vital records (e.g., marriage license, birth certificate, etc.), public records (e.g., census records, court records, etc.), church records, criminal records, information from an online social network (e.g., an online profile, etc.), land records, department of motor vehicle records, credit reports, and otherwise. In some embodiments a user's ownership of an item is evidenced through the provision of information such as information appearing in periodicals, newspapers, or the internet.

In some embodiments an attribute to be verified is the time that an item was owned by a user. For example, a piece of furniture may be indicated to have been owned by a user from January 2015 through June 2015. In some embodiments the time that an item was owned by a user is evidenced through the provision of the aforementioned information evidencing a user's ownership of an item.

In some embodiments an attribute to be verified is the price that an item was purchased for by a user. In some embodiments an attribute to be verified is the store that an item was purchased from by a user. For example, a handbag may be indicated to have been purchased by a user for $100 from JC Penney. In some embodiments the price that an item was purchased for by a user is evidenced through the provision of the aforementioned information evidencing a user's ownership of an item. In some embodiments the store that an item was purchased from by a user is evidenced through the provision of the aforementioned information evidencing a user's ownership of an item.

In some embodiments an attribute to be verified is the condition of an item owned by a user. For example, a vehicle or baseball card owned by the user may be indicated to be in excellent, good, fair, poor condition, or otherwise. For example, a vehicle owned by a user may be indicated to have a certain amount of mileage on it. For example, an item of clothing may be indicated to be in new or used condition. In some embodiments the condition of an item owned by a user is evidenced through the provision of the aforementioned information evidencing a user's ownership of an item. In some embodiments the condition of an item owned by a user is evidenced through a visual depiction of the item.

In some embodiments an attribute to be verified pertains to the size of a user's clothes.

In some embodiments information pertaining to the size of a user's clothes is evidenced through the provision of the aforementioned information evidencing a user's ownership of an item, where that item is a clothing item.

In some embodiments an attribute to be verified is a user's membership in a particular group, club, society, organization, or trade group. For example, a group in this embodiment may be a particular book club or a particular neighborhood association. For example, a club in this embodiment may be a certain fitness club (e.g., Gold's Gym) or a certain social club (e.g., The Houston Club). For example, a society in this embodiment may be a certain academic honor society (e.g., the Alpha Omega Alpha Honor Medical Society) or professional society (e.g., the American Railway Engineering Association). For example, an organization in this embodiment may be a particular nonprofit organization (e.g., the Future Farmers of America), service organization (e.g., the Lions Club), fraternal social organization (e.g., freemasonry, a fraternity or sorority for undergraduate students, etc.), community organization (e.g., Boy Scouts of America, Girl Scouts of America, etc.) or a youth group. For example, a trade group in this embodiment may be a particular industry trade group, business association, or sector association (e.g., the Screen Actors Guild).

In some embodiments a user's membership in a particular group, club, society, organization, or trade group is evidenced through the provision of information such as knowledge based identifiers, where the knowledge based identifier pertains to the group, club, society, organization, or trade group the user purports to be a member of (e.g., membership number, registration number, etc.). In some embodiments a user's membership is evidenced through the provision of information such as token based identifiers. Token based identifiers may broadly include any item that a certain individual is likely to have access to if they are a member of the particular group, club, society, organization, or trade group the user purports to be a member of that other people would not have access to if they were not a member. Examples include membership cards, dues receipts, images of the user participating in certain events, correspondence sent to only members, etc. In some embodiments a user's membership is evidenced through the provision of statements, such as sworn statements, un-sworn statements, affidavits, testimony, and averments. In some embodiments a user's membership is evidenced through the provision of records, such as vital records (e.g., marriage license, birth certificate, etc.), public records (e.g., census records, court records, etc.), church records, criminal records, information from an online social network (e.g., an online profile, etc.), land records, department of motor vehicle records, credit reports, meeting minutes, membership roles, and otherwise. In some embodiments a user's membership in a particular group, club, society, organization, or trade group is evidenced through the provision of information such as information appearing in periodicals, newspapers, or the internet.

In some embodiments an attribute to be verified is a user's status in a particular group, club, society, organization, trade group, or company. For example, the user's status in this embodiment may be indicated as a title (e.g., president, member, treasurer, secretary, etc.), a level of membership (e.g., Gold Status within the American Airlines AAdvantage® frequent flyer program), or otherwise. For example, the user's status may be their status as an employee of a company. In some embodiments a user's status in a particular group, club, society, organization, trade group, or company is evidenced through the provision of the aforementioned information evidencing a user's membership in a particular group, club, society, organization, or trade group.

In some embodiments an attribute to be verified is a user's title in a particular business group, club, society, organization, trade group, or company. For example, the user's title in this embodiment may be indicated as a formal designation (e.g., communications consultant, associate, senior marketing analyst, director of human resources, engineer, chief executive officer, program manager, etc.) or otherwise. In some embodiments a user's title in a particular business group, club, society, organization, trade group, or company is evidenced through the provision of the aforementioned information evidencing a user's membership in a particular group, club, society, organization, or trade group. In some embodiments a user's title in a particular business group, club, society, organization, trade group, or company is evidenced through the provision of a statement, such as a sworn statement, un-sworn statement, affidavit, testimony, or averment. In some embodiments a user's title in a particular business group, club, society, organization, trade group, or company is evidenced through the provision of information such as information appearing in periodicals, newspapers, or the internet.

In some embodiments an attribute to be verified pertains the user's employment status. For example, the user's employment status may be indicated as employed, unemployed, unemployed and looking, unemployed and not looking, employed full-time, employed part-time, or otherwise.

In some embodiments information pertaining to a user's employment status is evidenced through the use of documentation such as pay stubs, tax returns, credit reports, or otherwise. In some embodiments a user's employment status is evidenced through the provision of a statement, such as a sworn statement, un-sworn statement, affidavit, testimony, or averment. In some embodiments a user's employment status is evidenced through the provision of information such as information appearing in periodicals, newspapers, or the internet.

In some embodiments an attribute to be verified relates to the user's religious affiliation. for example, the user's religious affiliation may be indicated by the user's affiliation with a church, synagogue, masque, or temple.

In some embodiments a user's religious affiliation is evidenced through the provision of records, such as baptismal records, vital records (e.g., marriage license, birth certificate, etc.), public records (e.g., census records, court records, etc.), church records, criminal records, information from an online social network (e.g., an online profile, etc.), and otherwise. In some embodiments a user's religious affiliation is evidenced through the provision of information such as information appearing in periodicals, newspapers, or the internet. In some embodiments a user's religious affiliation is evidenced through the provision of statements, such as sworn statements, un-sworn statements, affidavits, testimony, and averments.

In some embodiments an attribute to be verified is a user's height. For example, the user's height may be indicated by a measure of distance (e.g., 6'1", 5 feet, 167 centimeters, etc.). Many different units may be used to express a user's height. For example, the user's height may be indicated to be greater than, less than, or equal to another person's height or the height of an object.

In some embodiments a user's height is evidenced through the provision of documentation identifying the user's height (e.g., government issued identification card indicating height, medical records, images of the user indicating their height, information from a user's online profile, etc.). Sworn statements, un-sworn statements, affidavits, testimony, and averments may also be provided as evidence of a user's height. In some embodiments a user's height is evidenced through the provision of records such as vital records (e.g., marriage license, etc.), public records (e.g., census records, court records, etc.), church records, criminal records, information from an online social network (e.g., an online profile, etc.), and otherwise. In some embodiments a user's height is evidenced through the provision of information such as information appearing in periodicals, newspapers, or the internet.

In some embodiments an attribute to be verified is a user's weight. For example, the user's weight may be indicated by a measure of force (e.g., 150 pounds, 88 kilograms, 850 Newtons). Many different units may be used to express a user's weight. For example, the user's weight may be indicated to be greater than, less than, or equal to another person's weight or the weight of an object.

In some embodiments a user's weight is evidenced through the provision of documentation identifying the user's weight (e.g., government issued identification card indicating weight, medical records, images of a scale indicating a user's weight while the user stands on the scale, information from a user's online profile, etc.). Sworn statements, un-sworn statements, affidavits, testimony, and averments may also be provided as evidence of a user's weight. In some embodiments a user's weight is evidenced through the provision of records such as vital records (e.g., marriage license, etc.), public records (e.g., census records, court records, etc.), church records, criminal records, information from an online social network (e.g., an online profile, etc.), and otherwise. In some embodiments a user's weight is evidenced through the provision of information such as information appearing in periodicals, newspapers, or the internet.

In some embodiments an attribute to be verified pertains to other measurable physical attributes of a user's body. For example, the size of a user's foot may be indicated (e.g., in terms of measured length or in shoe size). For example, the size of a user's chest may be indicated (e.g., in terms of measured bust or in bra size). For example, the size of a user's hand may be indicated (e.g., in terms of measured length or in glove size). For example, the size of a user's waist may be indicated (e.g., in terms of measured length or in terms of pants size). For example, the length of the user's legs may be indicated (e.g., in terms of measured length or in terms of pants size). For example, the size of a user's head may be indicated (e.g., in terms of measured length or in terms of hat size). For example, the size of a user's finger may be indicated (e.g., in terms of measured length, circumference or in terms of ring size).

In some embodiments a measurable physical attribute of a user's body is evidenced through the provision of documentation pertaining to that attribute (e.g., government issued identification cards, medical records, images of the user, information from a user's online profile, etc.). Sworn statements, un-sworn statements, affidavits, testimony, and averments may also be provided as evidence of a user's physical attributes. In some embodiments a user's physical attribute is evidenced through the provision of records such as vital records (e.g., marriage license, etc.), public records (e.g., census records, court records, etc.), church records, criminal records, information from an online social network (e.g., an online profile, etc.), and otherwise. In some embodiments a user's physical attribute is evidenced through the provision of information such as information appearing in periodicals, newspapers, or the internet.

In some embodiments an attribute to be verified is a user's hairstyle. For example, the user's hairstyle may be indicated as having a certain color or colors. For example, the user's hairstyle may be indicated as having certain qualities such as being straight, curly, frizzy, wavy, shaved, bald, or otherwise. For example the user's hairstyle may be indicated as having a certain length (e.g., shoulder length, five inches long, one inch below the shoulders, etc.). For example, the user's hairstyle may be indicated as having a certain configuration, for example afro, bangs, beehive, bob cut, bowl cut, butch cut, comb over, crew cut, dreadlocks, fauxhawk, frenchbraid, flattop, hi-top fade, medium bob, mohawk, mullet, perm, pompadour, pixie cut, rattail, slicked back, short bob, weave, or otherwise. For example, the user's hairstyle may be indicated as being arranged in a certain way such as in one or more braid, in one or more bun, in cornrows, in a ponytail, in pig tails, or otherwise. For example, the user's hairstyle may be indicated as being similar or in the style of someone else's hairstyle (e.g., hairstyle like Princess Diana's, hairstyle like the character Ariel in Disney's animated film The Little Mermaid).

In some embodiments a user's hairstyle is evidenced through the provision of documentation pertaining to the user's hair (e.g., government issued identification cards, medical records, images of the user, information from a user's online profile, etc.). Sworn statements, un-sworn statements, affidavits, testimony, and averments may also be provided as evidence of a user's hairstyle. In some embodiments a user's hairstyle is evidenced through the provision of records such as vital records (e.g., birth certificate, etc.), public records (e.g., census records, court records, etc.), church records, criminal records, information from an online social network (e.g., an online profile, etc.), and otherwise. In some embodiments a user's hairstyle is evidenced through the provision of information such as information appearing in periodicals, newspapers, or the internet.

In some embodiments an attribute to be verified is a user's eye color. For example, the user's eye color may be indicated as amber, blue, brown, gray, green, hazel, red, violet, or otherwise.

In some embodiments a user's eye color is evidenced through the provision of the aforementioned information evidencing a user's measurable physical attributes.

In some embodiments an attribute to be verified is a user's eyewear. For example, the user's eyewear may be indicated as glasses, goggles, contact lenses, a monocle, sunglasses, or otherwise. In some embodiments a user's eyewear is evidenced through the provision of the aforementioned information evidencing a user's measurable physical attributes.

In some embodiments an attribute to be verified is a user's body type. For example, the user's body type may be indicated as average, skinny, slender, skeletal, lean, athletic, overweight, fat, obese, husky, stout, jacked, dwarf, giant, petite, pear-shaped, muffin-topped, muscular, toned, chubby, rotund, ectomorphic, mesomorphic, endomorphic, or otherwise.

In some embodiments a user's body type is evidenced through the provision of the aforementioned info nation evidencing a user's measurable physical attributes.

In some embodiments an attribute to be verified is a user's skin type. For example, the user's skin type may be indicated as a certain color, hue, or type. For example, the user's skin color may be indicated as black, white, or any other color. For example, the user's skin hue may be indicated as light brown, tan, pale, or otherwise. For example, the user's skin type may be indicated to be Type IV on the Fitzpatrick scale, or otherwise. For example, the user's skin type may be indicated to be freckled, fair, or otherwise. In some embodiments an attribute to be verified is a user's race or ethnicity.

In some embodiments a user's skin type or race is evidenced through the provision of the aforementioned information evidencing a user's measurable physical attributes.

In some embodiments an attribute to be verified pertains to a tattoo on a user's body. For example, a tattoo on the user's body may be indicated to appear on a certain location on the user's body. For example, a tattoo on the user's body may be indicated to match a certain written description. For example, a tattoo on a user's body may be indicated to have been created on a certain date or dates. For example, a tattoo on a user's body may be indicated to have a particular visual design (e.g., a flower, the sun, etc.). For example, a tattoo on a user's body may be indicated to have a particular shape. For example, a tattoo on a user's body may be indicated to have a particular color.

In some embodiments information pertaining to a user's tattoo is evidenced through the provision of the aforementioned information evidencing a user's measurable physical attributes.

In some embodiments an attribute to be verified pertains to a piercing on a user's body. For example, a piercing may be indicated to appear a on a certain location on the user's body. For example, a piercing may be indicated to match a certain written description. For example, a piercing may be indicated to have been created on a certain date or dates. For example, a piercing may be indicated to have a certain visual design. For example a piercing may be indicated to be accompanied by a certain piece of jewelry (e.g., earrings in the case of an ear piercing).

In some embodiments information pertaining to a user's piercing is evidenced through the provision of the aforementioned information evidencing a user's measurable physical attributes.

In some embodiments an attribute to be verified pertains to the criminal record of a user. For example information concerning the user's arrests, citations, traffic tickets, convictions, pardons, warrants, charges, pleas, expunged offenses, prison time served, jail time served, traffic offenses, or otherwise may be indicated.

In some embodiments a user's criminal record is evidenced through the provision of documentation such as a medical records, public records (e.g., census records, court records, etc.), criminal records, police reports, police blotters, credit reports, etc. Sworn statements, un-sworn statements, affidavits, testimony, and averments may also be provided as evidence of a user's criminal record. In some embodiments a user's criminal record is evidenced through the provision of information such as information appearing in periodicals, newspapers, or the internet.

In some embodiments an attribute to be verified pertains to the citizenship of a user. For example the user's legal status in a certain city, state, or country may be indicated.

In some embodiments a user's citizenship is evidenced through the provision of documentation such as a passport or government issued identification card. In some embodiments a user's citizenship is evidenced through the provision of medical records, public records (e.g., census records, court records, etc.), criminal records, police reports, etc. Sworn statements, un-sworn statements, affidavits, testimony, and averments may also be provided as evidence of a user's criminal record. In some embodiments a user's citizenship is evidenced through the provision of information such as information appearing in periodicals, newspapers, or the internet.

In some embodiments an attribute to be verified pertains to the wealth of a user. For example the wealth of the user may be indicated in terms of the amount of money in one or more bank account. For example the wealth of the user may be indicated in terms of the amount of money in one or more money market account. For example the wealth of the user may be indicated in terms of the value of stock owned by the user. For example the wealth of the user may be indicated in terms of the shares of stock owned by the user. For example the wealth of the user may be indicated in terms of annuities owned by the user. For example the wealth of the user may be indicated in terms of bonds owned by the user. For example the wealth of the user may be indicated in terms of options contracts owned by the user. For example the wealth of the user may be indicated in terms of the net worth of the user. For example, the wealth of the user may be indicated in terms of the debt the user holds (e.g., credit card debt, mortgages held by user, etc.). For example, the wealth of the user may be indicated to be a given amount of currency. For example, the wealth of the user may be indicated in terms of items owned by the user. For example, a user may provide a link to an online account, where the balance of the online account indicates the wealth of the user. For example, the wealth of the user may be indicated to be greater than, less than, or equal to another person's wealth.

In some embodiments a user's wealth is evidenced through the provision of bank statements, money market account statements, deposit slips, certificates of deposit, stock certificates, information from a banking website, information from a banking app, membership in a group where a condition of membership is having a net worth above certain amount, etc. In some embodiments a user's wealth is evidenced through the provision of statements, such as sworn statements, un-sworn statements, affidavits, testimony, and averments. In some embodiments a user's wealth is evidenced through the provision of records, such as public records (e.g., census records, court records, etc.), business records, church records, tax records, criminal records, information from an online social network (e.g., an online profile, etc.), land records, tax records, department of motor vehicle records, credit reports, and otherwise.

In some embodiments an attribute to be verified pertains to the income of a user. For example, the user's income may be indicated in terms of income over a specified period (e.g., annual income). For example, the user's income may be indicated in terms of cumulative lifetime income. For example, the user's income may be indicated in terms of projected income. For example, the user's income may be indicated in terms of information contained in the user's tax return (e.g. adjusted gross income, tax owed, etc.). For example, the income of the user may be indicated to be greater than, less than, or equal to another person's income.

In some embodiments a user's income is evidenced through the provision of bank statements, money market account statements, deposit slips, information from a banking website, information from a banking app, membership in a group where a condition of membership is having an income above certain amount, etc. In some embodiments a user's income is evidenced through the provision of statements, such as sworn statements, un-sworn statements, affidavits, testimony, and averments. In some embodiments a user's income is evidenced through the provision of records, such as public records (e.g., census records, court records, etc.), church records, criminal records, information from an online social network (e.g., an online profile, etc.), tax records, department of motor vehicle records, credit reports, and otherwise.

In some embodiments an attribute to be verified pertains to where a user lives or has lived. For example the user's current or previous address may be indicated. For example the city the user lives in or has lived in may be indicated. For example the country the user lives in or has lived in may be indicated. For example, the user's hometown may be indicated as a particular city (e.g., Kilgore, Tex.). For example a visual depiction of the residence that the user lives in or has lived in may be indicated. For example, the roommates or housemates the user has or has had may be indicated.

In some embodiments information pertaining to where a user lives or has lived is evidenced through the provision of documentation identifying the user's address (e.g., government issued identification card indicating address, medical records, information from a user's online profile, etc.). In some embodiments information pertaining to where a user lives or has lived is evidenced through the provision of location-specific information. Such location-specific information may be information from a GPS-capable device indicating the user's physical location (e.g., a user's mobile phone), an IP address, or otherwise. In some embodiments information pertaining to where a user lives or has lived is evidenced through the provision of information such as token based identifiers. Token based identifiers may broadly include any piece of information that a certain individual is likely to have access to or able to generate if they live in or have lived in a certain location, that other people would not have access to or generate if they did not live there. Examples include pictures of landmarks, structures, and places known to exist in a certain location, including pictures indicating the user is or was present at certain locations. In some embodiments information pertaining to where a user lives or has lived is evidenced through the provision of statements, such as sworn statements, un-sworn statements, affidavits, testimony, and averments. In some embodiments information pertaining to where a user lives or has lived is evidenced through the provision of records, such as vital records (e.g., marriage license, birth certificate, etc.) public records (e.g., census records, court records, etc.), church records, criminal records, information from an online social network (e.g., an online profile, etc.), land records, department of motor vehicle records, credit reports, and otherwise. In some embodiments information pertaining to where a user lives or has lived is evidenced through the provision of information such as information appearing in periodicals, newspapers, or the internet.

In some embodiments an attribute to be verified pertains to where a user is physically located or has been physically located in the past. For example the user's current or previous location (e.g., at a certain grocery store, at a certain address) may be indicated. For example the city the user is presently in or has been in may be indicated (e.g., San Jose, Calif.). For example a country the user is in or has been in may be indicated. For example a visual depiction of the location the user is located at or has been may be indicated. For example, the user's location within or at a certain continent (e.g., North America), country (e.g., the United States), state (e.g., Texas), city, (e.g., Arlington), address (e.g., 1 AT&T Way, Arlington Tex. 76011), venue (e.g., Cowboys Stadium), or otherwise may be indicated.

In some embodiments information pertaining to where a user is physically located or has been physically located in the past is evidenced through travel records (e.g., hotel receipts, plane tickets, train tickets, etc.). In some embodiments information pertaining to where a user is physically located or has been physically located in the past is evidenced through the provision of the aforementioned information evidencing where a user lives or has lived.

In some embodiments an attribute to be verified pertains the user's contact information. For example, the user's email address may be indicated. For example, the user's phone number may be indicated. For example, the user's username on an online social network may be indicated.

In some embodiments information pertaining to a user's contact information is evidenced through the user's use of channels of communication indicated as their contact information. For example, a user may send an email containing a certain message as evidence of their email address. For example, a user may make a phone call with a certain phone as evidence of their phone number. For example, a user may "like" a certain page (or take another action) within an online social network as evidence of their contact information. In some embodiments a user's contact information is evidenced through the provision of information such as information appearing in periodicals, newspapers, or the internet.

In some embodiments an attribute to be verified pertains to the familial relationships of a user. For example the user's parents, children, grandparents, grandchildren, cousins, uncles, aunts, nieces, nephews, stepparents, stepchildren, step-grandparents, step-grandchildren, step-cousins, step-uncles, step-aunts, step-nieces, step-nephews, half-siblings, or otherwise may be indicated. For example, the user's status as being adopted or not adopted may be indicated. For example, the status of a member of the user's family as being adopted or not adopted may be indicated. For example, the status of a member of the user's family as being living or deceased may be indicated.

In some embodiments an attribute to be verified pertains to the friend relationships of a user. For example the user's friends on an online social network may be indicated. For example, the user's status as being friends with a particular person may be indicated. For example, the status of a friend of the user as being living or deceased may be indicated. For example, the duration, beginning, and end of a friendship the user has may be indicated.

In some embodiments an attribute to be verified pertains to a romantic relationship of a user. For example the user's romantic relationship on an online social network may be indicated. For example, the user's status as being in a romantic relationship with a particular person may be indicated. For example, the duration, beginning, and end of a romantic relationship the user has or has had with someone may be indicated. For example, the user's preference to be in a romantic relationship with males or females may be indicated.

In some embodiments an attribute to be verified pertains to a business relationship of a user. For example the user's business relationship on an online social network may be indicated. For example, the user's status as having a business relationship with a particular person may be indicated. For example, the duration, beginning, and end of a business relationship the user has or has had with someone may be indicated. For example, the nature of business relationship (e.g., contractor, consultant, partner, etc.) the user has had with someone may be indicated.

In some embodiments a user's familial relationship, friend relationship, romantic relationship, or business relationship is evidenced through the provision of information such as token based identifiers. Token based identifiers may broadly include information or items that a certain individual is likely to have access to if they are have a familial, friend, romantic, or business relationship with a particular person that a person who did not have a familial, friend, romantic, or business relationship with that particular person would not have. Examples include information about the person who the user purports to have a relationship with, images of the user with the person they purport to have a relationship with, correspondence with the person the user purports to have a relationship with, etc. In some embodiments a user's familial relationship, friend relationship, romantic relationship, or business relationship is evidenced through the provision of statements, such as sworn statements, un-sworn statements, affidavits, testimony, and averments. In some embodiments a user's familial relationship, friend relationship, romantic relationship, or business relationship is evidenced through the provision of records, such as vital records (e.g., marriage license, birth certificate, etc.), public records (e.g., census records, court records, etc.), church records, criminal records, information from an online social network (e.g., an online profile, etc.), and otherwise. In some embodiments a user's familial relationship, friend relationship, romantic relationship, or business relationship is evidenced through the provision of information such as information appearing in periodicals, newspapers, or the internet.

In some embodiments an attribute to be verified pertains to the age or birth date of a user. For example, the user's age in years may be indicated. For example, the user's astrological sign (e.g., Taurus, etc.) or zodiac symbol (e.g., Ox) may be indicated. For example the user's date of birth (e.g., Oct. 31, 1982) may be indicated. For example, the age of the user may be indicated to be greater than, less than, or equal to another person's age.

In some embodiments a user's age or date of birth is evidenced through the provision of an identity document, a government issued identification card, or otherwise. In some embodiments a user's age or date of birth is evidenced through the provision of statements, such as sworn statements, un-sworn statements, affidavits, testimony, and averments. In some embodiments a user's age or date of birth is evidenced through the provision of records, such as vital records (e.g., marriage license, birth certificate, etc.), public records (e.g., census records, court records, etc.), church records, criminal records, information from an online social network (e.g., an online profile, etc.), land records, department of motor vehicle records, and otherwise. In some embodiments a user's age or date of birth is evidenced through the user's membership in a group that requires members be of a certain age. In some embodiments a user's age or date of birth is evidenced through the provision of information such as information appearing in periodicals, newspapers, and the internet.

In some embodiments an attribute to be verified pertains to the health of a user. For example the user's blood type (e.g., A, B, AB, O) may be indicated. For example, the user's DNA sequence may be indicated (either in full or in part). For example, the user's status as currently having or not having a virus (e.g. measles, etc.), infection (e.g., bladder infection) or disease (e.g. chickenpox, a sexually transmitted disease, etc.) may be indicated. For example, the user's status as previously having a virus, infection, or disease may be indicated. For example, the user's allergies (including severity, symptoms, etc.) may be indicated. For example, the user's prosthetic limbs or artificial body parts (e.g., pacemaker, breast implants) may be indicated. For example, medical procedures the user has had performed (e.g., surgeries, flu shot, etc.) may be indicated. For example, the medications taken by the user may be indicated. For example, the user's past visits to a medical professional may be indicated. For example, any mental or emotional conditions the user has may be indicated. For examples, the broken or fractured bones the user has or has had may be indicated. For example, information pertaining to the user's eyesight may be indicated (e.g., nearsightedness, glasses prescription, contact lens prescription, etc.). For example, information pertaining to the user's life expectancy (e.g., as calculated from actuarial tables and/or considering other factors) may be indicated. For example, information pertaining to the user's use of a wheelchair, cane, scooter, walker or other mobility aid may be indicated.

In some embodiments information about a user's health is evidenced through the provision of an identity document, a government issued identification card, a health insurance card, or otherwise. In some embodiments information about a user's health is evidenced through the provision of statements, such as sworn statements, un-sworn statements, affidavits, testimony, and averments. In some embodiments information about a user's health is evidenced through the provision of records, such as vital records (e.g., marriage license, birth certificate, etc.), public records (e.g., census records, court records, etc.), medical records, health insurance records, receipts, church records, criminal records, information from an online social network (e.g., an online profile, etc.), department of motor vehicle records, and otherwise. In some embodiments information about a user's health is evidenced through the user's membership in a group that requires members have certain health conditions (e.g., Disabled American Veterans). In some embodiments information about a user's health is evidenced through the provision of information such as information appearing in periodicals, newspapers, or the internet.

In some embodiments an attribute to be verified pertains to the athletic ability of the user. For example, the user's ability to run a distance in a certain time (e.g., 40 yard dash time, mile run time, 1 kilometer run time, 5 kilometer run time, 10 kilometer run time, marathon run time, etc.) may be indicated. For example, the user's ability to jump a certain distance (e.g., long jump, triple jump, high jump, vertical jump, etc.) may be indicated. For example, the user's ability to swim a distance in a certain time (e.g., 50 meter freestyle time, 100 meter backstroke time, 200 meter butterfly time, etc.) may be indicated. For example, the user's ability to perform weightlifting may be indicated. The ability of a user to perform weightlifting may be indicated in terms of exercise performed (e.g., bench press, military press, bicep curls, pushups, etc.), amount of weight (e.g., 100 pounds), and number of sets and/or repetitions. For example, the user's participation on a team may be indicated. For example, the user's accolades and/or recognition in athletic endeavors may be indicated (e.g., athletic records held, membership of a championship team, team captain, all-conference honors, etc.). For example, the user's results in athletic or sporting competitions may be indicated (e.g., participation and/or result in Boston Marathon, winning best in show in a horse show.). For example, the user's ability to perform an athletic feat may be indicated to be greater than, less than, or equal to another person's ability to perform the same athletic feat.

In some embodiments information about the athletic ability of the user is evidenced through the provision of athletic records, depictions of athletic ability (e.g., videos of athletic feats performed by the user, etc.), or otherwise. In some embodiments information about a user's athletic ability is evidenced through the provision of statements, such as sworn statements, un-sworn statements, affidavits, testimony, and averments. In some embodiments information about a user's athletic ability is evidenced through the provision of records, such as public records (e.g., census records, court records, etc.), information from an online social network (e.g., an online profile, etc.), and otherwise. In some embodiments information about a user's athletic ability is evidenced through the user's membership in a group that requires members have athletic abilities (e.g., United States Olympic team member). In some embodiments information about a user's athletic ability is evidenced through the provision of information such as information appearing in periodicals, newspapers, or the internet.

In some embodiments an attribute to be verified pertains to events attended by the user. For example, the user's presence at a certain concert, meeting, festival, or sporting event may be indicated.

In some embodiments information pertaining to events attended by the user is evidenced through receipts, tickets, reservation confirmations, or other records. In some embodiments information pertaining to events attended by the user is evidenced through location-specific information. Such location-specific information may be information from a GPS-capable device indicating the user's physical location, an IP address, or otherwise. In some embodiments information pertaining to events attended by the user is evidenced through the provision of information such as token based identifiers. Token based identifiers may broadly include any piece of information that a certain individual is likely to have access to or able to generate if they attended a certain event, that other people would not have access to if they did not attend the event. Examples include ticket stubs, pictures of landmarks/structures and places known to exist as part of an event, including pictures indicating the user is or was present at a certain event. In some embodiments information pertaining to events attended by the user is evidenced through the provision of statements, such as sworn statements, un-sworn statements, affidavits, testimony, and averments. In some embodiments information pertaining to events attended by the user is evidenced through the provision of records, such as vital records (e.g., marriage license, birth certificate, etc.), public records (e.g., census records, court records, etc.), church records, criminal records, information from an online social network (e.g., an online profile, etc.), and otherwise. In some embodiments information pertaining to events attended by the user is evidenced through the provision of information such as information appearing in periodicals, newspapers, or the internet.

In some embodiments an attribute to be verified pertains to a subscription purchased by a user. For example the user's status as a customer of a certain subscription service (e.g. magazine subscription, cable TV subscription, wireless phone subscription, etc.) may be indicated. The details of the tier, level of service, company offering the subscription, package subscribed to, etc. may further be an attribute to be verified.

In some embodiments information pertaining to a subscription provided by the user is evidenced through the provision of login information to the subscription service's website. In some embodiments information pertaining to a subscription provided by the user is evidenced through the provision of a customer number or unique customer identifier.

In some embodiments an attribute to be verified pertains to donations made by the user. For example, the user's donations to a philanthropic cause, organization, political party, candidate, or otherwise may be indicated.

In some embodiments information pertaining to a donations made by the user is evidenced through the provision of tax receipts, tax records, donation receipts, sales receipts, correspondence, or otherwise. For example, the user's donation to a certain scholarship fund may be indicated.

In some embodiments an attribute to be verified pertains to persons physically present with the user presently or at some time in the past. For example, the user's presence with a certain friend last night or presently may be indicated.

In some embodiments information pertaining to persons physically present with the user presently or at some time in the past may be provided through information available on a website or online social network (e.g., pictures of the user with another person, status updates indicating the user is present with another person, etc.). In some embodiments information pertaining to persons physically present with the user presently or at some time in the past may be provided from a GPS-capable device indicating the user's physical location, an IP address, or otherwise used in combination with such information about another person. In some embodiments information pertaining to where a user lives or has lived is evidenced through the provision of statements, such as sworn statements, un-sworn statements, affidavits, testimony, and averments. In some embodiments information pertaining persons physically present with the user presently or at some time in the past is evidenced through the provision of records, including public records (e.g., census records, court records, etc.), church records, criminal records, information from an online social network (e.g., an online profile, etc.), and otherwise. In some embodiments information pertaining to persons physically present with the user presently or at some time in the past is evidenced through the provision of information such as information appearing in periodicals, newspapers, or the internet.

In some embodiments an attribute to be verified pertains to the education of a user. For example, the user's attendance at a certain school may be indicated. For example the user's highest level of education (e.g., some high school, high school graduate, some college, college graduate, etc.) may be indicated. For example, the user's course of study at a school may be indicated (e.g., American history, fine art, chemistry, engineering, music, etc.). For example, the user's completion of a degree, certificate, certification, or otherwise may be indicated. For example the acceptance of a user's application to a school may be indicated. For example, test results (e.g., SAT score or percentile, GRE score or percentile, etc.) of the user may be indicated.

In some embodiments information pertaining to the education of a user is evidenced through the use of information such as token based identifiers. Token based identifiers may broadly include any piece of information that a certain individual is likely to have access to or able to generate if they have had a certain educational experience, that other people would not have access to if they did not have that educational experience. Examples include school identification cards, pictures of landmarks/structures and places known to exist in at a certain educational institute, including pictures indicating the user is or was present at a certain educational institution, email addresses associated with certain educational institutes, etc. In some embodiments information pertaining to a user's education is evidenced through the provision of statements, such as sworn statements, un-sworn statements, affidavits, testimony, and averments. In some embodiments information pertaining to a user's education is evidenced through the provision of records, such as public records (e.g., census records, court records, etc.), academic records, degree certificates, transcripts, church records, criminal records, information from an online social network (e.g., an online profile, etc.), and otherwise. In some embodiments information pertaining to a user's education is evidenced through the provision of information such as information appearing in periodicals, newspapers, or the internet.

In some embodiments an attribute to be verified pertains to the gender of a user. For example, the user's gender may be indicated as male or female.

In some embodiments a user's gender is evidenced through the provision of an identity document, a government issued identification card, or otherwise. In some embodiments a user's gender is evidenced through the provision of a statement, such as a sworn statement, un-sworn statement, affidavit, testimony, or averment. In some embodiments a user's gender is evidenced through the provision of records, such as vital records (e.g., marriage license, birth certificate, etc.), public records (e.g., census records, court records, etc.), church records, criminal records, information from an online social network (e.g., an online profile, etc.), department of motor vehicle records, medical records, and otherwise. In some embodiments a user's gender is evidenced through the user's membership in a group that requires members be of a certain gender. In some embodiments a user's gender is evidenced through the provision of a visual depiction of the user. In some embodiments a user's gender is evidenced through the provision of information such as information appearing in periodicals, newspapers, or the internet.

In some embodiments an attribute to be verified pertains to whether a visual depiction is a depiction of a user. For example, an image, projection, or video may be indicated to depict a user.

In some embodiments a visual depiction to be verified as a depiction of a user may be compared to a visual depiction known to be a visual depiction of the user (e.g., through the visual depiction being part of an official record, through the visual depiction appearing as a depiction of a user in a newspaper or other publication, etc.). The verification may be performed by comparing the two visual depictions, where the comparison may be made through the use of computer processes (e.g., facial recognition, retinal recognition, etc.) or through subjective human comparison. In some embodiments a visual depiction to be verified may be verified by identifying a token based identifier within the depiction. Token based identifiers may broadly include any item that is likely to appear in a depiction of a particular user that would not appear in depictions of other people. Examples include a picture of a person holding up their identification card, picture of a person holding a note with a certain piece of information known only to that person, etc. In some embodiments a visual depiction to be verified as a depiction of a user is verified through the provision of statements, such as sworn statements, un-sworn statements, affidavits, testimony, and averments.

In some embodiments an attribute to be verified pertains to whether an audio sample includes the voice of a user. For example, an audio file or audio stream may be indicated to include the voice of a user.

In some embodiments an audio sample to be verified as the voice of a user may be compared to an audio sample known to be an audio sample containing the voice of the user (e.g., through the audio sample being part of an official record, through the audio sample containing the voice of a user in an online publication or other publication, etc.). The verification may be performed by comparing the two audio samples, where the comparison may be made through the use of computer processes (e.g., voice recognition algorithms, etc.) or through subjective human comparison. In some embodiments an audio sample to be verified as an audio sample containing the voice of the user is verified through the provision of statements, such as sworn statements, un-sworn statements, affidavits, testimony, and averments.

It should be understood that other attributes of users exist and may be verified, beyond the examples provided.

Additional Aspects of Example Embodiments

In some embodiments access to a virtual or online environment (e.g., as they exist within an online social network or a video game) is limited to individuals who have registered to access the virtual or online environment. Such registration may or may not require a fee. For example, a video game that has virtual environment may require individuals to register with a game server before they can access the video game. This may require an individual to provide their name, email address, choice of login/password, payment information, or other information. In some embodiments this registration information is submitted via the interne, either through email or through the individual submitting such information over a webpage. Similarly, in some embodiments the form of registration just described is used to allow an individual to register to access a virtual or online environment within an online social network.

In some embodiments entities have access to an online social network. These entities may be users, third parties (e.g., merchants, analytics companies, etc.), system administrators, service providers, or otherwise. In some embodiments entities have access to a video game. These entities may be video game players, third parties (e.g., merchants, analytics companies, etc.), system administrators, service providers, or otherwise.

In some embodiments a virtual game environment within a video game exists that represents, at least in part, a portion of the real world. Within the virtual game environment a user controls a character wherein the user's character has at least some attributes of the user. In some embodiments the virtual game environment within a video game exists as part of an online social network.

In some embodiments users of an online social network have attributes that are verified and accessible to other users of the online social network. An attribute to be verified in the online social network may be the user's ownership of an item, a physical characteristic of the user, a subjective description of the user, a verifiable fact about the user, or otherwise.

In some embodiments the virtual game environment of a video game may be edited, at least in part, by a user. In some embodiments the video game presents the user with tools to accomplish such editing. Such tools may include the ability to upload architectural plans, engineering plans, floor plans, sketches, drawings, CAD files, solid modeling files, 3D print files, or otherwise. Such tools may include the ability to link to databases that have information about the representation of the object or area to be edited in real life, where the video game environment is meant to represent the real world. Such tools may include the ability to generate structures, topographies, etc.

In some embodiments where the video game environment is meant to represent a portion of the real world, a user may edit the virtual game environment only to the extent that the user's real life ownership of the object or area to be modified has been verified. In some embodiments where the video game environment is meant to represent a portion of the real world, a user may edit an area in a virtual game environment regardless of ownership of that area in real life. In some embodiments where the video game environment is meant to represent a portion of the real world, a user may edit areas designated as public areas in a virtual game environment regardless of ownership of that space in real life. In some embodiments a user may edit the virtual game environment, with those edits subject to verification to ensure that the user's edits comport with the real life appearance of the object or area edited. In some embodiments where the video game environment is meant to represent a portion of the real world, a user may edit the virtual game environment, with those edits subject to acceptance by the real life owner of the object or area edited. In some embodiments a user may edit the virtual game environment, with those edits subject to acceptance by other users (e.g., through a vote). In some embodiments a user may edit the virtual game environment, with those edits subject to acceptance by a system authority. In some embodiments a user may edit the virtual game environment, with those edits subject to acceptance by a third party.

In some embodiments where the video game environment is meant to represent a portion of the real world, a user's edits to the virtual game environment may be submitted for verification to ensure that the user's edits comport with the real life appearance of the object or area edited. In some embodiments such verification is accomplished by comparing the user's edits with architectural designs, engineering plans, or other documentation that reflects the real-life appearance of the object or area edited. In some embodiments the representation of an object or area within the virtual game environment is compared to architectural designs, engineering plans, or other documentation that reflects the real-life appearance of the object or area, such that differences between the two bring about automatic edits in the representation of the object or area to make the representation comport with the real life appearance of the object or area. In some embodiments such verification is accomplished through a subjective evaluation performed by one or more humans.

In some embodiments sections of the virtual game environment are individually represented in a database. The database may exist on a server (e.g., a game server). The database entry for a section of the virtual game environment may have an identifier to uniquely indicate the portion of the game environment at issue. The database entry may further have information on the players who edited the section and information on how the virtual game environment should represent the portion the virtual game environment on the screen.

In some embodiments where the virtual game environment is designed to look like a portion of the real world, a verification status may indicate whether the portion indeed looks like the portion of the real world it is designed to look like. In some embodiments a user's edits to the virtual game environment may cause the object or area edited be indicated as either verified or unverified depending on whether the edits have been verified as comporting with the real life appearance of the object or area edited.

In some embodiments the weather in the virtual game environment may be made to reflect the current weather in the area represented in the virtual game environment. This may be accomplished through the use of computer networking, as information on the current weather conditions in areas across the globe is available over the internet from many well known sources (e.g., weather.com). In some embodiments the current weather in a location may be reported from a user who is physically located in the area, where that area of the virtual game environment is made to reflect the reported weather. For example, a user in Dallas, Tex. may indicate that it is currently sunny and 83 degrees outside. The representation of the Dallas, Tex. area within the virtual game environment may reflect the weather conditions reported by the user. In some embodiments the weather in a certain area of the virtual game environment may be updated only after a certain number of users physically in that area or a certain percentage of users physically in that area indicate that the weather conditions are of a certain nature.

In some embodiments the occurrences in the virtual game environment may be made to reflect the occurrences in the area represented in the game environment. This may be accomplished through the use of computer networking, as information on the current occurrences in areas across the globe is available over the internet from many well known sources (e.g., cnn.com). In some embodiments the occurrences in a location may be reported from a user, where that area of the virtual game environment is made to reflect the reported occurrence. For example, a user in Austin, Tex. may indicate that it is currently a music festival occurring in Zilker Park. The representation of the Zilker Park area within the virtual game environment may reflect the music festival reported by the user. In some embodiments the occurrence in a certain area of the virtual game environment may be updated only after a certain number of users physically in that area or a certain percentage of users physically in that area indicate that the occurrence exists.

In some embodiments admittance into areas of the virtual game environment may be limited to certain user's characters according to the user's verified attributes. For example, a character may not be able to enter the area in the virtual game environment representing the Hollytree Country Club unless the user of the character is verified to be a member of the Hollytree Country Club in real life. For example, a character may not be able to enter the area in the virtual game environment representing a nightclub that admits only persons age 21 and over in real life unless the user of the character is verified to be age 21 or older (e.g., the user has an attribute for their age that has been verified).

In some embodiments the virtual game environment within a video game may be created, at least in part, from reference to public sources (e.g., GIS database, Googlemaps databases, public records, etc.) in order to create a virtual game environment that resembles the real world.

In some embodiments a user may have to pay a subscription fee to play a video game where the user's attributes are verified. In some embodiments no subscription fee or a reduced subscription fee must be paid by a user to play the video game where the user's attributes are verified or if that user contributes to the construction of the virtual game environment (e.g., by uploading files to build out areas in the game environment that have not yet been construction, by creating representations of real life buildings within the virtual game environment, etc.).

In some embodiments a user may have to pay a subscription fee to access an online social network where the user's attributes are verified. In some embodiments no subscription fee or a reduced subscription fee must be paid by a user to access an online social network where the user's attributes are verified.

In some embodiments the representation of a user's character within the virtual game environment is created from a visual depiction of the user. The visual depiction of the user may be an image, video, body scan, or otherwise.

In some embodiments, once a user verifies that they own an item in real life as an attribute, that item may be represented in the game as owned by the user. In some embodiments, once a user verifies that they own an item that item may be represented in the game as owned by the user and the user may then use the representation of the item within the game. For example, once a user verifies that they own a blue 2012 Ford F-150, a representation of that truck may be available to the user's character within the virtual game environment. For example, this means the user's character could drive around in a representation of the F-150 within the virtual game environment.

In some embodiments, once a user indicates that they own an item in real life as an attribute, that item may be represented in the game as owned by the user. In some embodiments, once a user indicates that they own an item that item may be represented in the game as owned by the user and the user may then use the representation of the item within the game.

In some embodiments representations of items may be created for use in the virtual game environment. Such items may be created and may be edited, at least in part, by a user. In some embodiments the video game presents the user with tools to accomplish such editing. Such tools may include the ability to upload product specifications, architectural plans, engineering plans, floor plans, sketches, drawings, CAD files, solid modeling files, 3D print files, or otherwise. Such tools may also include the ability to upload information pertaining to product attributes (e.g., physical, color, size, etc.). Such tools may include the ability to link to databases that have information about the representation of the item to be edited in real life. Items may be edited in the same manner as portions of the video game environment may be edited in other embodiments disclosed herein.

In some embodiments the virtual game environment contains within it advertisements for products available in real life. For example, these advertisements may appear in the virtual game environment on billboards or on in-game television, website, or radio commercials. For example, a certain billboard in the virtual game environment may be a representation of a billboard existing in the real world. Instead of displaying the advertisement that exists on the billboard in the real world, the billboard in the virtual game environment may display an advertisement that has been purchased by an advertiser to display to video game players who see the billboard as it exists in the virtual game environment.

In some embodiments the advertisements found within the video game environment are selected based upon information about the user. For example, a certain billboard in the virtual game environment may be a representation of a billboard existing in the real world. Instead of displaying the advertisement that exists in the real world, the billboard in the virtual game environment may display an advertisement selected from among those that have been purchased by advertisers to display the advertisement in the in-game representation of the billboard as it exists in the virtual game environment. The advertisement may be selected according to criteria set by the advertiser (e.g., a women's clothing store wishes to advertise only to females) and/or by the video game player (e.g., the video game player only wishes to see advertisements for items that cost less than $25).

In some embodiments only those attributes that have been verified may be accessible to other users. In some embodiments only those attributes that have been sent for verification or have been verified may be accessible to other users. In some embodiments a user may make any of their attributes accessible to other users, whether or not they have been verified.

A user's attributes may be made accessible to other users in a number of manners. In some embodiments a user's attributes are provided in a user's profile, where that profile may be accessed by other users. For example, a user's profile may include information on the user's name, age, address, etc. In some embodiments a user's attributes may be represented through that user's character within a video game. For example, a user's attributes may include that they are a male with a height of 6'1", a weight of 170 pounds, with black hair and brown eyes. In such an example the user's character may be represented in the video game environment as being a male with a height of 6'1", a weight of 170 pounds, with black hair and brown eyes. In some embodiments a user's attributes are displayed on a popup when a cursor is moved over or in the vicinity of the representation of a user's character in a virtual game environment. In some embodiments a user's attributes are displayed upon clicking on a representation of the user's character within a virtual game environment.

In some embodiments a user's attribute accessible to another user is indicated through a verification indication to be either verified, unverified, or with verification pending. It is to be understood that the terms "verified", "unverified", and "verification pending" may be implemented in any number of ways (e.g., using colored markers where, for example, green means "verified", red means "unverified", and yellow means "verification pending"; through different sounds, where, a first sound means "verified", a second sound means "unverified", and a third sound means "verification pending"). Moreover, implementations using words expressing the same or similar concepts as "verified", "unverified", and "verification pending" may exist within a verification indication. Examples include the use of words such as "confirmed", "unconfirmed", and "confirmation pending"; "validated", "not validated", "validation pending"; "authenticated", "not authenticated", and "authentication pending". Moreover, in some embodiments a verification indication also allows for a representation of "verification failed" and related concepts.

In some embodiments the status of a user's attribute (e.g., within a verification indication) comprises a confidence score, confidence level, a percentage, or otherwise. For example, a user's attribute may be verified with 99% confidence score. For example, a user's attribute may be indicated to be verified by 70% of those users voting on it. In some embodiments a user's attribute may be indicated to be not verifiable (e.g., given a lack of information about the user available in public and private databases that the value of the attribute is to be compared with).

In some embodiments the status of a user's attribute may be indicated to have failed to have been verified. For example, evidence may be submitted for the purpose of verifying the value of an attribute, and that evidence is found to not verify the value of the attribute (e.g., through the use of a threshold that is set or through user votes). The status of that attribute may be "validation failed", "authentication failed", or another similar expression.

In some embodiments a user receives an email, text message, phone call, instant message, notification, or other communication to notify the user that the process of verifying their attribute has been completed. In some embodiments the result of the verification process is communicated to the user at that time.

In some embodiments the history of attributes that a user has sent for verification may be accessible to other users. For example, records of each time a user has submitted an attribute for verification, the nature of the attribute sent to be verified, the values of the attributes sent to be verified, the date that the attribute was sent to be verified, and the result of the verification process for each attribute sent to be verified may be accessible to other users. In some embodiments a user rating is calculated according to the history of attributes that a user has sent for verification and the result of the verification processes for such attributes.

In some embodiments a user may indicate that they have a certain value for an attribute, and no one else. For example, a user may indicate that they are unemployed, but no one else can indicate the value of the user's employment status. In some embodiments any user may indicate that any other user has certain value for an attribute. For example, any user may indicate that a given user's employment status is unemployed.

In some embodiments a user may choose which attributes to submit for verification. In some embodiments each attribute of a user is submitted for verification. In some embodiments one or more attribute of a user is submitted for verification where the selection of the attributes submitted for verification is randomly selected. In some embodiments one or more attribute of a user is submitted for verification where the selection is based upon the selection of one or more user. In some embodiments users enter attributes and those attributes are periodically submitted for verification without further action by the user. In some embodiments users' attributes are submitted for verification at or around the time values for the attributes are created. It should be understood that "verification of an attribute" and similar language used within this specification means that the value of the attribute is submitted for verification, as disclosed elsewhere in this specification.

In some embodiments other users may access the information used to verify an attribute of another user (e.g., access the records used in the verification process). In some embodiments such access may come at a cost to the user requesting access.

In some embodiments there is a cost to submit an attribute of a user for verification. Such cost may be paid by the user whose attribute is to be verified, another user, or another entity. In some embodiments there is no cost to submit an attribute of a user for verification.

In some embodiments there is a cost to allow other users to access an attribute of a user. For example, a cost may be associated with a user allowing their attribute to be accessed by other users. For example, a cost may be associated with a user accessing the attributes of another user. Such cost may be paid by the user whose attribute is to be accessed, the user who wishes to access the other user's attribute, another user, or another entity. In some embodiments there is no cost to allow other users to access an attribute of a user.

In some embodiments there is a cost associated with sharing a verification indication (e.g., status) for an attribute of one user with another user. For example, a cost may be associated with a user accessing the status of the attributes of another user. Such costs may be paid by the user whose attribute status is to be accessed, the user who wishes to access the other user's attribute status, another user, or another entity. In some embodiments there is no cost to allow other users to access an attribute status of a user.

In some embodiments there is a cost for a user to register as part of the virtual or online environment that exists within a video game or online social network. For example, as part of registration an individual may have to supply credit card information, virtual payment information, or other information to pay a registration fee. Only after the fee is paid is the individual registered as a user that can access the virtual or online environment (e.g., they have no username and password until that point). In some embodiments registration is a process that must be completed before an individual can become a user of an online social network or online video game.

In some embodiments the status of an attribute (e.g., verified, unverified, verification pending, etc.) of hypothetical User A may not be accessible to hypothetical User B without further action. For example, User B may have to request that User A grant User B access to the status of User A's attribute. Once User A grants access to the status of the attribute User B may access the status of the attribute. For example, a cost may be associated with User B accessing the status of User A's attribute, where only after that cost is paid can User B access the status of User A's attribute. Such cost may be paid by the user whose attribute is to be accessed, the user who wishes to access the other user's attribute, another user, or another entity. In some embodiments there is no cost to allow other users to access the value of an attribute of a user, but there are other conditions for such access. For example, User B may not be able to access the status of User A's attribute until User B submits that same attribute for verification themselves (e.g., if User B wishes to see the status of User A's income attribute User B must first verify their own income attribute). For example, User B may not be able to access the status of User A's attribute until that same attribute is verified for User B (e.g., if User B wishes to see the status of User A's hairstyle attribute User B must first verify their own hairstyle attribute). For example, User B may not be able to access the status of User A's attribute until User B has performed a certain game task (e.g., created a certain amount of structures in the virtual game environment, playing the game a certain amount of time, etc.). For example, User B may not be able to access the status of User A's attribute until User B has referred a certain number of users to play the game (e.g., through a referral program where new users can identify users that referred them).

In some embodiments the status of an attribute (e.g., verified, unverified, verification pending, etc.) of hypothetical User A may be accessible to hypothetical User B. However, the value of the attribute (e.g., if the attribute is height, the value would be 5'6") may not be accessible to the User B without further action. For example, User B may have to request that User A grant User B access to the value of User A's attribute. Once User A grants access to the value of the attribute User B may access the value of the attribute. For example, a cost may be associated with User B accessing the value of User A's attribute, where only after that cost is paid can User B access the value of User A's attribute. Such cost may be paid by the user whose attribute value is to be accessed, the user who wishes to access the other user's attribute value, another user, or another entity. In some embodiments there is no cost to allow other users to access the value of an attribute of a user, but there are other conditions for such access. For example, User B may not be able to access the value of User A's attribute until User B submits that same attribute for verification themselves (e.g., if User B wishes to see the value of User A's wealth attribute User B must first verify their own wealth attribute). For example, User B may not be able to access the status of User A's attribute until that same attribute is verified for User B (e.g., if User B wishes to see the status of User A's criminal record attribute User B must first verify their own criminal record attribute). For example, User B may not be able to access the value of User A's attribute until User B has performed a certain game task (e.g., created a certain amount of structures in the virtual game environment, playing the game a certain amount of time, etc.). For example, User B may not be able to access the value of User A's attribute until User B has referred a certain number of users to play the game (e.g., through a referral program where new users can identify users that referred them).

In some embodiments a user's character may be able to access certain functionality within the virtual game environment, depending on the user's status as a customer of a certain subscription service.

For example, in a video game a user's character may be able to access certain television channels on a representation of a television within the virtual game environment once it is verified that the user subscribes to that television channel. The television shows accessible by the user in the virtual game environment may be television shows that are currently available for viewing on real life television. The television shows accessible by the user in the virtual game environment may be television shows that are available for viewing on the user's DVR system. When the character watches television within the game environment the usual game displays may be removed such that the television show may be viewed full screen during the duration of the show for the enjoyment of the user.

For example, a user's character may be able to access certain educational classes within the virtual game environment once it is verified that the user subscribes to or is enrolled in those educational classes. The educational classes accessible by the user in the virtual game environment may be the educational classes currently available to the user within the real world.

For example, a user's character may be able to access certain websites on a computer within the virtual game environment once it is verified that the user subscribes to that website. The websites accessible by the user in the virtual game environment may be websites that are currently available for viewing on real life computers. When the character accesses a computer within the game environment the usual game displays may be removed such that the computer screen within the game environment be viewed full screen during the duration of session that the user's character accesses the computer in the virtual game environment.

In some embodiments a representation of school exists in the virtual game environment, where classes are held in the virtual game environment. The user's character may attend classes in the virtual game environment if the user has verified their status as a student in the real life version of the school that is represented in the virtual game environment. The user may interact with instructors and/or other students associated with the school within the virtual game environment. The user may also access educational material within the virtual game environment. In some embodiments a school may exist in the video game environment that does not exist in the real world.

In some embodiments a movie theatre in the virtual game environment representing a real life movie theatre offers movies to be watched by a player's character. The movies shown by the movie theatre in the virtual game environment may be theatrical releases that are currently available for viewing at the real life theatre. Within the representation of the movie theatre within the virtual game environment the user's character may purchase a ticket and enter the movie theatre. In some embodiments watching such movies does not involve a fee. The usual game displays may be removed such that the feature film may be viewed full screen during the duration of the film for the enjoyment of the user.

In some embodiments information about attributes of a user is sent to a third party. The third party may use the information about the user to generate a profile of the user for use with analytics processes. In some embodiments a user is able to access the information sent to third parties about the user. In some embodiments a user may opt-in or opt-out of third parties being sent information about the user's attributes. In some embodiments a user may determine which information from their attributes is sent to a third party for use with analytics processes. In some embodiments a user may opt-out of third parties being sent information about the user's attributes for a fee. In some embodiments the ability to opt-out of third parties being sent information about a user's attributes becomes available only when the user performs certain tasks (e.g., refers users to the system, performs certain game tasks, etc.) In some embodiments the information about attributes of a user is, for example, the value or status (e.g., a verification indication).

Verification of User's Attributes in Example Embodiments

In some embodiments the verification of a user's attribute involves that user sending information to a verification entity, wherein the information sent to the verification entity is information to be used in verifying that the attribute is properly attributed to the user. The verification entity may thereafter issue its determination of whether or not the attribute is verified as being attributable to the user. For example, where the attribute to be verified is the user's name the user may send a verification entity a scanned image of the user's birth certificate.

In some embodiments the verification of a user's attribute involves a user or entity other than the user whose attribute is to be verified sending information to a verification entity, wherein the information sent to the verification entity is information to be used in verifying that the attribute is properly attributed to the user. The verification entity may thereafter issue its determination of whether or not the attribute is verified as being attributable to the user. For example, User A may send a verification entity a scanned image of a marriage certificate that shows User B was married on a certain date, to evidence the marital status of User B.

In some embodiments the verification of an attribute attributed to a user involves that user sending information to a verification entity, wherein the information sent to a verification entity is information indicating where evidence to verify the attribute may be found. For example, where the attribute to be verified pertains to the user's body type, a user may send a verification entity a URL that points to a website that has evidence of the user's physical appearance (e.g., evidence in the form of pictures on the website).

In some embodiments more than one piece of information is used to verify that an attribute is attributable to a user. For example, a marriage certificate (showing the user's marriage to their spouse) in combination with a birth certificate (showing that the user's spouse gave birth to a son and that the user is not one of the parents listed on the birth certificate) may be used to verify that a user has a familial relation with that user's step son.

In some embodiments the verification of a user's attribute involves a user purporting to have a certain attribute, where thereafter other users may evaluate evidence presented by the user and the other users may make a determination of whether the evidence provided by the user is sufficient to evidence that the user has the purported attribute. In some embodiments once a certain number of users determine that the evidence provided by the user is sufficient to evidence that the user does have the purported attribute then the user's attribute is deemed to be verified. In some embodiments once a certain percentage of users (e.g., out of all registered users or a subset thereof) determine that the evidence provided by the user is sufficient to evidence that the user does have the purported attribute then the user's attribute is deemed to be verified. In some embodiments once a certain number of users deter nine that the evidence provided by the user is not sufficient to evidence that the user has the purported attribute then the user's attribute is deemed to be not verified. In some embodiments once a certain percentage of users (e.g., out of all registered users or a subset thereof) determine that the evidence provided by the user is not sufficient to evidence that the user has the purported attribute then the user's attribute is deemed to be not verified.

In some embodiments the verification of a user's attribute involves a user purporting to have a certain attribute, where thereafter other users may make a determination of whether the user has the purported attribute given their knowledge of the real life attributes of the user. In some embodiments once a certain number of such other users determine that the user does have the purported attribute then the user's attribute is deemed to be verified. In some embodiments once a certain percentage of such other users (e.g., out of all registered users or a subset thereof) determine that the user does have the purported attribute then the user's attribute is deemed to be verified. In some embodiments once a certain number of such other users determine that the user does not have the purported attribute then the user's attribute is deemed to be not verified. In some embodiments once a certain percentage of such other users (e.g., out of all registered users or a subset thereof) determine that the user does not have the purported attribute then the user's attribute is deemed to be not verified.

In some embodiments where users evaluate evidence presented by other users of a virtual or online environment, any user registered to participate in the virtual or online environment may access such evidence. In some embodiments where users evaluate evidence presented by other users of a virtual or online environment, any user registered to participate in the virtual or online environment may provide feedback (e.g. a vote) on such evidence to indicate whether the evidence sufficiently shows that an attribute of a user is as presented.

In some embodiments where users evaluate evidence presented by other users of a virtual or online environment, a subset of users registered to participate in the virtual or online environment may access such evidence. In some embodiments where users evaluate evidence presented by other users of a virtual or online environment, a subset of users registered to participate in the virtual or online environment may provide feedback (e.g. a vote) on such evidence to indicate whether the evidence sufficiently shows that an attribute of a user is as presented.

In some embodiments the status of a user's attribute may change over time. For example, additional information may be submitted to verify an attribute of a user, where that additional information changes the status of the attribute as verified or not. For example, the status of an attribute as verified or not may be subject to vote by other users, where a certain percentage of users must vote to verify the attribute as attributable to the user. Over time that percentage may change, and as a result the status of the attribute as verified or not may change. In some embodiments the status of a user's attribute may be set as either verified or not verified and not changed thereafter.

In some embodiments the verification of a user's attribute involves a user providing evidence that represents a streaming connection to a recording device. For example, a user may verify their weight by standing on a scale and indicating the measurement of the scale as they step on it with a camera that provides a live feed.

In some embodiments the evidence used by the user to verify their attributes may be made accessible to other users. For example, if a user purports to be the Director of Sales for a certain company and evidences their job title by uploading a copy of their business card, the uploaded copy of the user's business card may be made accessible to other users.

In some embodiments the verification entity is an identity verification service. In some embodiments the verification entity is an online social network. In some embodiments the verification entity is an entity that makes the information provided as evidence available to a number of individuals for verification (e.g., supplies the information to a committee of individuals, uses crowdsourcing, etc.). In some embodiments the verification entity is the administrator of a website. In some embodiments the verification entity exists as software, logic and/or computer programming on a video game server, web server, or other networked computer. In some embodiments the verification entity is a third party. In some embodiments the verification entity is a central authority within a given video game or online social network. In some embodiments the verification entity is a government entity. In some embodiments the verification entity is one or more individuals accessing an online social network or video game.

In some embodiments the verification entity is one or more administrators associated with a virtual or online environment (e.g., within a video game or within an online social network). In some embodiments an administrator associated with a virtual or online environment is one or more human individuals. In some embodiments an administrator associated with a virtual or online environment exists as software and/or hardware within a computer system.

In some embodiments once a user's identity has been verified additional public and/or private databases may be accessed to verify additional attributes about the user. In some embodiments the user is provided with the ability to confirm the additional attributes uncovered from public and/or private databases. The additionally confirmed attributes may be indicated as verified.

In some embodiments an administrator associated with a virtual or online environment may receive evidence from one or more individuals accessing the online social network or video game that the virtual or online environment is associated with. For example, in some embodiments User A of a certain video game may supply evidence related to an attribute User B of the same video game for the purpose of verifying that attribute about User A. Through computer networking such evidence may be supplied by User A to a game server and from the game server that evidence is then received by an administrator associated with the video game.

In some embodiments a user may choose which attributes to make accessible to other users, For example, a user may not wish to share their date of birth with other users and therefore prevent other users from accessing such information. In an embodiment a user may not make attributes accessible to other user unless the status of those attributes has been verified.

In some embodiments a user may be required to pay a fee to verify an attribute about themselves (e.g., 5 cents per attribute). In some embodiments a user may have a given amount of attributes that may be verified about themselves without a fee (e.g., 100 attributes a month). In some embodiments a user may be required to pay a fee to verify certain attributes about themselves that varies according to the attribute to be verified (e.g., 25 cents to verify the user's ownership of a vehicle, no fee to verify the user's familial relationships).

In some embodiments a user may be required to pay a fee to prevent a verified attribute from being accessible to other users. For example a user whose marital status is verified to be single may have to pay five cents per month to prevent users from being able to access the value of the user's marital status.

In some embodiments, the verification of a user's attribute is performed by comparing information provided about the user's attribute with information stored in a database. Three steps may be involved in the verification process. First, information about the attributes of a user are collected and stored a database. This may occur long before the user ever attempts to verify their attributes. Second, threshold levels are set to determine whether a user's purported attribute is verified, according to the degree of match between the information held in the database and the information provided to evidence a user's attribute. Third, information about a user is compared to the information held in the database, and from the information about the user and the threshold levels set in the second step, the system returns a result that the attribute is verified or is not verified as attributable to the user. In an alternative embodiment the system returns a result that the attribute is verified with a certain confidence level, cannot be verified (e.g., because of lack of information in a database about a user), or otherwise.

In an embodiment, an attribute may be the identity of an individual, where once a user's identity is verified other attributes may be verified as properly attributable to the user. For example, using the process above, in the first step the name of a person is collected and stored in the database. In this example, the name of the person collected and stored in the database is "John Randall Smith". In the second step the threshold levels are set to determine whether a user claiming to be John Randall Smith provides information that is sufficient to establish that they actually are John Randall Smith. In this example the threshold level is set such that the letters and spacing of the user's name exactly match "John Randall Smith" in order for the identity of the person to be verified as John Randall Smith. This means, for example, a user that supplies the name as being any of ""JohnRandall Smith", J. Randall Smith", "J. R. Smith", "John Smith", or "Randall Smith" will not be verified. Only when a user supplies their name as "John Randall Smith" will their identity be verified as that of John Randall Smith in this example. In the third step a user claiming to be John Randall Smith supplies information to the system. The information supplied is the name "John Randall Stith" (last name "Stith", not "Smith"). This information is compared to the information held in the database. Using the threshold level set in the second step, the system determines that the information supplied by the user is not adequate to verify that the user is John Randall Smith. This is because the threshold criteria has not been met, since the information supplied by the user is the name "John Randall Stith" (last name "Stith", not "Smith") and the only acceptable name that could be submitted to verify the identity of the user was John Randall Smith was "John Randall Smith".

In some embodiments the system performs a one-to-many comparison against a database in an attempt to verify the identity of a user. The system will verify the user as being a certain individual who has information in the database if the comparison of the information supplied about the user (e.g., name, date of birth, etc.) falls within a previously set threshold when compared to the information of that individual in the database. This can be used to positively verify the identity of a user, as above, and may also be used to determine that the user is not a certain individual.

In some embodiments sworn statements, un-sworn statements, affidavits, testimony, and averments may be provided as evidence that a user has a particular attribute. For example, a user may indicate that a representation they make about an attribute is truthful under penalty of perjury. For example, a user may indicate that a representation they make about an attribute is truthful through the provision of a copy of prior sworn testimony related to the same (e.g., from a legal proceeding), through an affidavit related to the same, or by making the representation about the attribute under oath. An oath or averment may be made electronically in some embodiments. In some embodiments a user makes a statement electronically over the internet in the physical presence of a notary public or other official qualified to administer oaths. In another embodiment a user makes a statement electronically over the internet while connected electronically to a notary public or other official qualified to administer oaths (e.g., through video conferencing, through telephone, through shared computer screens, etc.). In another embodiment a user makes a statement electronically over the internet while not physically present with or connected to a notary public or other official qualified to administer oaths.

Referring now to the drawings, and more particularly to FIG. 1, a block diagram is shown depicting a system for use in an embodiment of the invention employing a user profile. User profile 100 contains information specific to a user. User profile 100 contains several attribute entries, including attribute 1 entry 102, attribute 2 entry 104, and attribute N entry 106. User profile 100 may contain other elements, or less than all of the elements illustrated in FIG. 1. It should be appreciated that FIG. 1 illustrates N attribute entries within user profile 100. Embodiments of the invention may exist where N is any integer greater than zero.

Figure 2:
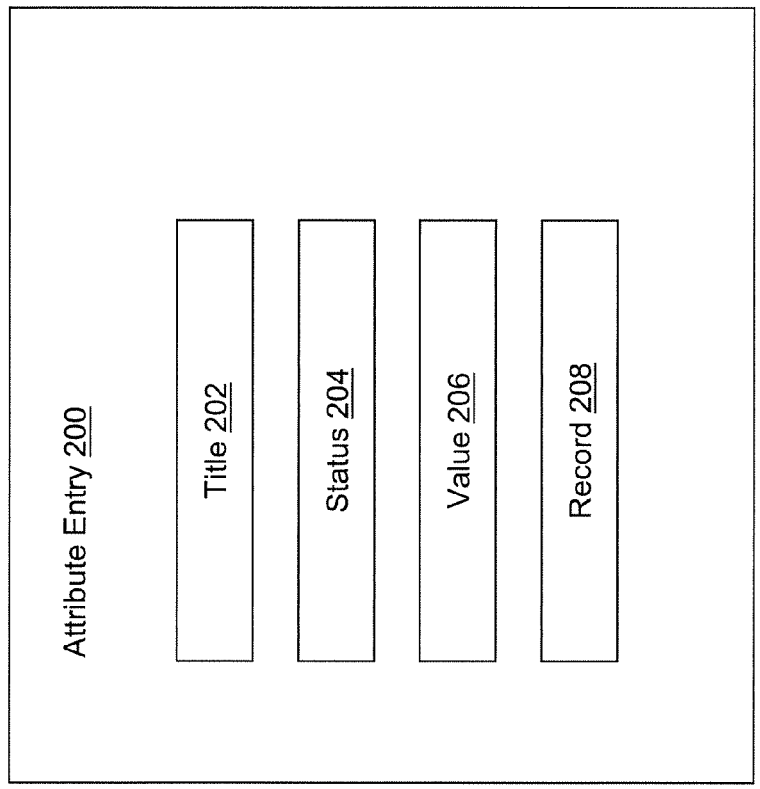
FIG. 2 is a block diagram depicting a system for use in an embodiment of the invention employing an attribute entry.

FIG. 2 is a block diagram depicting a system for use in an embodiment of the invention employing an attribute entry. Attribute entry 200 contains information specific to an attribute of a user. Attribute entry 200 comprises title 202, status 204, value 206, and record 208. Title 202 indicates the title of the attribute (e.g., height, items owned, income, etc.). Status 204 indicates the status of the attribute as it concerns the verification of the value of the attribute (e.g., a verification indication). For example, status may take the values "verified", "not verified", "pending verification", "unable to be verified", etc. Value 206 is the value of the attribute. For example, if the attribute to be verified is height, the value of the attribute may be 5'2". Record 208 indicates some or all of the history of the attribute entry. For example, record 208 may contain information on the user that created attribute entry 200, the time that attribute entry 200 was created or modified, details of the modifications made to attribute entry 200 and the values therein, or otherwise. Each of title 202, status 204, value 206, and record 208 may be altered over time. Attribute entry 200 may contain other elements, or less than all of the elements illustrated in FIG. 2. Attribute entry 200 may be used to provide information specific to a user, for example as shown and discussed in reference to Attribute 1 entry 102, Attribute 2 entry 2, and Attribute N entry 106 as discussed and depicted in connection with FIG. 1.

Figure 3:
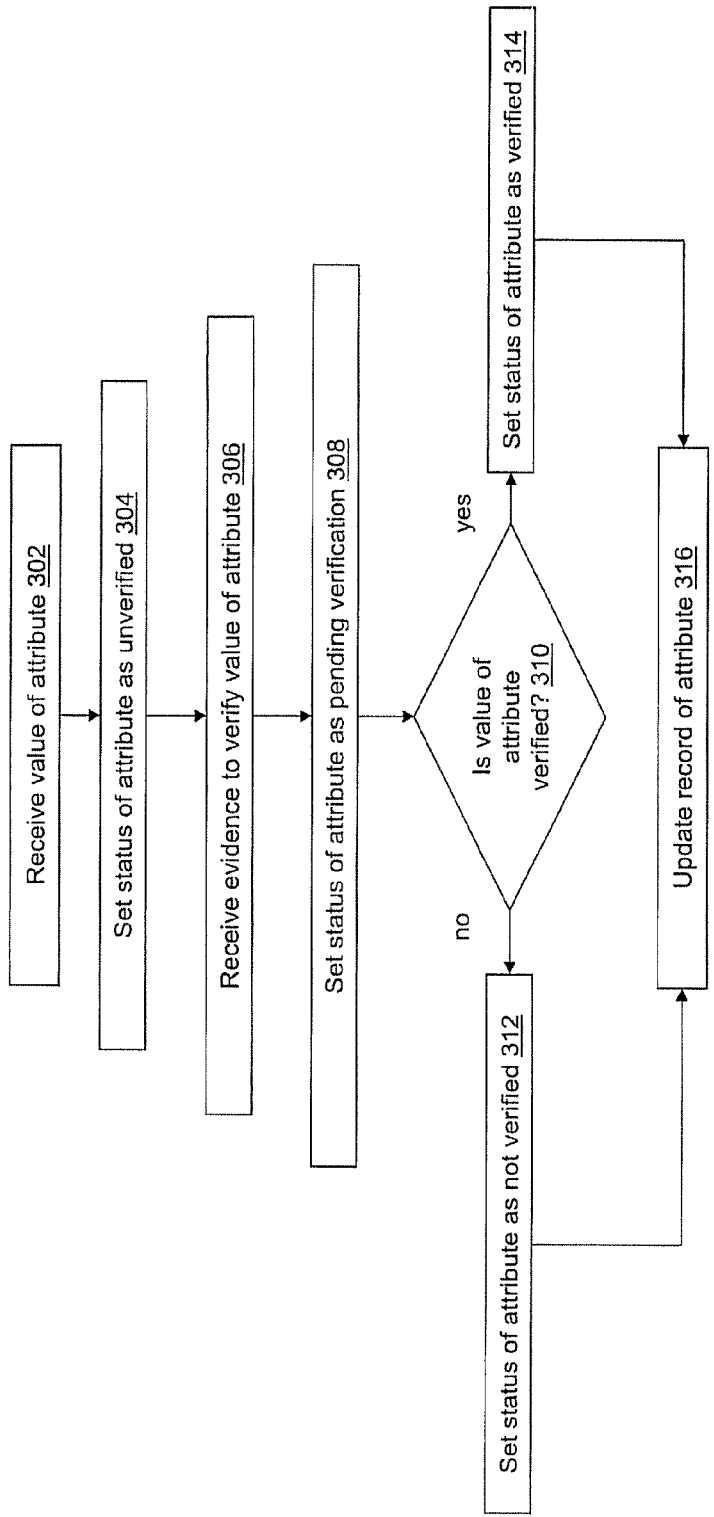
FIG. 3 is a flowchart of a method that may be used for implementing verification of the value of a user's attribute in some embodiments.

FIG. 3 is a flowchart of a method that may be used for implementing verification of the value of a user's attribute in some embodiments. The value of an attribute is received (block 302). The status of the attribute that is received is set as "unverified" (block 304). Evidence is received to verify the value of the attribute that is received (block 306). The status of the attribute that was received is then set to "verification pending" (block 308). The value of the attribute then undergoes the verification process (block 310). If the value of the attribute is not verified then the status of the attribute is set as not verified (block 312). If the value of the attribute is verified then the status of the attribute is set as verified (block 314). Regardless of whether the value of the attribute is verified, the record of the attribute is updated (block 316). It should be understood that the record of the attribute may be updated throughout the steps of the flowchart depicted in FIG. 3, and not only at block 316.

Figure 4:
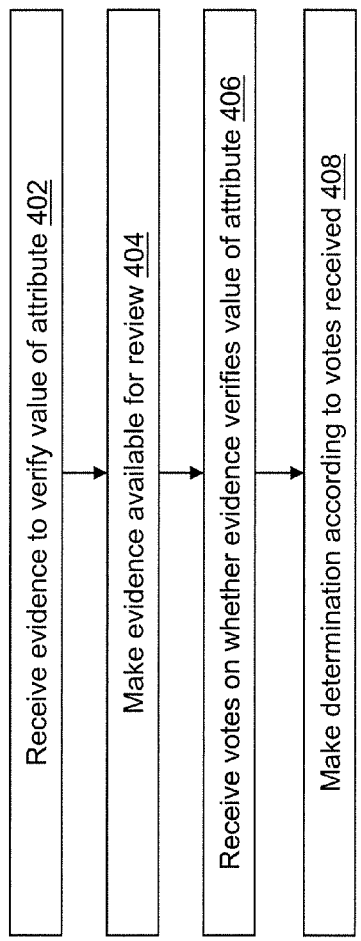
FIG. 4 is a flowchart of a method that may be used for implementing verification of the value of a user's attribute in some embodiments.

FIG. 4 is a flowchart of a method that may be used for implementing verification of the value of a user's attribute in some embodiments. Evidence to verify a value of an attribute is received (block 402). Evidence may be any information provided to establish that an attribute is property attributable to a user. The evidence is then made available to review (block 404). The evidence may be made available to different users of the system, for example. The evidence may be made available for review for only a certain amount of time or may be made available only to certain users (e.g., users in a certain geographic region). Votes are then received on whether the evidence verifies the value of the attribute (block 406). The votes may be of the form "verified" or "not verified", for example. A determination of whether the value of the attribute is verified or not is then determined according to the votes received (block 408). The determination may be made according to the number or percentage of votes received that are listed as "verified". In an example the value of an attribute is verified only when greater than 95% of the received votes indicate that the value of the attribute is verified.

Figure 5:
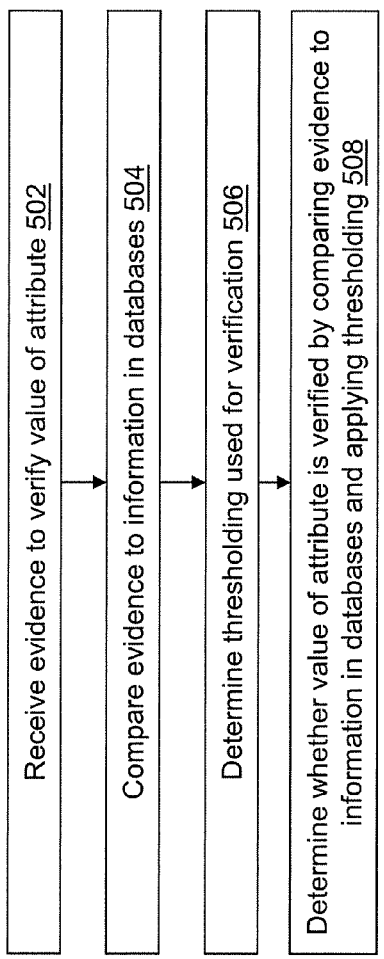
FIG. 5 is a flowchart of a method that may be used for implementing verification of the value of a user's attribute in some embodiments.

FIG. 5 is a flowchart of a method that may be used for implementing verification of the value of a user's attribute in some embodiments. Evidence to verify a value of an attribute is received (block 502). Evidence may be any information provided to establish that an attribute is properly attributable to a user. The evidence is then compared to information existing in databases (block 504). The information existing in databases may exist in public or private sources. The information existing in databases may be accessed through computer networking (e.g., over the internet). A thresholding for the determining if a value of an attribute is verified is then determined (block 506). A determination is then made of whether the attribute is verified by comparing evidence to the information in databases and applying thresholding (block 508). In some embodiments information existing in a single database is used. In some embodiments information existing in multiple databases is used.

Figure 6:
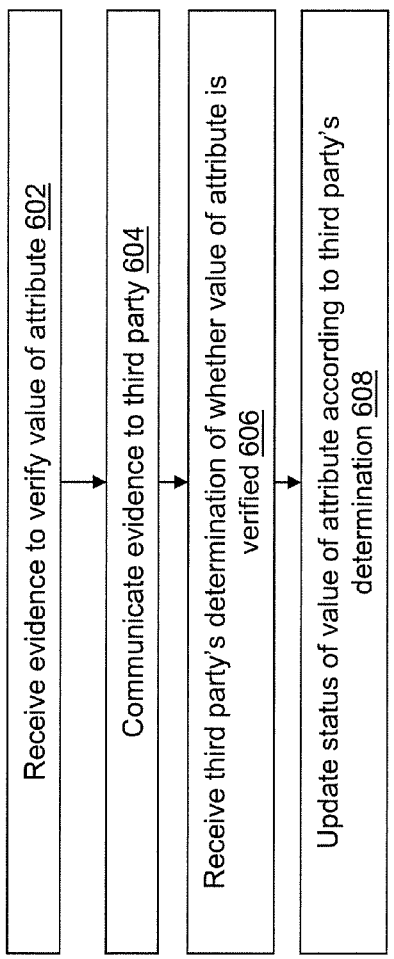
FIG. 6 is a flowchart of a method that may be used for implementing verification of the value of a user's attribute in some embodiments.

FIG. 6 is a flowchart of a method that may be used for implementing verification of the value of a user's attribute in some embodiments. Evidence to verify a value of an attribute is received (block 602). The evidence is then communicated to a third party (block 604). The third party may be an identity verification service, one or more user of the system, or otherwise. Thereafter the third party's determination of whether the value of the attribute is verified is received (block 606).

The status of the value of the attribute is then updated according to the third party's determination (block 608).

Figure 7:
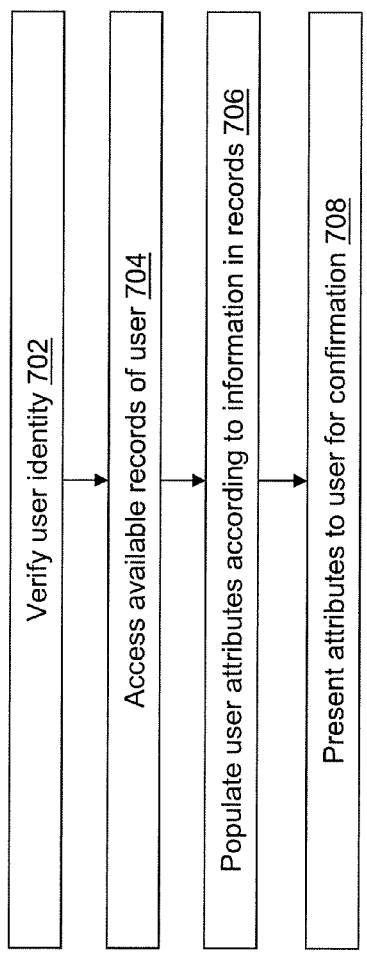
FIG. 7 is a flowchart of a method that may be used for implementing verification of the value of a user's attribute in some embodiments.

FIG. 7 is a flowchart of a method that may be used for implementing verification of the value of a user's attribute in some embodiments. A user's identity is verified (block 702). The verification of a user's identity may be accomplished through the user providing personally identifiable information (e.g., name, biometric sample, social security number, login and password to a website, etc.) or otherwise. The verification of a user's identity may be accomplished through the use of an identity verification service. Once the user's identity is verified, available records of the user are accessed (block 704). These records may be found in public or private databases. These records may also be found online, through the use of the interne or otherwise. For example, department of motor vehicle records may be accessed. For example, information mined for a user's online social network profile may be accessed. The user's attributes are then populated according to the information in the records (block 706). This may include creation of entries for attributes that previously did not exist. For example, a user's identity may be verified by the provision of their social security number and that user's records at the department of motor vehicles may be accessed. Once the user's record at the department of motor vehicles is accessed that record may indicate the user's date of birth, eye color, hair color, and height. The value of the user's attributes for date of birth, eye color, hair color, and height will then be created and populated (or updated) according to the information provided in the department of motor vehicles record. Thereafter, the attributes that have been populated are presented to the user for confirmation (block 708). Specifically, the user will be able to see and review the values of the attributes that have been populated. The values of the attributes may be accepted or rejected by the user. The attributes that have their values accepted by the user may be deemed confirmed. The attributes that have their values rejected may be removed from the user's profile.

Figure 8:
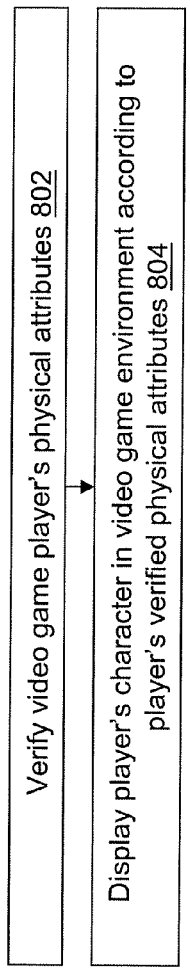
FIG. 8 is a flowchart of a method that may be used for displaying a video game player's character in some embodiments.

FIG. 8 is a flowchart of a method that may be used for displaying a video game player's character in some embodiments. A video game player's physical attributes are verified (block 802). For example, a video game player's hair may be verified as being blonde and shoulder length. This verification may be accomplished as disclosed elsewhere herein. The player's character is displayed in the video game environment according to the player's verified physical attributes (block 804). Continuing the previous example, this means that the player's character is displayed in the video game environment to have blonde and shoulder length hair.

Figure 9:
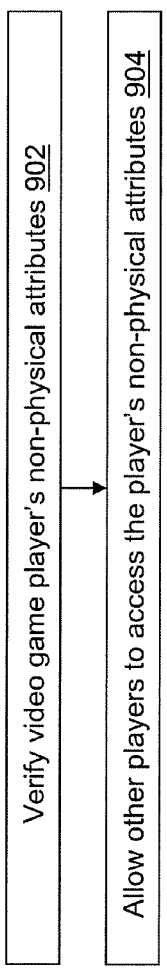
FIG. 9 is a flowchart of a method that may be used for displaying attributes associated with a video game player in some embodiments.

FIG. 9 is a flowchart of a method that may be used for displaying attributes associated with a video game player in some embodiments. A video game player's non-physical attributes are verified (block 902). For example, a video game player's income may be indicated to be $30,000 a year. This verification may be accomplished as disclosed elsewhere herein. The player's verified non-physical attributes may be accessed by other players in a multiplayer video game (block 904). Continuing the previous example, this means that the player's income of $30,000 a year is accessible by other players within the video game (e.g., by clicking on the player's character to bring up information about the player's verified attributes).

Figure 10:
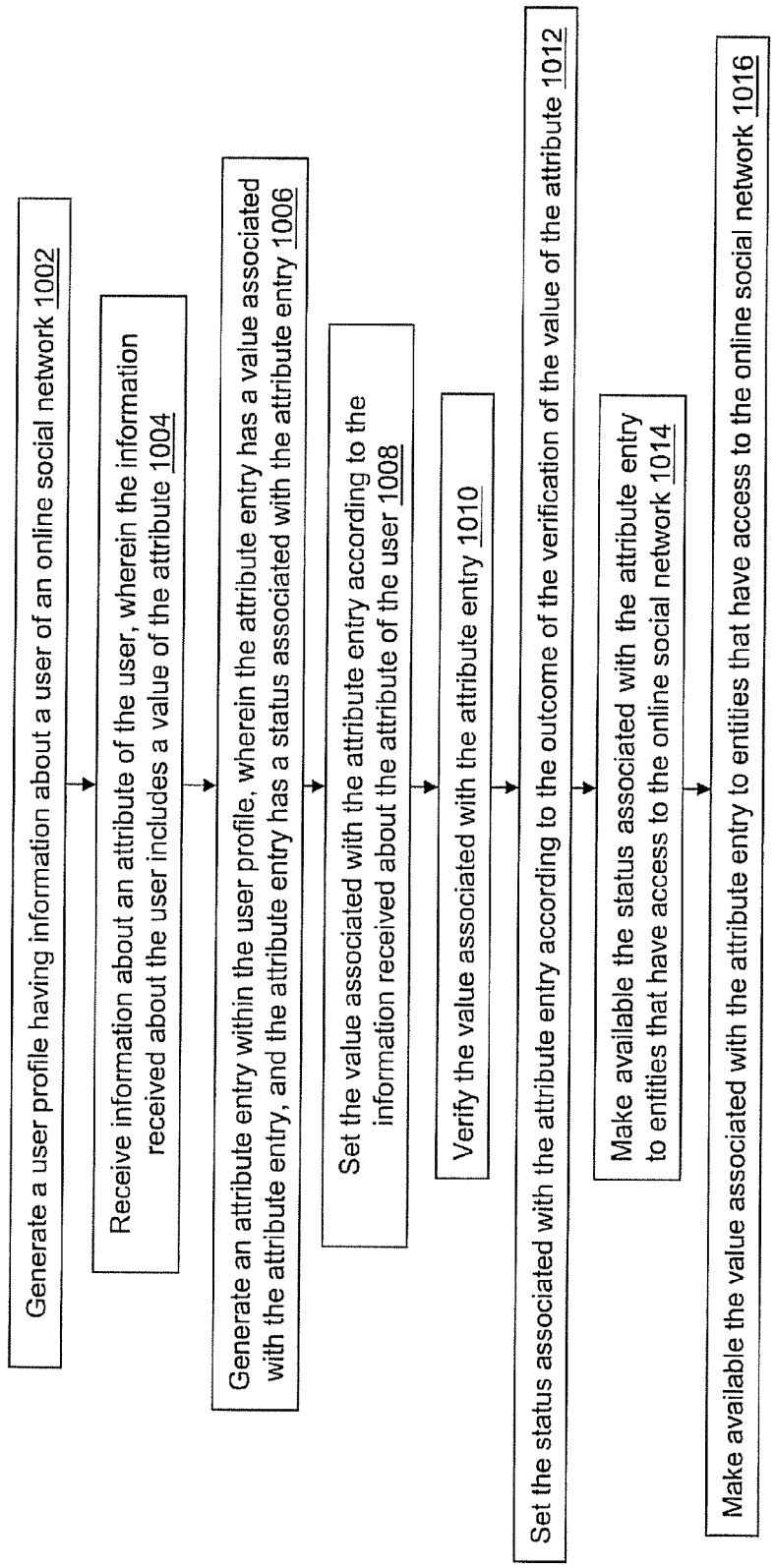
FIG. 10 is a flowchart of a method that may be used for generating a user profile with attributes about a user in some embodiments.

FIG. 10 is a flowchart of a method that may be used for generating a user profile with attributes about a user in some embodiments. A user profile is generated having information about a user of an online social network (block 1002). Information about an attribute of the user is received, wherein the information received about the user includes a value of the attribute (block 1004). An attribute entry is generated within the user profile, wherein the attribute entry has a value associated with the attribute entry, and the attribute entry has a status associated with the attribute entry (block 1006). The value associated with the attribute entry is set according to the information received about the attribute of the user (block 1008). The value associated with the attribute entry is verified (block 1010). The status associated with the attribute entry is set according to the outcome of the verification of the value of the attribute (block 1012). The status associated with the attribute entry is made available to entities that have access to the online social network (block 1014). The value associated with the attribute entry is made available to entities that have access to the online social network (block 1016).

Figure 11:
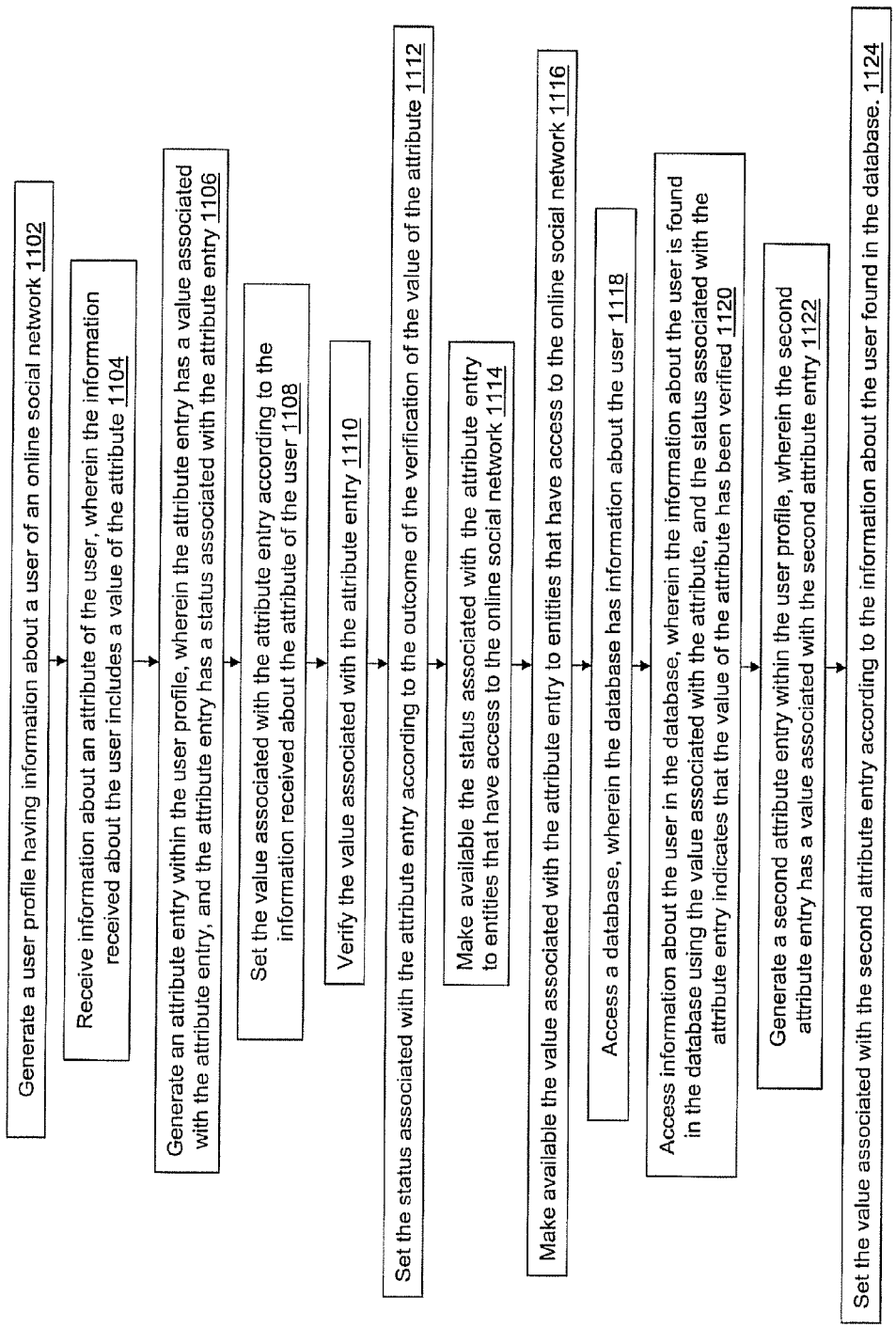
FIG. 11 is a flowchart of a method that may be used for generating a user profile with attributes about a user in some embodiments.

FIG. 11 is a flowchart of a method that may be used for generating a user profile with attributes about a user in some embodiments. A user profile is generated having information about a user of an online social network (block 1102). Information about an attribute of the user is received, wherein the information received about the user includes a value of the attribute (block 1104). An attribute entry is generated within the user profile, wherein the attribute entry has a value associated with the attribute entry, and the attribute entry has a status associated with the attribute entry (block 1106). The value associated with the attribute entry is set according to the information received about the attribute of the user (block 1108). The value associated with the attribute entry is verified (block 1110). The status associated with the attribute entry is set according to the outcome of the verification of the value of the attribute (block 1112). The status associated with the attribute entry is made available to entities that have access to the online social network (block 1114). The value associated with the attribute entry is made available to entities that have access to the online social network (block 1116). A database is accessed, wherein the database has information about the user (block 1118). Information is accessed about the user in the database, wherein the information about the user is found in the database using the value associated with the attribute, and the status associated with the attribute entry indicates that the value of the attribute has been verified (block 1120). A second attribute entry is generated within the user profile, wherein the second attribute entry has a value associated with the second attribute entry (block 1122). The value associated with the second attribute entry is set according to the information about the user found in the database (block 1124).

Figure 12:
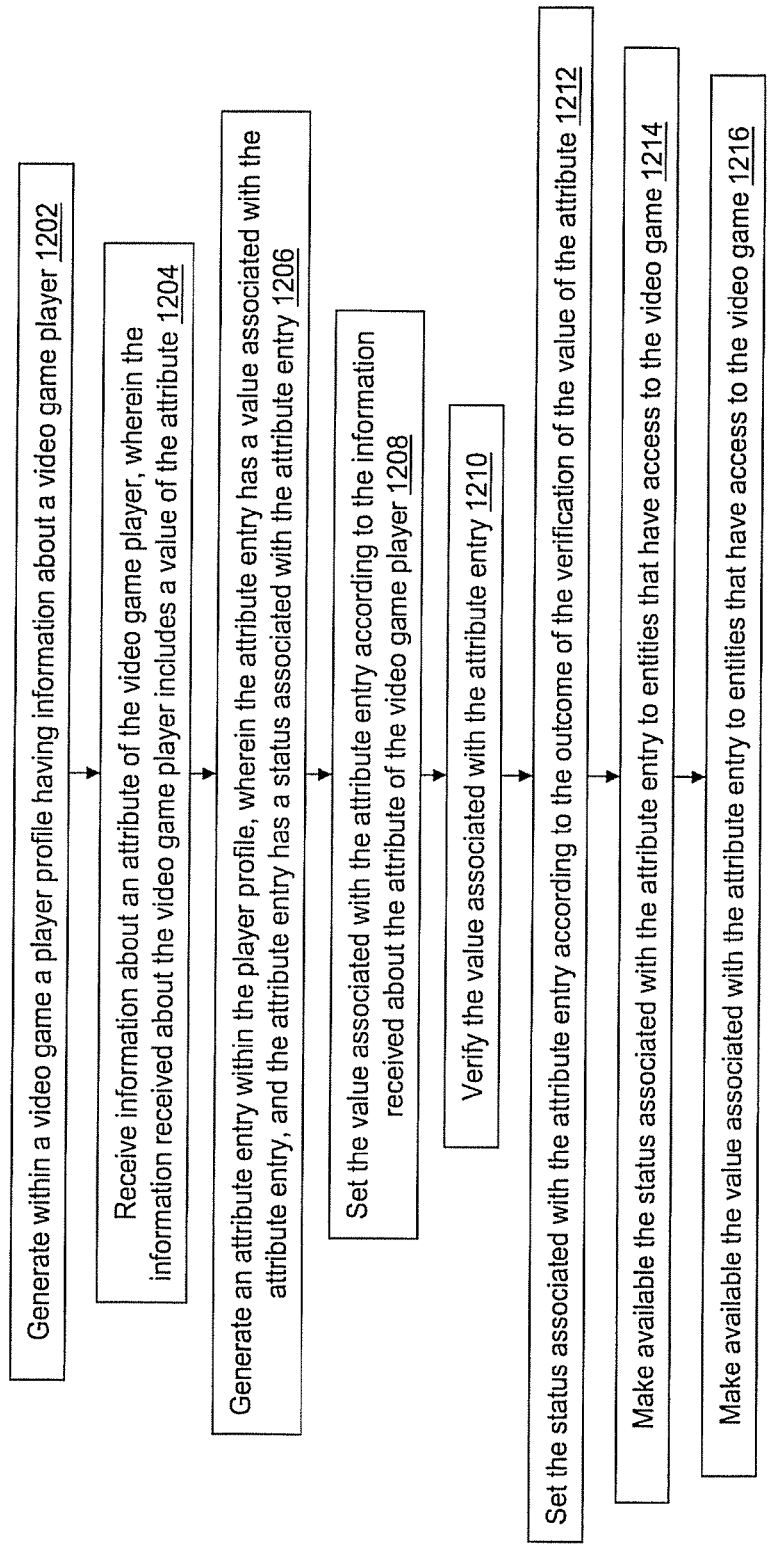
FIG. 12 is a flowchart of a method that may be used for generating a player profile with attributes about a video game player in some embodiments.

FIG. 12 is a flowchart of a method that may be used for generating a player profile with attributes about a video game player in some embodiments. A video game player profile is generated having information about a video game player (block 1202). Information about an attribute of the video game player is received, wherein the information received about the video game player includes a value of the attribute (block 1204). An attribute entry within the player profile is generated, wherein the attribute entry has a value associated with the attribute entry, and the attribute entry has a status associated with the attribute entry (block 1206). The value associated with the attribute entry is set according to the information received about the attribute of the video game player (block 1208). The value associated with the attribute entry is verified (block 1210). The status associated with the attribute entry is set according to the outcome of the verification of the value of the attribute (block 1212). The status associated with the attribute entry is made available to entities that have access to the video game (block 1214). The value associated with the attribute entry is made available to entities that have access to the video game (block 1216).

Figure 13:
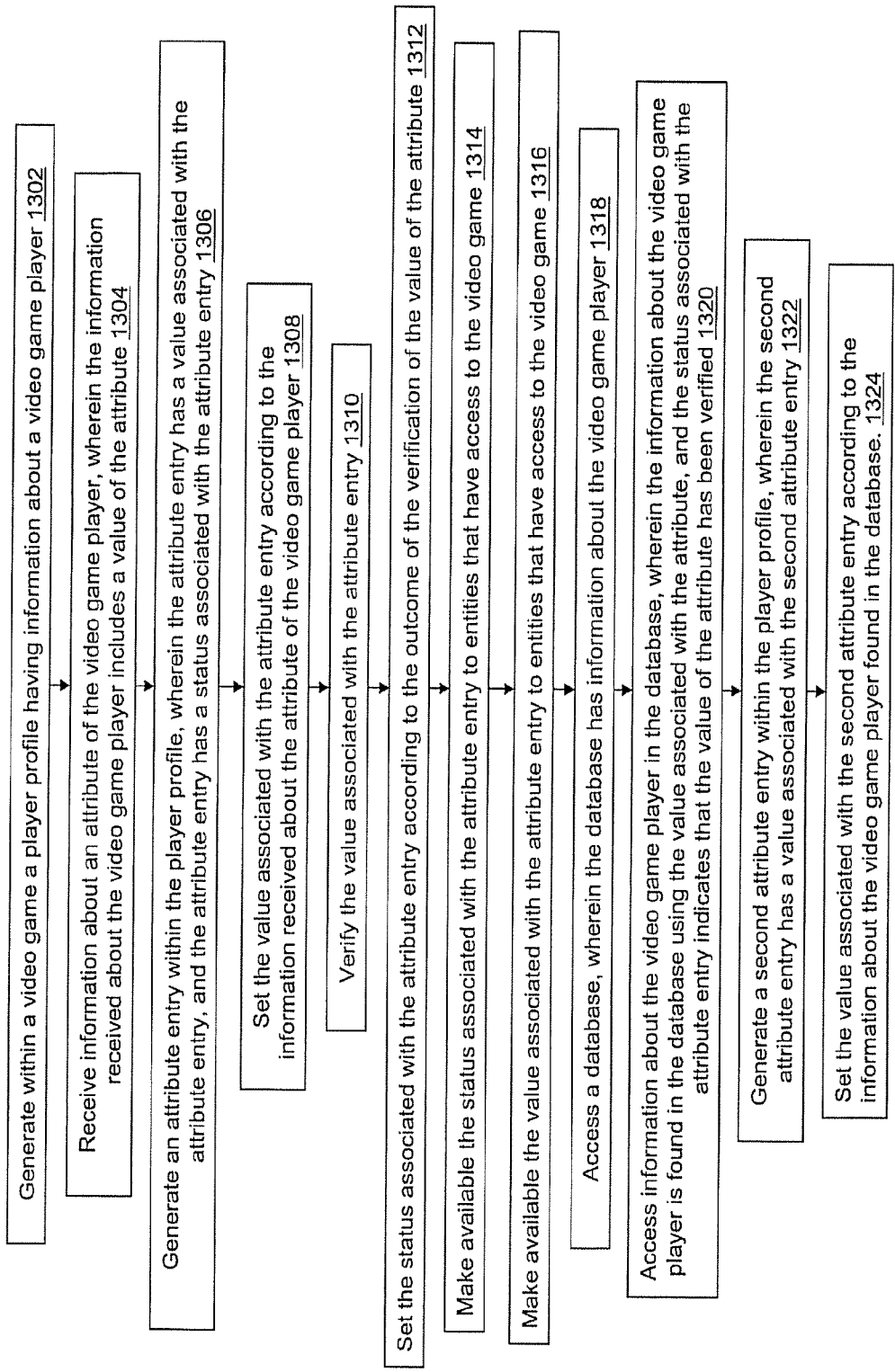
FIG. 13 is a flowchart of a method that may be used for generating a player profile with attributes about a video game player in some embodiments.

FIG. 13 is a flowchart of a method that may be used for generating a player profile with attributes about a video game player in some embodiments. A video game player profile is generated having information about a video game player (block 1302). Information about an attribute of the video game player is received, wherein the information received about the video game player includes a value of the attribute (block 1304). An attribute entry within the player profile is generated, wherein the attribute entry has a value associated with the attribute entry, and the attribute entry has a status associated with the attribute entry (block 1306). The value associated with the attribute entry is set according to the information received about the attribute of the video game player (block 1308). The value associated with the attribute entry is verified (block 1310). The status associated with the attribute entry is set according to the outcome of the verification of the value of the attribute (block 1312). The status associated with the attribute entry is made available to entities that have access to the video game (block 1314). The value associated with the attribute entry is made available to entities that have access to the video game (block 1316). A database is accessed, wherein the database has information about the video game player (block 1318). Information about the video game player is accessed in the database, wherein the information about the video game player is found in the database using the value associated with the attribute, and the status associated with the attribute entry indicates that the value of the attribute has been verified (block 1320). A second attribute entry within the player profile is generated, wherein the second attribute entry has a value associated with the second attribute entry (block 1322). The value associated with the second attribute entry is set according to the information about the video game player found in the database (block 1324).

Figure 14:
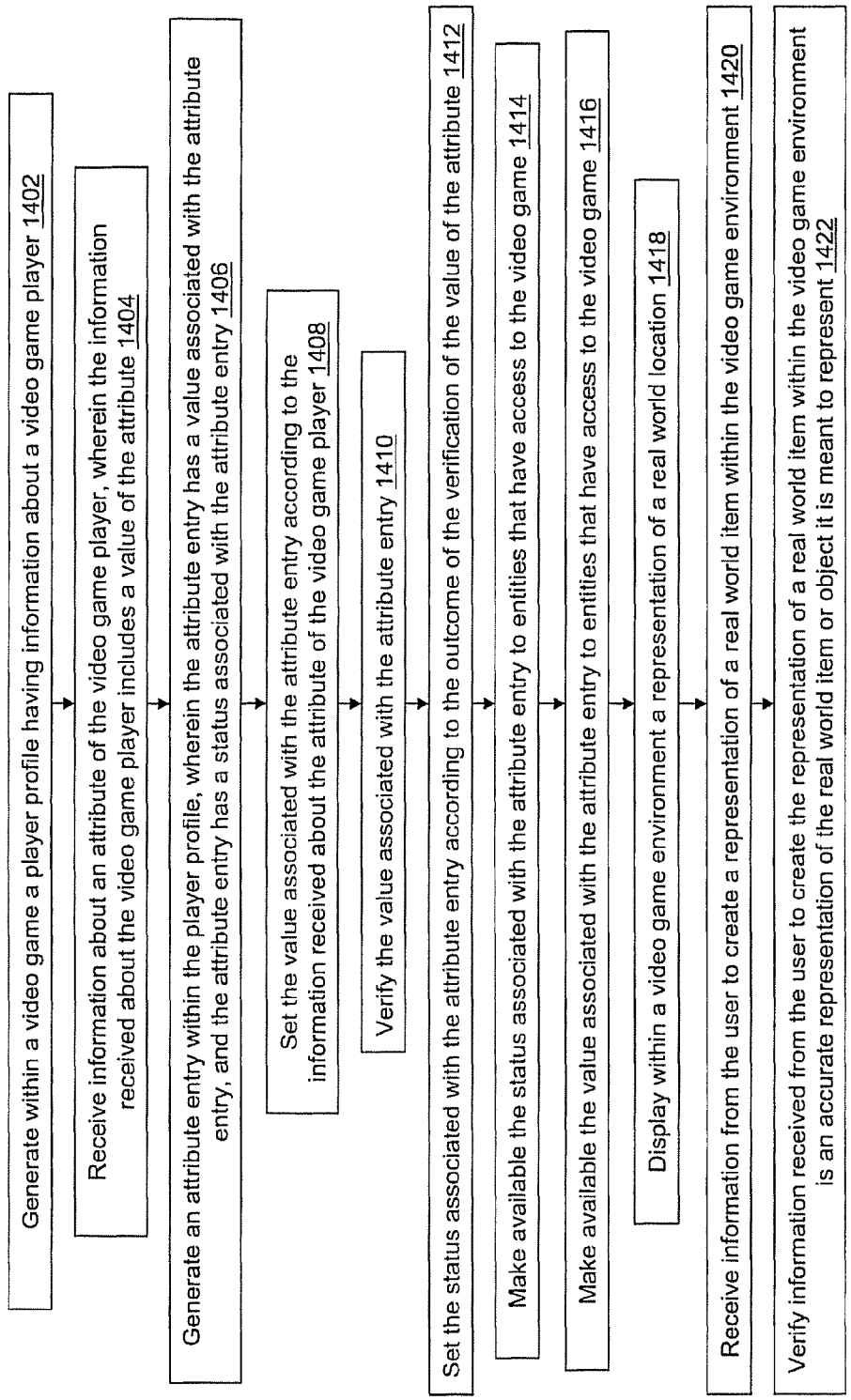
FIG. 14 is a flowchart of a method that may be used for generating a player profile with attributes about a video game player in some embodiments.

FIG. 14 is a flowchart of a method that may be used for generating a player profile with attributes about a video game player in some embodiments. A video game player profile is generated having information about a video game player (block 1402). Information about an attribute of the video game player is received, wherein the information received about the video game player includes a value of the attribute (block 1404). An attribute entry within the player profile is generated, wherein the attribute entry has a value associated with the attribute entry, and the attribute entry has a status associated with the attribute entry (block 1406). The value associated with the attribute entry is set according to the information received about the attribute of the video game player (block 1408). The value associated with the attribute entry is verified (block 1410). The status associated with the attribute entry is set according to the outcome of the verification of the value of the attribute (block 1412). The status associated with the attribute entry is made available to entities that have access to the video game (block 1414). The value associated with the attribute entry is made available to entities that have access to the video game (block 1416). Display within a video game environment a representation of a real world location (block 1418). Receive information from the user to create a representation of a real world item within the video game environment (block 1420). Verify information received from the user to create the representation of a real world item within the video game environment is an accurate representation of the real world item or object it is meant to represent (block 1422).

Figure 15:
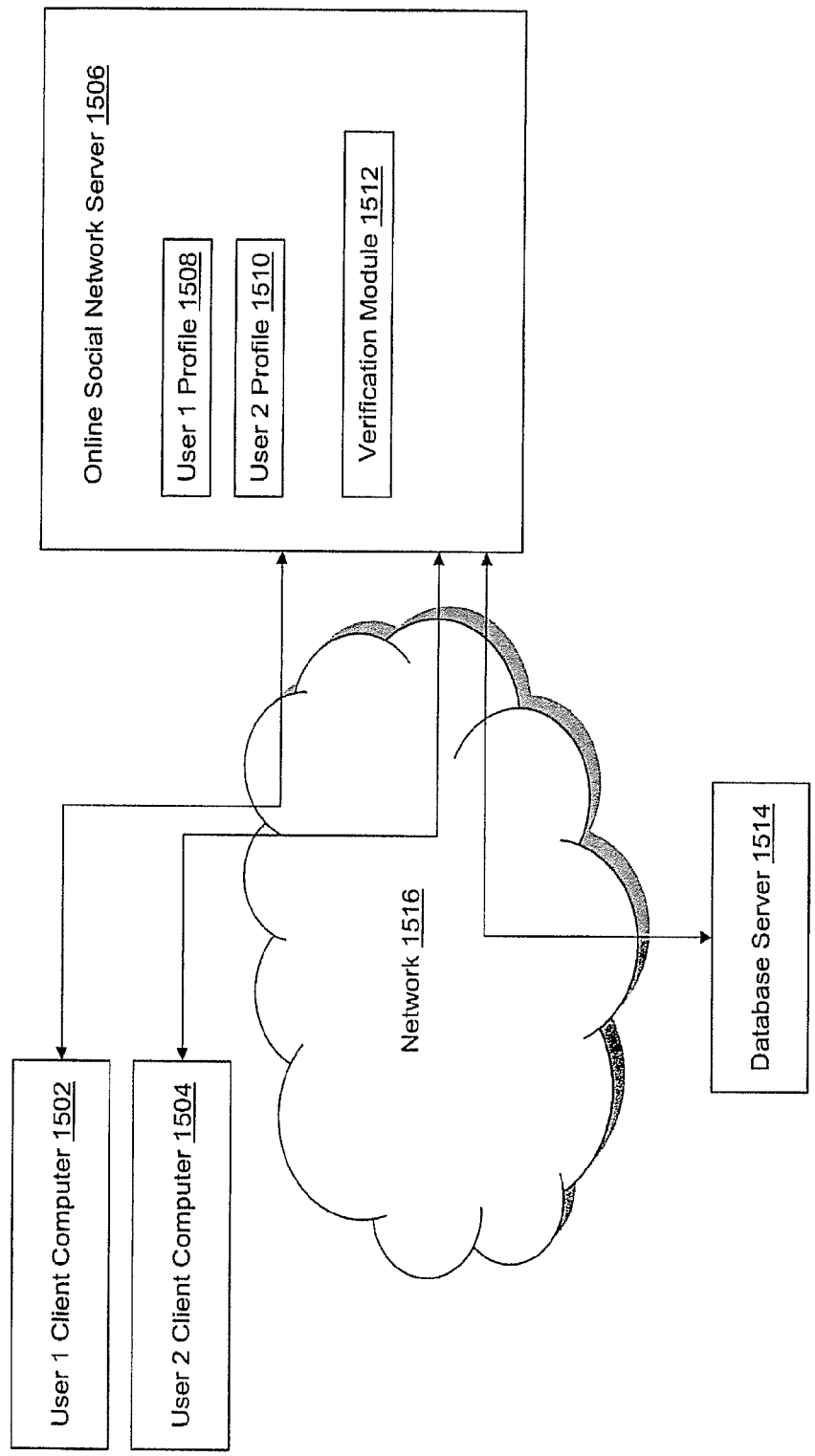
FIG. 15 illustrates a system architecture for verifying attributes of a user of an online social network, according to some embodiments.

FIG. 15 illustrates a system architecture for verifying attributes of a user of an online social network, according to some embodiments. User 1 client computer 1502 is a computer used by user 1. User 1 client computer 1502 accesses online social network server 1506 through network 1516. Network 1516 may be the internet. User 2 client computer 1504 is a computer used by user 2. User 2 client computer 1504 accesses online social network server 1506 through network 1516. User 1 and User 2 are users of the online social network associated with online social network server 1506. Online social network server 1506 contains information about the users of the online social network. Specifically, user 1 profile 1508 contains information about user 1, including attributes of user 1. User 1 profile 1508 may take the form of user profile 100 as depicted and discussed in connection with FIG. 1. Specifically, user 2 profile 1510 contains information about user 2, including attributes of user 2. User 2 profile 1510 may take the form of user profile 100 as depicted and discussed in connection with FIG. 1. Online social network server 1506 contains verification module 1512. Verification module 1512 is software used for verifying the values of attributes of users with user profiles on online social network server 1506. For example, attributes of user 1 found within user 1 profile 1508 may be verified using verification module 1512. Verification module 1512 may make use of database server 1514. In some embodiments database server 1514 is a public database (e.g., public records freely accessible over the internet) that online social network server 1506 accesses. In some embodiments database server 1514 is a private database (e.g., records accessible only to certain entities, such as proprietary customer lists) that online social network server 1506 accesses. Specifically, verification module 1512 may verify attributes associated with a user, comparing the value associated with an attribute to information found in database server 1514. Verification module 1512 may then render an attribute to have a status of "verified", "unverified", or otherwise. Online social network server 1506 may communicate with database server 1514 through network 1516. In some embodiments online social network server 1506 may communicate with database server 1514 through a network connection that does not use network 1516.

Figure 16:
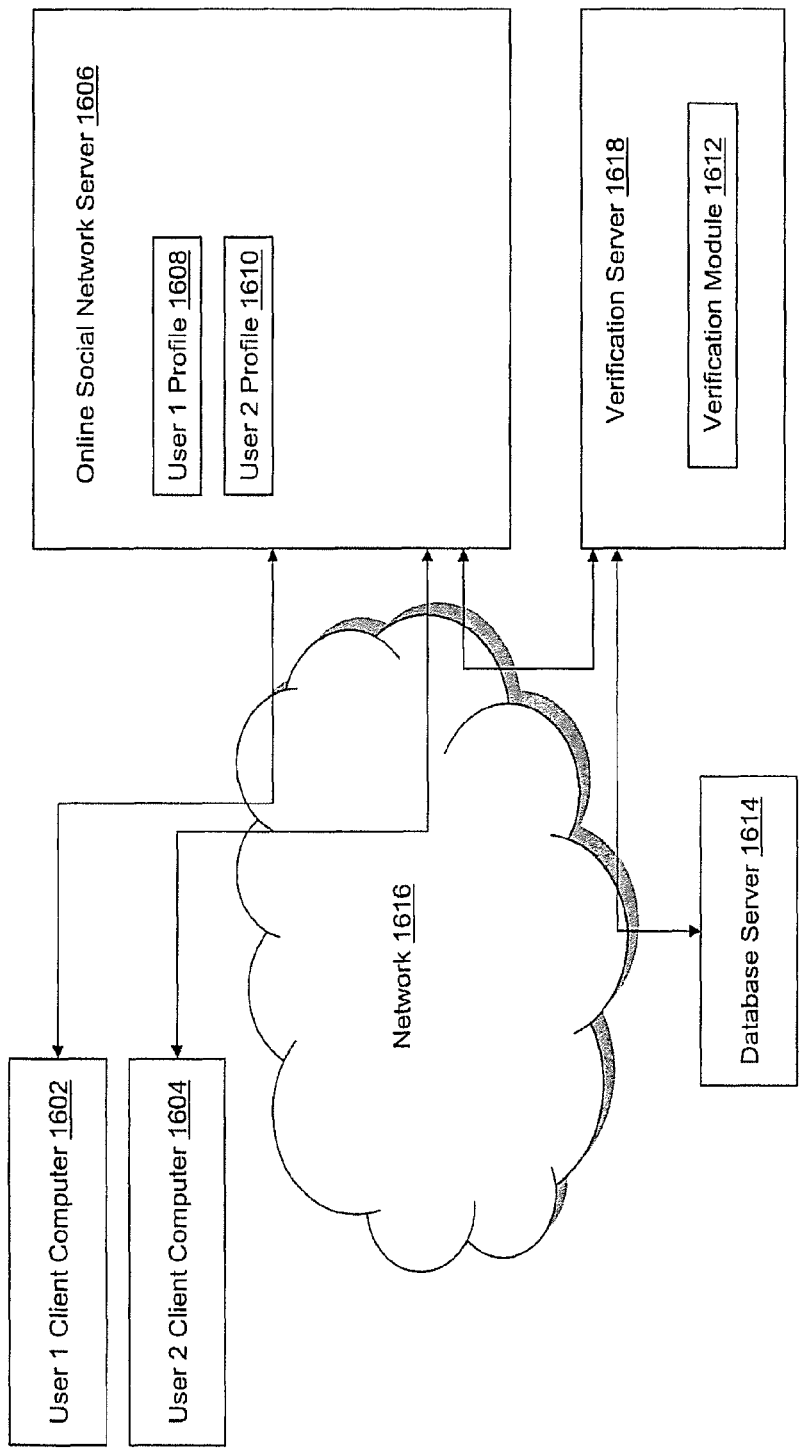
FIG. 16 illustrates a system architecture for verifying attributes of a user of an online social network, according to some embodiments.

FIG. 16 illustrates a system architecture for verifying attributes of a user of an online social network, according to some embodiments. User 1 client computer 1602 is a computer used by user 1. User 1 client computer 1602 accesses online social network server 1606 through network 1616. Network 1616 may be the internet. User 2 client computer 1604 is a computer used by user 2. User 2 client computer 1604 accesses online social network server 1606 through network 1616. User 1 and User 2 are users of the online social network associated with online social network server 1606. Online social network server 1606 contains information about the users of the online social network. Specifically, user 1 profile 1608 contains information about user 1, including attributes of user 1. User 1 profile 1608 may take the form of user profile 100 as depicted and discussed in connection with FIG. 1. Specifically, user 2 profile 1610 contains information about user 2, including attributes of user 2. User 2 profile 1610 may take the form of user profile 100 as depicted and discussed in connection with FIG. 1. Verification server 1618 contains verification module 1612. Verification module 1612 is software used for verifying the values of attributes of users with user profiles on online social network server 1606. For example, attributes of user 1 found within user 1 profile 1608 may be verified using verification module 1612. Online social network server 1606 communicates with verification server 1618 through network 1616. Verification server 1618 may make use of database server 1614. In some embodiments database server 1614 is a public database (e.g., public records freely accessible over the internet) that verification server 1618 accesses. In some embodiments database server 1614 is a private database (e.g., records accessible only to certain entities, such as proprietary customer lists) that verification server 1618 accesses. Specifically, verification module 1612 may verify attributes associated with a user, comparing the value associated with an attribute to information found in database server 1614. Verification module 1612 may then render an attribute to have a status of "verified", "unverified", or otherwise. That information is communicated to online social network server 1606 and may become part of the profile of the user. Verification server 1618 may communicate with database server 1614 through network 1616. In some embodiments verification server 1618 may communicate with database server 1614 through a network connection that does not use network 1616.

Figure 17:
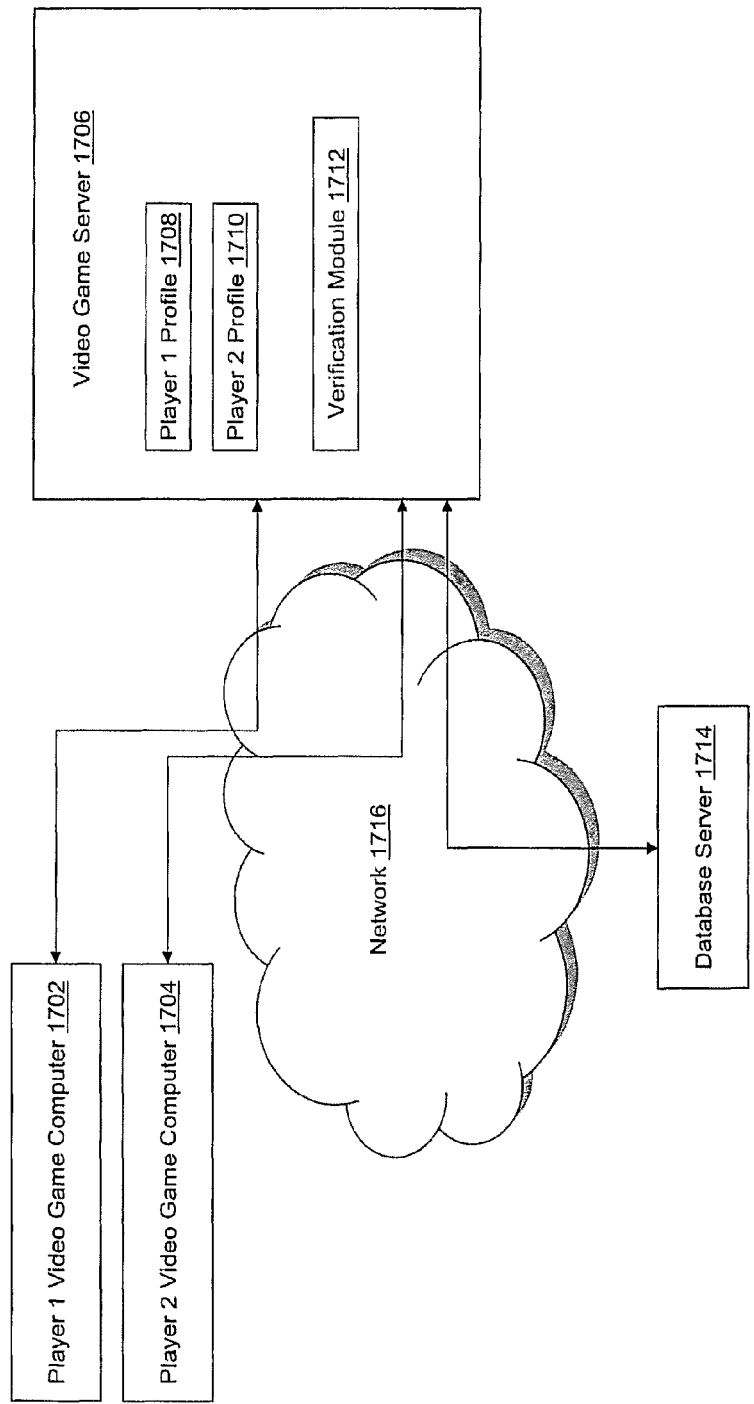
FIG. 17 illustrates a system architecture for verifying attributes of a video game player within a video game, according to some embodiments.

FIG. 17 illustrates a system architecture for verifying attributes of a video game player within a video game, according to some embodiments. Player 1 video game computer 1702 is a video game computer used by player 1. Player 1 video game computer 1702 accesses video game server 1706 through network 1716. Network 1716 may be the internet. Player 2 video game computer 1704 is a video game computer used by player 2. Player 2 video game computer 1704 accesses video game server 1706 through network 1716. Player 1 and player 2 are players of the video game associated with video game server 1706. Video game server 1706 contains information about the players of the video game. Specifically, player 1 profile 1708 contains information about player 1, including attributes of player 1. Player 1 profile 1708 may take the form of user profile 100 as depicted and discussed in connection with FIG. 1. Specifically, player 2 profile 1710 contains information about player 2, including attributes of player 2. Player 2 profile 1710 may take the form of user profile 100 as depicted and discussed in connection with FIG. 1. Video game server 1706 contains verification module 1712. Verification module 1712 is software used for verifying attributes about players with player profiles on video game server 1706. For example, attributes of player 1 found within player 1 profile 1708 may be verified using verification module 1712. Verification module 1712 may make use of database server 1714. In some embodiments database server 1714 is a public database (e.g., public records freely accessible over the internet) that video game server 1706 accesses. In some embodiments database server 1714 is a private database (e.g., records accessible only to certain entities, such as proprietary customer lists) that video game server 1706 accesses. Specifically, verification module 1712 may verify attributes associated with a player, comparing the value associated with an attribute to information found in database server 1714. Verification module 1712 may then render an attribute to have a status of "verified", "unverified", or otherwise. Video game server 1706 may communicate with database server 1714 through network 1716. In some embodiments video game server 1706 may communicate with database server 1714 through a network connection that does not use network 1716.

Figure 18:
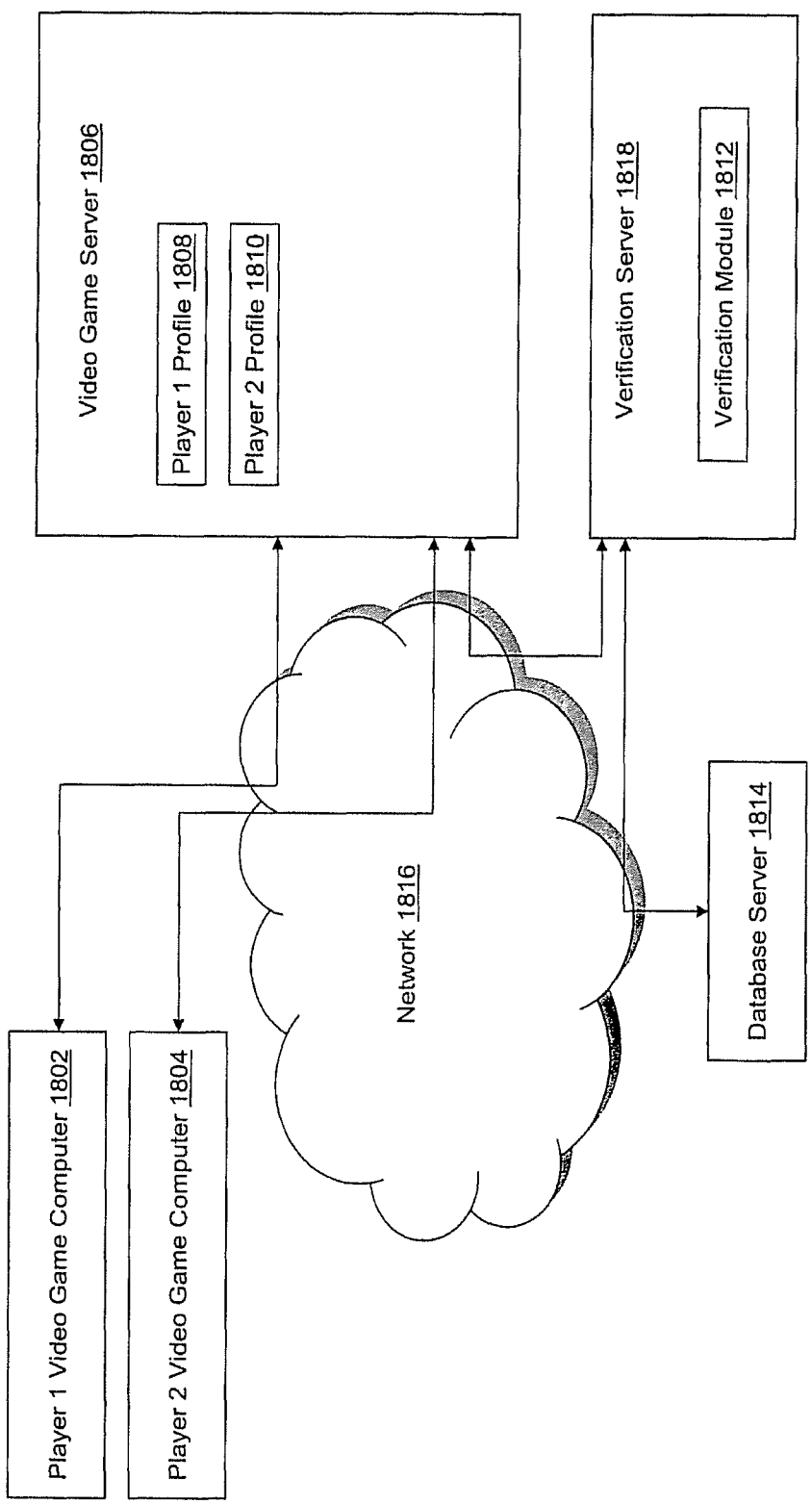
FIG. 18 illustrates a system architecture for verifying attributes of a video game player within a video game, according to some embodiments.

FIG. 18 illustrates a system architecture for verifying attributes of a video game player within a video game, according to some embodiments. Player 1 video game computer 1802 is a video game computer used by player 1. Player 1 video game computer 1802 accesses video game server 1806 through network 1816. Network 1816 may be the internet. Player 2 video game computer 1804 is a video game computer used by player 2. Player 2 video game computer 1804 accesses video game server 1806 through network 1816. Player 1 and player 2 are players of the video game associated with video game server 1806. Video game server 1806 contains information about the players of the video game. Specifically, player 1 profile 1808 contains information about player 1, including attributes of player 1. Player 1 profile 1808 may take the form of user profile 100 as depicted and discussed in connection with FIG. 1. Specifically, player 2 profile 1810 contains information about player 2, including attributes of player 2. Player 2 profile 1810 may take the form of user profile 100 as depicted and discussed in connection with FIG. 1. Verification server 1818 contains verification module 1812. Verification module 1812 is software used for verifying attributes about players with player profiles on video game server 1806. For example, attributes of player 1 found within player 1 profile 1808 may be verified using verification module 1812. Video game server 1806 communicates with verification server 1818 through network 1816. Verification server 1818 may make use of database server 1814. In some embodiments database server 1814 is a public database (e.g., public records freely accessible over the internet) that verification server 1818 accesses. In some embodiments database server 1814 is a private database (e.g., records accessible only to certain entities, such as proprietary customer lists) that verification server 1818 accesses. Specifically, verification module 1812 may verify attributes associated with a player, comparing the value associated with an attribute to information found in database server 1814. Verification module 1812 may then render an attribute to have a status of "verified", "unverified", or otherwise. That information is communicated to video game server 1806. Verification server 1818 may communicate with database server 1814 through network 1816. In some embodiments verification server 1818 may communicate with database server 1814 through a network connection that does not use network 1816.

Figure 19:
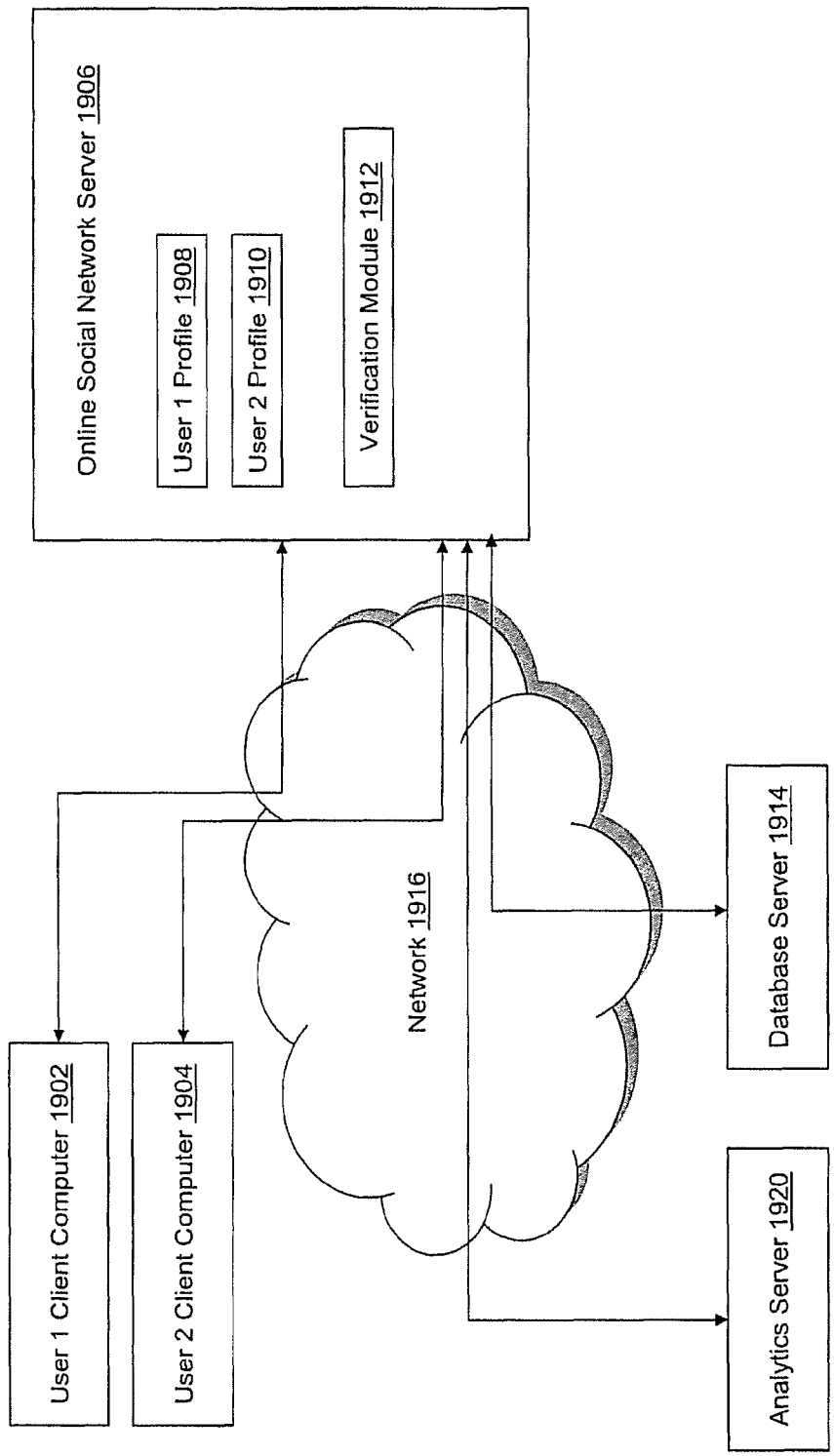
FIG. 19 illustrates a system architecture for verifying attributes of a user of an online social network and providing analytics information, according to some embodiments.

FIG. 19 illustrates a system architecture for verifying attributes of a user of an online social network and providing analytics information, according to some embodiments. User 1 client computer 1902 is a computer used by user 1. User 1 client computer 1902 accesses online social network server 1906 through network 1916. Network 1916 may be the internet. User 2 client computer 1904 is a computer used by user 2. User 2 client computer 1904 accesses online social network server 1906 through network 1916. User 1 and User 2 are users of the online social network associated with online social network server 1906. Online social network server 1906 contains information about the users of the online social network. Specifically, user 1 profile 1908 contains information about user 1, including attributes of user 1. User 1 profile 1908 may take the form of user profile 100 as depicted and discussed in connection with FIG. 1. Specifically, user 2 profile 1910 contains information about user 2, including attributes of user 2. User 2 profile 1910 may take the form of user profile 100 as depicted and discussed in connection with FIG. 1. Online social network server 1906 contains verification module 1912. Verification module 1912 is software used for verifying the values of attributes of users with user profiles on online social network server 1906. For example, attributes of user 1 found within user 1 profile 1908 may be verified using verification module 1912. Verification module 1912 may make use of database server 1914. In some embodiments database server 1914 is a public database (e.g., public records freely accessible over the internet) that online social network server 1906 accesses. In some embodiments database server 1914 is a private database (e.g., records accessible only to certain entities, such as proprietary customer lists) that online social network server 1906 accesses. Specifically, verification module 1912 may verify attributes associated with a user, comparing the value associated with an attribute to information found in database server 1914. Verification module 1912 may then render an attribute to have a status of "verified", "unverified", or otherwise. Online social network server 1906 may communicate with database server 1914 through network 1916. In some embodiments online social network server 1906 may communicate with database server 1914 through a network connection that does not use network 1916. Online social network 1906 communicates with analytics server 1920 over network 1916. In some embodiments, analytics server 1920 receives from online social network server 1906 information about the values of attributes found in user profiles within online social network server 1906. Analytics server 1920 may send online social network server 1906 suggestions for advertisements to display to users of online social network 1906. Analytics server 1920 may send online social network server suggestions for items to offer for sale to users of online social network 1906. Examples of analytics transactions between online social network server 1906 and analytics server 1920 will vary between embodiments. For example, analytics server 1920 may generate product suggestions for offers of items for sale through an online social network through the identity and previous purchase habits of a user, as indicated in the user's attributes within their user profile. In another example, analytics server 1920 may generate suggestions for advertisements to display to a user based on the previous purchase habits of users sharing characteristics or relationships with a user, as indicated in the user's attributes within their user profile. Where a user's attributes have been verified the utility of the recommendations of analytics server 1920 is enhanced. In some embodiments the functionality of analytics server 1920 may be found within online social network server 1906.

Figure 20:
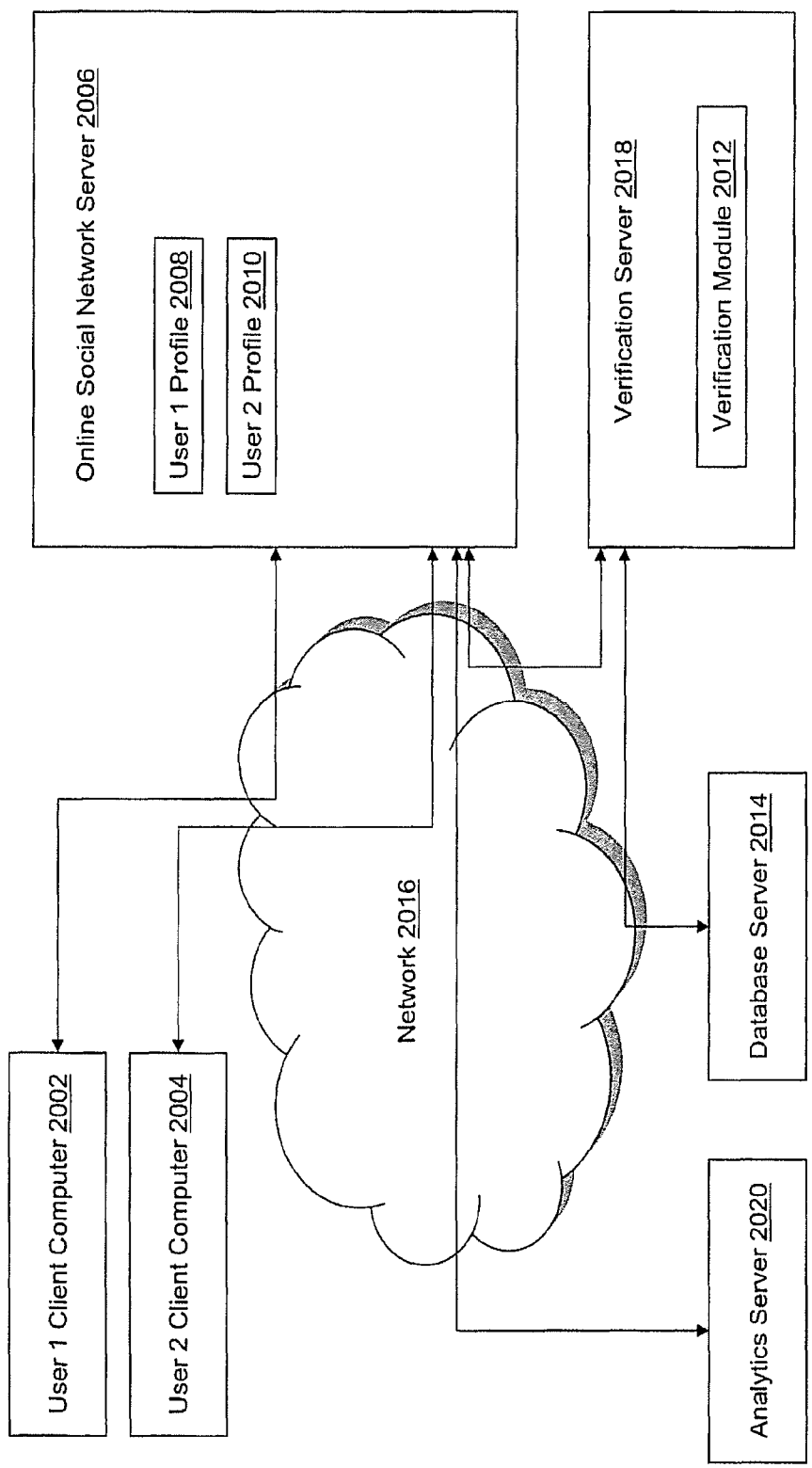
FIG. 20 illustrates a system architecture for verifying attributes of a user of an online social network and providing analytics information, according to some embodiments.

FIG. 20 illustrates a system architecture for verifying attributes of a user of an online social network and providing analytics information, according to some embodiments. User 1 client computer 2002 is a computer used by user 1. User 1 client computer 2002 accesses online social network server 2006 through network 2016. Network 2016 may be the internet. User 2 client computer 2004 is a computer used by user 2. User 2 client computer 2004 accesses online social network server 2006 through network 2016. User 1 and User 2 are users of the online social network associated with online social network server 2006. Online social network server 2006 contains information about the users of the online social network. Specifically, user 1 profile 2008 contains information about user 1, including attributes of user 1. User 1 profile 2008 may take the form of user profile 100 as depicted and discussed in connection with FIG. 1. Specifically, user 2 profile 2010 contains information about user 2, including attributes of user 2. User 2 profile 2010 may take the form of user profile 100 as depicted and discussed in connection with FIG. 1. Verification server 2018 contains verification module 2012. Verification module 2012 is software used for verifying the values of attributes of users with user profiles on online social network server 2006. For example, attributes of user 1 found within user 1 profile 2008 may be verified using verification module 2012. Online social network server 2006 communicates with verification server 2018 through network 2016. Verification server 2018 may make use of database server 2014. In some embodiments database server 2014 is a public database (e.g., public records freely accessible over the internet) that verification server 2018 accesses. In some embodiments database server 2014 is a private database (e.g., records accessible only to certain entities, such as proprietary customer lists) that verification server 2018 accesses. Specifically, verification module 2012 may verify attributes associated with a user, comparing the value associated with an attribute to information found in database server 2014. Verification module 2012 may then render an attribute to have a status of "verified", "unverified", or otherwise. That information is communicated to online social network server 2006 and may become part of the profile of the user. Verification server 2018 may communicate with database server 2014 through network 2016. In some embodiments verification server 2018 may communicate with database server 2014 through a network connection that does not use network 2016. Online social network 2006 communicates with analytics server 2020 over network 2016. In some embodiments, analytics server 2020 receives from online social network server 2006 information about the values of attributes found in user profiles within online social network server 2006. Analytics server 2020 may send online social network server 2006 suggestions for advertisements to display to users of the online social network. Analytics server 2020 may send online social network server 2006 suggestions for items to offer for sale to users of online social network 2006. Examples of analytics transactions between online social network server 2006 and analytics server 2020 will vary between embodiments. For example, analytics server 2020 may generate product suggestions for offers of items for sale through an online social network through the identity and previous purchase habits of a user, as indicated in the user's attributes within their user profile. In another example, analytics server 2020 may generate suggestions for advertisements to display to a user based on the previous purchase habits of users sharing characteristics or relationships with a user, as indicated in the user's attributes within their user profile. Where a user's attributes have been verified the utility of the recommendations of analytics server 2020 is enhanced. In some embodiments the functionality of analytics server 2020 may be found within online social network server 2006. In some embodiments the functionality of verification server 2018 may be found within online social network server 2006.

Figure 21:
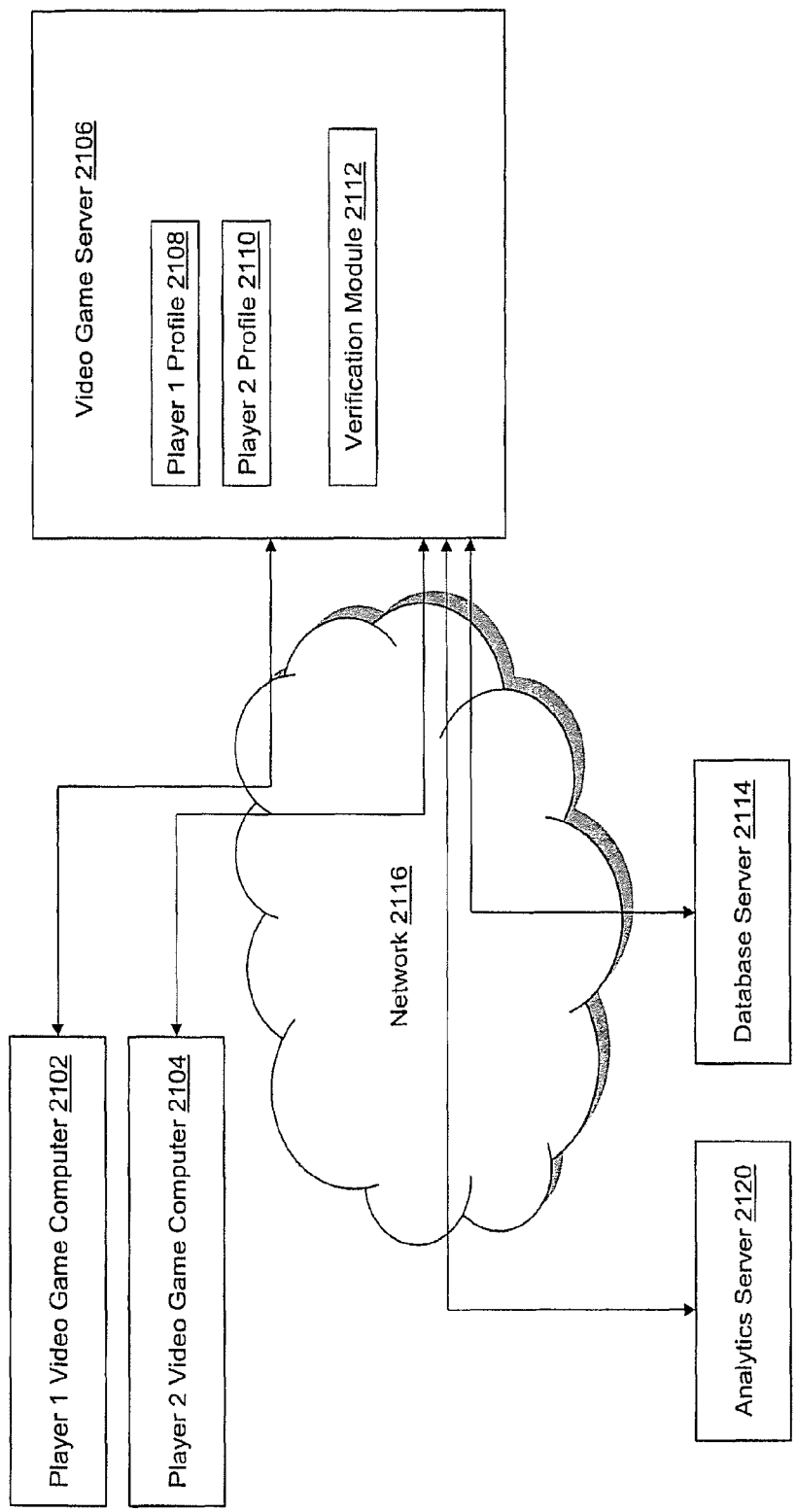
FIG. 21 illustrates a system architecture for verifying attributes of a video game player within a video game and providing analytics information, according to some embodiments.

FIG. 21 illustrates a system architecture for verifying attributes of a video game player within a video game and providing analytics information, according to some embodiments. Player 1 video game computer 2102 is a video game computer used by player 1. Player 1 video game computer 2102 accesses video game server 2106 through network 2116. Network 2116 may be the interne. Player 2 video game computer 2104 is a video game computer used by player 2. Player 2 video game computer 2104 accesses video game server 2106 through network 2116. Player 1 and player 2 are players of the video game associated with video game server 2106. Video game server 2106 contains information about the players of the video game. Specifically, player 1 profile 2108 contains information about player 1, including attributes of player 1. Player 1 profile 2108 may take the form of user profile 100 as depicted and discussed in connection with FIG. 1. Specifically, player 2 profile 2110 contains information about player 2, including attributes of player 2. Player 2 profile 2110 may take the form of user profile 100 as depicted and discussed in connection with FIG. 1. Video game server 2106 contains verification module 2112. Verification module 2112 is software used for verifying attributes about players with player profiles on video game server 2106. For example, attributes of player 1 found within player 1 profile 2108 may be verified using verification module 2112. Verification module 2112 may make use of database server 2114. In some embodiments database server 2114 is a public database (e.g., public records freely accessible over the internet) that video game server 2106 accesses. In some embodiments database server 2114 is a private database (e.g., records accessible only to certain entities, such as proprietary customer lists) that video game server 2106 accesses. Specifically, verification module 2112 may verify attributes associated with a player, comparing the value associated with an attribute to information found in database server 2114. Verification module 2112 may then render an attribute to have a status of "verified", "unverified", or otherwise. Video game server 2106 may communicate with database server 2114 through network 2116. In some embodiments video game server 2106 may communicate with database server 2114 through a network connection that does not use network 2116. Video game server 2106 communicates with analytics server 2120 over network 2116. In some embodiments, analytics server 2120 receives from video game server 2106 information about the values of attributes found in player profiles within video game server 2106. Analytics server 2120 may send video game server 2106 suggestions for advertisements to display to players of the video game. Analytics server 2120 may send video game server 2106 suggestions for items to offer for sale to players of the video game associated with video game server 2106. Examples of analytics transactions between video game server 2106 and analytics server 2120 will vary between embodiments. For example, analytics server 2120 may generate product suggestions for offers of items for sale through a video game through the identity and previous purchase habits of a player, as indicated in the player's attributes within their player profile. In another example, analytics server 2120 may generate suggestions for advertisements to display to a player based on the previous purchase habits of players sharing characteristics or relationships with a player, as indicated in the player's attributes within their player profile. Where a player's attributes have been verified the utility of the recommendations of analytics server 2120 is enhanced. In some embodiments the functionality of analytics server 2120 may be found within online social network server 2106.

Figure 22:
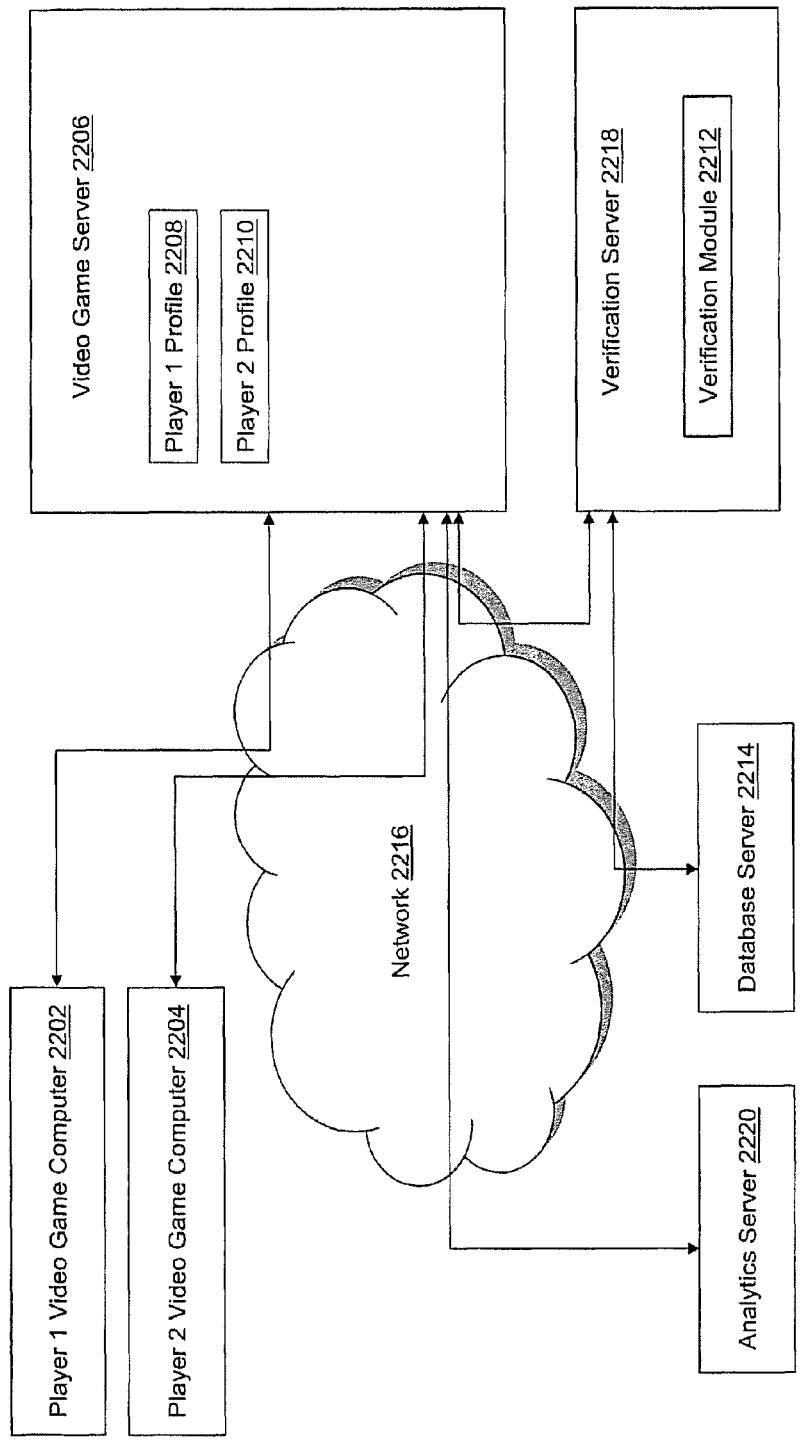
FIG. 22 illustrates a system architecture for verifying attributes of a video game player within a video game and providing analytics information, according to some embodiments.

FIG. 22 illustrates a system architecture for verifying attributes of a video game player within a video game and providing analytics information, according to some embodiments. Player 1 video game computer 2202 is a video game computer used by player 1. Player 1 video game computer 2202 accesses video game server 2206 through network 2216. Network 2216 may be the internet. Player 2 video game computer 2204 is a video game computer used by player 2. Player 2 video game computer 2204 accesses video game server 2206 through network 2216. Player 1 and player 2 are players of the video game associated with video game server 2206. Video game server 2206 contains information about the players of the video game. Specifically, player 1 profile 2208 contains information about player 1, including attributes of player 1. Player 1 profile 2208 may take the form of user profile 100 as depicted and discussed in connection with FIG. 1. Specifically, player 2 profile 2210 contains information about player 2, including attributes of player 2. Player 2 profile 2210 may take the form of user profile 100 as depicted and discussed in connection with FIG. 1. Verification server 2218 contains verification module 2212. Verification module 2212 is software used for verifying attributes of players with player profiles on video game server 2206. For example, attributes of player 1 found within player 1 profile 2208 may be verified using verification module 2212. Video game server 2206 communicates with verification server 2218 through network 2216. Verification server 2218 may make use of database server 2214. In some embodiments database server 2214 is a public database (e.g., public records freely accessible over the internet) that verification server 2218 accesses. In some embodiments database server 2214 is a private database (e.g., records accessible only to certain entities, such as proprietary customer lists) that verification server 2218 accesses. Specifically, verification module 2212 may verify attributes associated with a player, comparing the value associated with an attribute to information found in database server 2214. Verification module 2212 may then render an attribute to have a status of "verified", "unverified", or otherwise. That information is communicated to video game server 2206 and may become part of the profile of the player. Verification server 2218 may communicate with database server 2214 through network 2216. In some embodiments verification server 2218 may communicate with database server 2214 through a network connection that does not use network 2216. Video game server 2206 communicates with analytics server 2220 over network 2216. In some embodiments, analytics server 2220 receives from video game server 2206 information about the values of attributes found in player profiles within video game server 2206. Analytics server 2220 may send video game server 2206 suggestions for advertisements to display to players of the video game. Analytics server 2220 may send video game server 2206 suggestions for items to offer for sale to players of the video game associated with video game server 2206. Examples of analytics transactions between video game server 2206 and analytics server 2220 will vary between embodiments. For example, analytics server 2220 may generate product suggestions for offers of items for sale through a video game through the identity and previous purchase habits of a player, as indicated in the player's attributes within their player profile. In another example, analytics server 2220 may generate suggestions for advertisements to display to a player based on the previous purchase habits of players sharing characteristics or relationships with a player, as indicated in the player's attributes within their player profile. Where a player's attributes have been verified the utility of the recommendations of analytics server 2220 is enhanced. In some embodiments the functionality of analytics server 2220 may be found within online social network server 2206. In some embodiments the functionality of verification server 2218 may be found within online social network server 2206.

Figure 23:
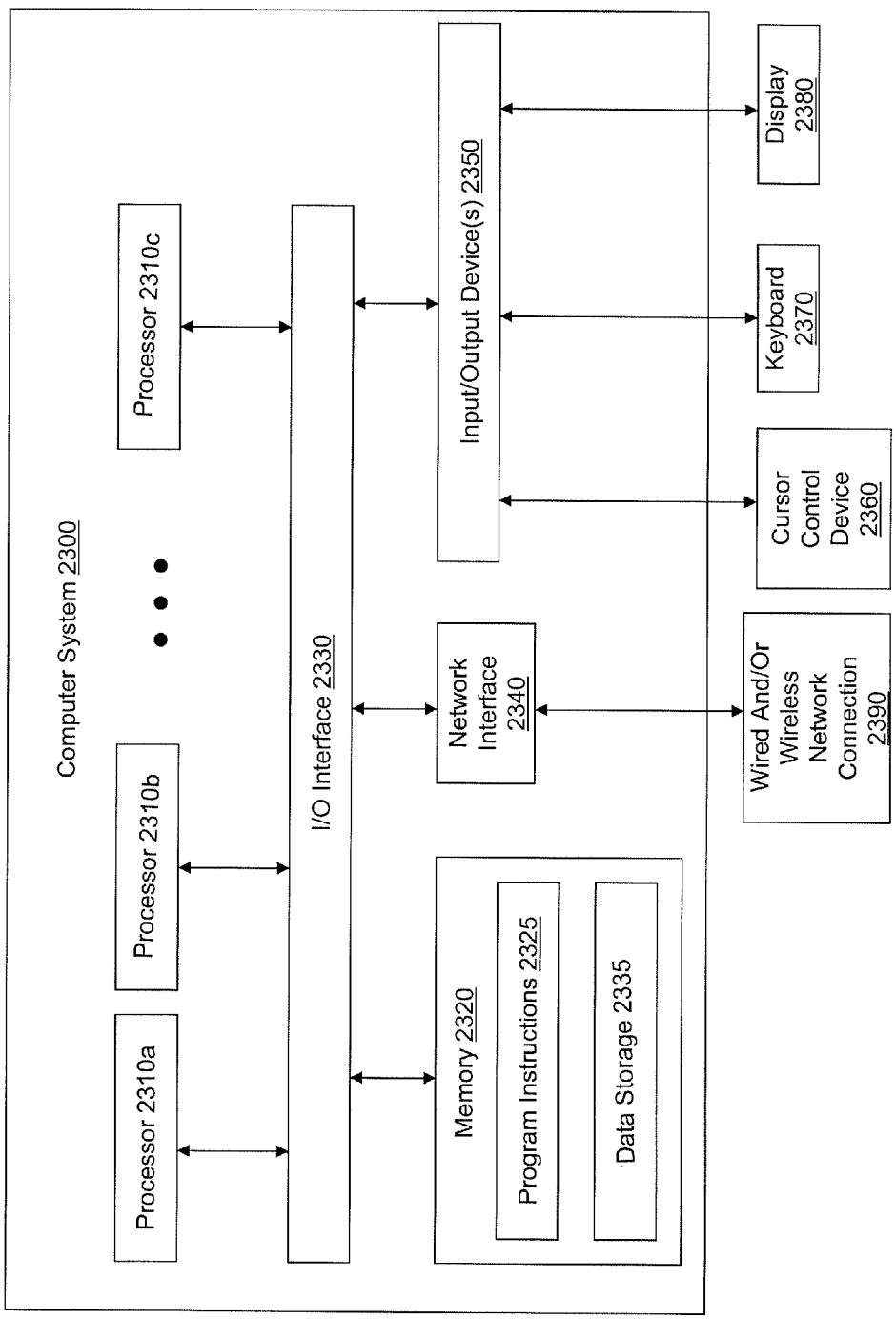
FIG. 23 illustrates an example computer system that may be used in embodiments.

FIG. 23 is described in the section "Example System", below.

Figure 24:
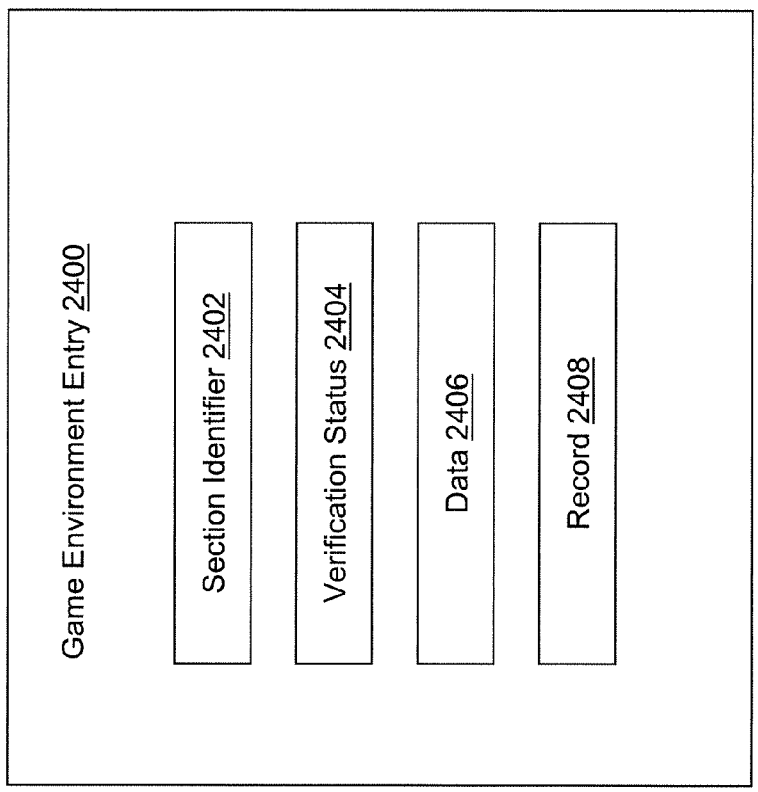
FIG. 24 is a block diagram depicting a system for use in an embodiment of the invention employing a game environment entry.

FIG. 24 is a block diagram depicting a system for use in an embodiment of the invention employing an attribute entry. Game environment entry 2400 contains information specific to a portion of the game environment that is rendered within a video game. In some embodiments game environment entry 2400 contains information specific to a portion of the game environment that is rendered within a video game where that portion of the game environment is to represent a portion of the real world. For example, in some embodiments a portion of the game environment is a city block, in a video game where the game environment is a representation of a city. For example, in some embodiments a portion of the game environment is an island, in a game where the game environment is a vast world with seas, mountains, and forests. Game environment entry 2400 comprises section identifier 2402, verification status 2404, data 2406, and record 2408. Section identifier 2402 indicates the portion of the game environment that game environment entry 2400 concerns (e.g., the city block, or island, in the foregoing examples, etc.). Verification status 2404 indicates the status of the section of the game environment, as it concerns the verification of the portion of the game environment as accurately representing the portion of the real world that the portion of the game environment is designed to represent. For example, status may take the values "verified", "verified", "pending verification", "unable to be verified", etc. The status of verification status 2404 may be determined using the same methods disclosed for determining the status of an attribute of a user disclosed elsewhere herein. Data 2406 is information about how the portion of the game environment should be displayed. Data 2406 may be edited by one or more player or other entity accessing the video game. Data 2406 may be edited, for example, by a user submitting a picture of the real world where the picture has time stamp with geolocation and directional information associated with it. The system may process the submitted picture and use a cross reference to determine the portion of the game environment that the picture taken in the real world corresponds to. The system then models the video game environment using the information on the submitted pictures (e.g., using matching algorithms to create 3D solid models to represent from a two dimensional picture). For example, data 2406 may take the form of an architectural design file, a solid modeling file, an image, a freehand drawing, a computer assisted drawing, a video, a photo, or otherwise. Record 2408 indicates some or all of the history of game environment entry 2400. For example, record 2408 may contain information on the user that created game environment entry 200, the time that game environment entry 2400 was created or modified, details of the modifications made to attribute entry 2400, or otherwise. Each of section identifier 2402, verification status 2404, data 2406, and record 2408 may be altered over time. Attribute 2400 may contain other elements, or less than all of the elements illustrated in FIG. 24.

Figure 25:
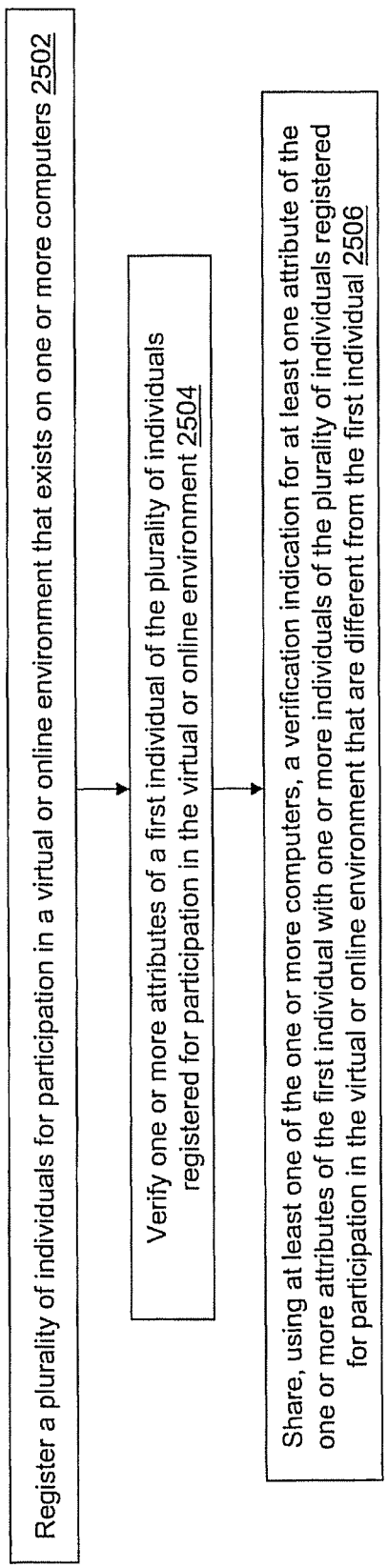
FIG. 25 is a flowchart of a method that may be used for verifying one or more attributes of an individual in a virtual or online environment.

FIG. 25 is a flowchart of a method that may be used for verifying one or more attributes of an individual in a virtual or online environment. A plurality of individuals are registered for participation in a virtual or online environment that exists on one or more computers (block 2502). As an example, such registration may be accomplished by registering the plurality of individuals to allow each individual to access a video game or online social network wherein the virtual or online environment exists. One or more attributes of a first individual of the plurality of individuals registered for participation in the virtual or online environment is verified (block 2504). For example, the verification may be accomplished after receipt and review of evidence related to the one or more attributes from one of the plurality of individuals, where that evidence is provided to a computer server associated with the virtual or online environment. As another example, the verification may be accomplished after receipt of a signal indicating verification of evidence related to the one or more attributes has been accomplished by a third party. As another example, the verification may be accomplished after receipt of one or more signal indicating evidence has been verified by one or more individuals that have received evidence indicating that the value of the one or more attributes in the real world is as presented by the value of the attribute. Such signals may be sent by each individual that performs such corroboration, where verification is achieved only after a certain occurrence is registered (e.g., a certain number of such signals is received, the ratio of the number of such signals received corroborating the evidence to the number of signals received that do not corroborate the evidence exceeds a certain threshold, the ratio of the number of individuals that send such signals corroborating the evidence to the number of individuals that were presented with the possibility of corroborating the evidence with a signal exceeds a certain threshold, etc.). As another example, the verification may be accomplished after receipt of one or more signal indicating evidence has been verified by one or more individuals that have accessed the value of the one or more attributes, indicating that the value of the one or more attributes in the real world is as presented by the value of the attribute. Such signals may be sent by each individual that performs such corroboration, where verification is achieved only after a certain occurrence is registered (e.g., a certain number of such signals is received, the ratio of the number of such signals received corroborating the evidence to the number of signals received that do not corroborate the evidence exceeds a certain threshold, the ratio of the number of individuals that send such signals corroborating the evidence to the number of individuals that were presented with the possibility of corroborating the evidence with a signal exceeds a certain threshold, etc.). Using at least one of the one or more computers, a verification indication for at least one attribute of the one or more attributes of the first individual is shared with one or more individuals of the plurality of individuals registered for participation in the virtual or online environment that are different from the first individual (block 2506). Such sharing may be accomplished, for example, by providing the verification indication to a website that can be accessed by the one or more individuals that are different from the first individual. As another example, the verification indication may be shared with the one or more individuals that are different from the first individual through text message, email, notification, instant message, etc.

Figure 26:
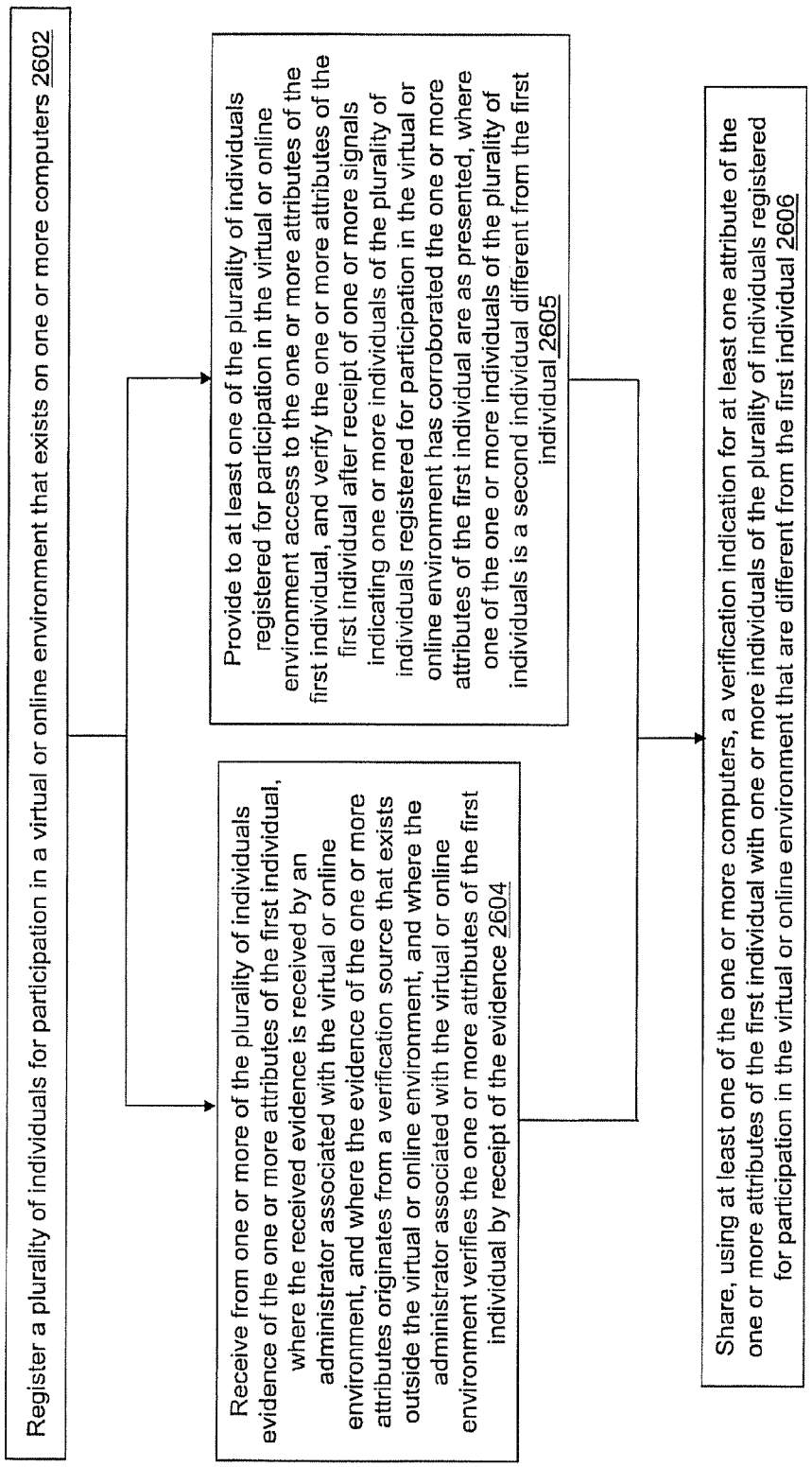
FIG. 26 is a flowchart of a method that may be used for verifying one or more attributes of an individual in a virtual or online environment.

FIG. 26 is a flowchart of a method that may be used for verifying one or more attributes of an individual in a virtual or online environment. A plurality of individuals are registered for participation in a virtual or online environment that exists on one or more computers (block 2602). Verification of one or more attributes of a first individual may occur in more than one manner. Such verification may be accomplished when evidence of the one or more attributes of the first individual is received from one or more of the plurality of individuals, where the received evidence is received by an administrator associated with the virtual or online environment, and where the evidence of the one or more attributes originates from a verification source that exists outside the virtual or online environment, and where the administrator associated with the virtual or online environment verifies the one or more attributes of the first individual by receipt of the evidence (block 2604). Such verification may also be accomplished when at least one of the plurality of individuals registered for participation in the virtual or online environment is provided access to the one or more attributes of the first individual, and the one or more attributes of the first individual are verified after receipt of one or more signals indicating one or more individuals of the plurality of individuals registered for participation in the virtual or online environment has corroborated the one or more attributes of the first individual are as presented, where one of the one or more individuals of the plurality of individuals is a second individual different from the first individual (block 2605). Using at least one of the one or more computers, a verification indication for at least one attribute of the one or more attributes of the first individual is shared with one or more individuals of the plurality of individuals registered for participation in the virtual or online environment that are different from the first individual (block 2606).

Figure 27:
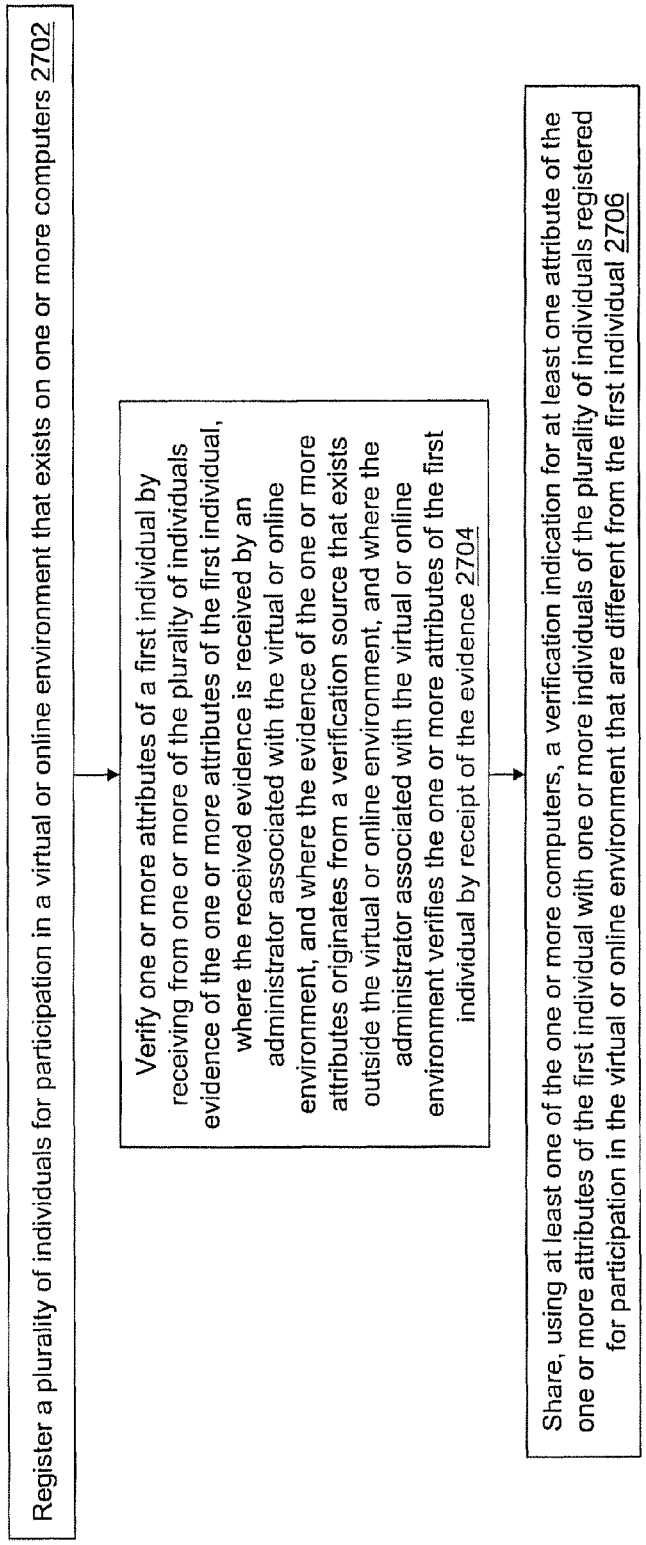
FIG. 27 is a flowchart of a method that may be used for verifying one or more attributes of an individual in a virtual or online environment.

FIG. 27 is a flowchart of a method that may be used for verifying one or more attributes of an individual in a virtual or online environment. A plurality of individuals are registered for participation in a virtual or online environment that exists on one or more computers (block 2702). Verification of one or more attributes of a first individual is accomplished when evidence of the one or more attributes of the first individual is received from one or more of the plurality of individuals, where the received evidence is received by an administrator associated with the virtual or online environment, and where the evidence of the one or more attributes originates from a verification source that exists outside the virtual or online environment, and where the administrator associated with the virtual or online environment verifies the one or more attributes of the first individual by receipt of the evidence (block 2704). Using at least one of the one or more computers, a verification indication for at least one attribute of the one or more attributes of the first individual is shared with one or more individuals of the plurality of individuals registered for participation in the virtual or online environment that are different from the first individual (block 2706).

Figure 28:
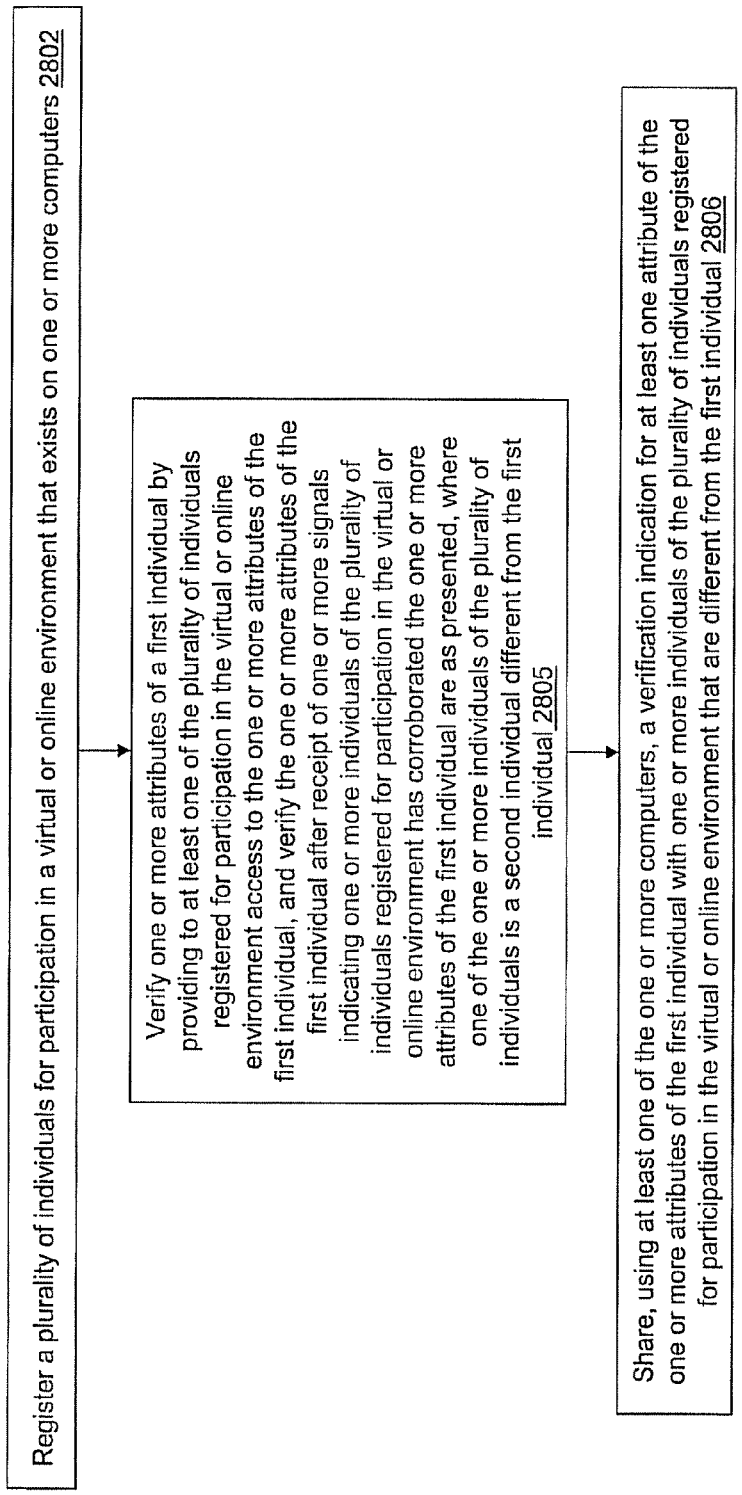
FIG. 28 is a flowchart of a method that may be used for verifying one or more attributes of an individual in a virtual or online environment.

FIG. 28 is a flowchart of a method that may be used for verifying one or more attributes of an individual in a virtual or online environment. A plurality of individuals are registered for participation in a virtual or online environment that exists on one or more computers (block 2802). Verification of one or more attributes of a first individual is accomplished when at least one of the plurality of individuals registered for participation in the virtual or online environment is provided access to the one or more attributes of the first individual, and the one or more attributes of the first individual are verified after receipt of one or more signals indicating one or more individuals of the plurality of individuals registered for participation in the virtual or online environment has corroborated the one or more attributes of the first individual are as presented, where one of the one or more individuals of the plurality of individuals is a second individual different from the first individual (block 2605). Using at least one of the one or more computers, a verification indication for at least one attribute of the one or more attributes of the first individual is shared with one or more individuals of the plurality of individuals registered for participation in the virtual or online environment that are different from the first individual (block 2606).

Example System

FIG. 23 illustrates an example computer system that may be used in embodiments. Embodiments of a system for verifying attributes of users of online systems as described herein may be executed on one or more computer systems, which may interact with various other devices. One such computer system is illustrated by FIG. 23. In different embodiments, computer system 2300 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 2300 includes one or more processors 2310 coupled to a system memory 2320 via an input/output (I/O) interface 2330. Computer system 2300 further includes a network interface 2340 coupled to I/O interface 2330, and one or more input/output devices 2350, such as cursor control device 2360, keyboard 2370, and display(s) 2380. In some embodiments, it is contemplated that embodiments may be implemented using a single instance of computer system 2300, while in other embodiments multiple such systems, or multiple nodes making up computer system 2300, may be configured to host different portions or instances of embodiments. For example, in one embodiment some elements may be implemented via one or more nodes of computer system 2300 that are distinct from those nodes implementing other elements.

In various embodiments, computer system 2300 may be a uniprocessor system including one processor 2310, or a multiprocessor system including several processors 2310 (e.g., two, four, eight, or another suitable number). Processors 2310 may be any suitable processor capable of executing instructions. For example, in various embodiments, processors 2310 may be general-purpose or embedded processors implementing any of a variety of instruction set architectures (ISAs), such as the x86, PowerPC, SPARC, or MIPS ISAs, or any other suitable ISA. In multiprocessor systems, each of processors 2310 may commonly, but not necessarily, implement the same ISA.

In some embodiments, at least one processor 2310 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2320 may be configured to store program instructions and/or data accessible by processor 2310. In various embodiments, system memory 2320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a module for electronic commerce initiated through use of video games and fulfilled by delivery of physical goods are shown stored within system memory 2320 as program instructions 2325 and data storage 2335, respectively. In other embodiments, program instructions and/or data may be received, sent or stored upon different types of computer-accessible media or on similar media separate from system memory 2320 or computer system 2300. Generally speaking, a computer-accessible medium may include storage media or memory media such as magnetic or optical media, e.g., disk or CD/DVD-ROM coupled to computer system 2300 via I/O interface 2330. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 2340.

In one embodiment, I/O interface 2330 may be configured to coordinate I/O traffic between processor 2310, system memory 2320, and any peripheral devices in the device, including network interface 2340 or other peripheral interfaces, such as input/output devices 2350. In some embodiments, I/O interface 2330 may perform any necessary protocol, timing or other data transformations to convert data signals from one component (e.g., system memory 2320) into a format suitable for use by another component (e.g., processor 2310). In some embodiments, I/O interface 2330 may include support for devices attached through various types of peripheral buses, such as a variant of the Peripheral Component Interconnect (PCI) bus standard or the Universal Serial Bus (USB) standard, for example. In some embodiments, the function of I/O interface 2330 may be split into two or more separate components, such as a north bridge and a south bridge, for example. In addition, in some embodiments some or all of the functionality of I/O interface 2330, such as an interface to system memory 2320, may be incorporated directly into processor 2310.

Network interface 2340 may be configured to allow data to be exchanged between computer system 2300 and other devices attached to a network, such as other computer systems, or between nodes of computer system 2300. In various embodiments, network interface 2340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2350 may, in some embodiments, include one or more display terminals, keyboards, keypads, touchpads, scanning devices, voice or optical recognition devices, or any other devices suitable for entering or retrieving data by one or more computer system 2300. Multiple input/output devices 2350 may be present in computer system 2300 or may be distributed on various nodes of computer system 2300. In some embodiments, similar input/output devices may be separate from computer system 2300 and may interact with one or more nodes of computer system 2300 through a wired or wireless connection, such as over network interface 2340.

As shown in FIG. 23, memory 2320 may include program instructions 2325, configured to implement embodiments of a module for electronic commerce initiated through use of video games and fulfilled by delivery of physical goods as described herein, and data storage 2335, comprising various data accessible by program instructions 2325. In one embodiment, program instructions 2325 may include software elements of embodiments of a module for electronic commerce initiated through use of video games and fulfilled by delivery of physical goods as illustrated in the above Figures. Data storage 2335 may include data that may be used in embodiments. In other embodiments, other or different software elements and data may be included.

Those skilled in the art will appreciate that computer system 2300 is merely illustrative. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, interne appliance, PDA, wireless phones, pagers, a consumer device, video game console, handheld video game device, application server, storage device, a peripheral device such as a switch, modem, router, or in general any type of computing or electronic device. Computer system 2300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2300 may be transmitted to computer system 2300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Online Identity Verification Services

Online identity verification services provide an alternative means to verify the identity of other internet users. Rather than directly transfer personal information to another internet user, with online identity verification services personal information is instead provided to an online identity verification firm. The online identity verification firm then issues or declines to issue a verification of an internet user's identity according to whether the personal information provided coincides with information found in public and/or private databases. Online identity verification services exist to establish the identity of computer users in a variety of circumstances. The price for such services may be arranged on a per-transaction basis and may vary with the importance of the identity checks. The aim of online verification services may be to reduce fraud, prevent identity theft, or otherwise verify certain attributes a person using the internet purports to have.

Online identity verification services can establish a mapping from the online identity of a user of an online social network to that user's real life identity. These identity verification services are offered by identity verification service films, and can be accessed over the internet. As explained above, some online identity verification firms implement a process that requires the user whose identity is to be verified to provide personal data. That personal data is provided to the identity verification service firm. The personal data may include the user's name, address, phone number, familial relations, etc. Using this information the firm then accesses public and/or private records for information about the person that the user purports to be, and then further prompts the user to answer questions based on these records. Such records may be found in public or private databases. According to the degree of match between the information in the records and the user's answers, the identity verification firm may issue a verification of the user's identity.

Online identity verification services also exist to allow customers to establish their identities with online merchants. This may be useful in transactions involving high price items or the opening of credit accounts. Information used to verify a customer's identity is taken from public and private records to ensure a customer's identity. Such records may be found in public or private databases.

Some online social networks encourage or require that their users have their identity verified. This is generally for the benefit of other users of the online social network. For example, online social networks offering online dating often allow their users to verify their identities. This verification may offer other users on the online social network peace of mind as to the identity of the user they are communicating with over the online social network.

Some online games have vast communities of players that communicate with one another. These communities may be based upon players who know nothing about each other in real life outside of what each player purports to be their attributes (e.g., gender, location, occupation, etc.). However, there is generally not any means of verifying the truth of the player's self-reported attributes.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

As will be appreciated by one skilled in the art, the present invention may be embodied as a system, method, or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized with the invention. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a hard disk, a portable computer diskette, a read-only memory (ROM), a random access memory (RAM), an erasable programmable read-only memory (EPROM or Flash memory), an optical fiber, a compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this specification, a computer-usable or computer-readable medium may be any medium that can contain, store, propagate, communicate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, RF, optical fiber cable, etc.

Computer program code for carrying out operations of the present invention may be written in any combination of one or more programming languages. The program code may execute entirely on a player's video game computer, partly on a player's video game computer, as a stand-alone software package, partly on a player's video game computer and partly on a remote computer (e.g., a game server) or entirely on a remote computer. In the latter scenario, the remote computer may be connected to the player's video game computer through any type of network, including a local area network (LAN) or a wide area network (WAN), or the connection may be made to an external computer (for example, through the Internet).

The present invention is described herein with reference to flowchart figures and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The computer program instructions for carrying out the functions and functionalities described herein may be assembler instructions, machine instructions, instruction-set-architecture (ISA) instructions, machine dependent instructions, microcode, firmware instructions, state-setting data, or either source code or objection oriented programming languages.

Possible object oriented programming languages may include but are not limited to C++, Objective-C, Smalltalk, Java, C#, Perl, Python, Ruby and PHP. Alternatively, the computer program instructions may be instructions of a conventional procedural programming language such as the "C" language.

In some embodiments, the computer program instructions may be executed by electronic circuitry including, for example, programmable logic circuitry, field-programmable gate arrays (FPGA), or programmable logic arrays (PLA). This may be accomplished by utilizing state information of the computer program instructions to customize the electronic circuitry to have the particular functionality of the invention as described herein.

1. Terms

Within this application, the term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

Within this application, the term "invention" and the like mean "the one or more inventions disclosed in this application," unless expressly specified otherwise.

Within this specification, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments of the disclosed invention(s)," unless expressly specified otherwise.

Within this application, a "variation" of an invention means an embodiment of the invention, unless expressly specified otherwise.

Within this application, a reference to "another embodiment" in describing an embodiment does not imply that the referenced embodiment is mutually exclusive with another embodiment (e.g., an embodiment described before the referenced embodiment), unless expressly specified otherwise.

Within this application, the terms "including," "comprising" and variations thereof mean "including but not necessarily limited to," unless expressly specified otherwise. Thus, for example, the sentence "the portfolio includes a blue widget and a red widget" means the portfolio includes the blue widget and the red widget, but may include something else.

Within this application, the terms "a," "an" and "the" mean "one or more," unless expressly specified otherwise.

Within this application, the phrase "at least one of," when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of," when such phrase modifies a plurality of things does not mean "one of" each of the plurality of things.

Within this application, the phrase "based on" does not mean "based only on," unless expressly specified otherwise. In other words, the phrase "based on" describes both "based only on" and "based at least on." The phrase "based at least on" is equivalent to the phrase "based at least in part on."

Within this application, the term "represent" and like terms are not exclusive, unless expressly specified otherwise. For example, the term "represents" does not mean "represents only," unless expressly specified otherwise. In other words, the phrase "the data represents a credit card number" describes both "the data represents only a credit card number" and "the data represents a credit card number and the data also represents something else."

Within this application, the term "e.g." and like terms mean "for example," and thus does not limit the term or phrase it explains. For example, in the sentence "the server sends data (e.g., instructions, a data structure) over the Internet," the term "e.g." explains that "instructions" are an example of "data" that the server may send over the Internet, and also explains that "a data structure" is an example of "data" that the server may send over the Internet. However, both "instructions" and "a data structure" are merely examples of "data," and other things besides "instructions" and "a data structure" can be "data."

Within this application, the term "respective" and like terms mean "taken individually." Thus if two or more things have "respective" characteristics, then each such thing has its own characteristic, and these characteristics can be different from each other but need not be. For example, the phrase "each of two computers has a respective function" means that the first such computer has a function and the second such computer has a function as well. The function of the first computer may or may not be the same as the function of the second computer.

Within this application, where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to," the mere usage of the phrase "including but not limited to" does not mean that the term "including" means something other than "including but not limited to."

Within this application, the term "determining" and grammatical variants thereof (e.g., to determine a price, determining a value, determine an object which meets a certain criterion) is used in a broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

Within this application, the term "determining" does not imply certainty or absolute precision, and therefore "determining" can include estimating, approximating, extrapolating, predicting, guessing and the like.

Within this application, the term "determining" does not imply that mathematical processing must be performed, and does not imply that numerical methods must be used, and does not imply that an algorithm or process is used.

Within this application, the term "determining" does not imply that any particular device must be used. For example, a computer need not necessarily perform the determining.

Within this application, where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Within this application, when an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget." Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

Within this application, when a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, within this application, where more than one device, article or other product is described herein (whether or not they cooperate), in another embodiment a single device or article may alternatively be used in place of the more than one device or article that is described. For example, a plurality of computer-based devices may be substituted with a single computer-based device. (Conversely, a single computer-based device may be substituted with multiple computer-based devices operating in cooperation with one another.) Accordingly, the various functionality that is described as being possessed by more than one device or article may alternatively be possessed by a single device or article.

Within this application, the functionality and/or the features of a single device that is described may, in another embodiment, be alternatively embodied by one or more other devices which are described but are not explicitly described as having such functionality or features. Thus, other embodiments need not include the described device itself, but rather can include the one or more other devices which would, in those other embodiments, have such functionality or features.

2. Disclosed Examples and Terminology are not Limiting

The title (set forth at the beginning of the first page of the specification) is not to be taken as limiting in any way as the scope of the disclosed invention(s). The title is not to be used in interpreting the meaning of any claim or to be used in limiting the scope of any claim.

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites. No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible depending on the functionality involved. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in some embodiments the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

3. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

Within this application, the term "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

Within this application, the term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In some embodiments, a server computer or centralized authority may not be necessary or desirable. For example, the present invention may, in some embodiments, be practiced on one or more devices without a central authority. In such an embodiment, any functions described herein as performed by the server computer or data described as stored on the server computer may instead be performed by or stored on one or more such devices.

Where a process is described, in some embodiments the process may operate without any user intervention. In another embodiment, the process includes some human intervention (e.g., a step is performed by or with the assistance of a human).

4. 35 U.S.C. §112(f)

In a claim, a limitation of the claim which includes the phrase "means for" or the phrase "step for" means that 35 U.S.C. §112 (f) applies to that limitation.

With respect to a means or a step for performing a specified function in accordance with 35 U.S.C. §112(f), the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112(f), structure corresponding to a specified function includes any product programmed to perform the specified function. Such structure includes programmed products which perforin the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

5. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform."

6. Incorporation by Reference

Any patent, patent application or other document referred to herein is incorporated by reference into this patent application as part of the present disclosure, but only for purposes of written description and enablement in accordance with 35 U.S.C. §112(a) and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference.

Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

7. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

What is claimed is:

1. A computer implemented method which enables the sharing of information in a virtual or online environment, comprising the steps of:
   registering a plurality of individuals for participation in a virtual or online environment that exists on one or more computers, wherein the virtual or online environment permits interactions between two or more individuals of the plurality of individuals within the virtual or online environment;
   receiving from an individual that is one of the plurality of individuals registered for participation in the virtual or online environment an indication of one or more attribute values of the individual that are authorized to be verified;
   verifying at least one of the one or more attribute values of the individual that are authorized to be verified by
      receiving evidence concerning the at least one of the one or more attribute values of the individual that are authorized to be verified, wherein
         the evidence concerning the at least one of the one or more attribute values authorized to be verified originates from a verification source that exists outside the virtual or online environment
         or wherein
         the evidence concerning the at least one of the one or more attribute values authorized to be verified originates from a verification source that is not the individual for whom the at least one of the one or more attribute values is to be verified but is one or more of the plurality of individuals registered for participation in the virtual or online environment, and thereafter
setting one or more verification indications that comprise a separate verification indication related to each of the one or more attribute values of the individual that are authorized to be verified for which evidence was received;
receiving from the individual authorization to share at least one of the one or more verification indications with at least some of the plurality of individuals; and
sharing with at least some of the plurality of individuals registered for participation in the virtual or online environment that are different from the individual
at least one attribute value related to the individual, wherein the at least one attribute value related to the individual that is shared is only from among the one or more attribute values of the individual that are authorized to be verified, and
at least one verification indication related to the at least one attribute value related to the individual that is shared, wherein the at least one verification indication related to the at least one attribute value related to the individual that is shared is only from among the at least one of the one or more verification indications that is authorized to be shared,
wherein the sharing is accomplished at least in part by using at least one of the one or more computers.

2. The computer implemented method of claim 1, wherein the verification source comprises a computer system that is not controlled by any of the plurality of individuals registered to participate in the virtual or online environment.

3. The computer implemented method of claim 1, wherein the evidence concerning the at least one of the one or more attribute values of the individual that are authorized to be verified comprises one or more images of one or more documents.

4. The computer implemented method of claim 1, wherein the virtual or online environment comprises a video game environment.

5. The computer implemented method of claim 1, wherein the one or more attribute values of the individual that are authorized to be verified includes one or more physical attribute values of the individual.

6. The computer implemented method of claim 1, wherein the one or more attribute values of the individual that are authorized to be verified includes one or more non-physical attribute values of the individual.

7. The computer implemented method of claim 1, wherein the virtual or online environment comprises an online social network.

8. The computer implemented method of claim 1, wherein the virtual or online network comprises an online dating service.

9. The computer implemented method of claim 1, wherein the one or more attribute values of the individual that are authorized to be verified are for one or more attributes from the group consisting of age, gender, height, weight, hair color, and eye color.

10. The computer implemented method of claim 6, wherein the one or more non-physical attribute values are for one or more attributes from the group consisting of geographic location, income, occupation, personal property ownership, marital status, membership in a club or organization, and affiliation with an academic institution, business, or union.

11. A computer implemented method which enables the sharing of information in a virtual or online environment, comprising the steps of:
registering a plurality of individuals for participation in a virtual or online environment that exists on one or more computers, wherein the virtual or online environment permits interactions between two or more individuals of the plurality of individuals within the virtual or online environment;
receiving from an individual that is one of the plurality of individuals registered for participation in the virtual or online environment an indication of one or more attribute values of the individual that are authorized to be verified;
verifying at least one of the one or more attribute values of the individual that are authorized to be verified by
i) receiving evidence concerning the at least one of the one or more attribute values of the individual that are authorized to be verified, wherein the evidence concerning the at least one of the one or more attribute values of the individual that are authorized to be verified originates from a verification source that exists outside the virtual or online environment, and thereafter
setting one or more verification indications that comprise a separate verification indication related to each of the one or more attribute values of the individual that are authorized to be verified for which evidence was received,
or
ii) providing to at least one of the plurality of individuals registered for participation in the virtual or online environment access to the at least one of the one or more attribute values of the individual that are authorized to be verified, and
receiving one or more signals indicating the at least one of the plurality of individuals registered for participation in the virtual or online environment has corroborated the at least one of the one or more attribute values of the individual that are authorized to be verified, wherein the at least one of the plurality of individuals is a second individual different from the individual with the one or more attribute values, and thereafter
setting one or more verification indications that comprise a separate verification indication related to each of the one or more attribute values of the individual that are authorized to be verified for which corroboration was received;
and either
A) sharing with one or more individuals of the plurality of individuals registered for participation in the virtual or online environment that are different from the individual a verification indication for at least one attribute value of the one or more attribute values of the individual that are authorized to be verified, wherein the at least one attribute value for which the verification indication is shared is only from among the one or more attributes of the individual that are authorized to be verified, wherein the sharing is accomplished at least in part by using at least one of the one or more computers, and wherein the sharing occurs
only after a fee is collected from the individual, or
only after a fee is collected from at least one individual of the plurality of individuals registered for participation in the virtual or online environment that are different from the individual, or B) preventing sharing of a verification indication for at least one attribute value of the one or more attribute values of the individual that are authorized to be verified with at least one individual of the plurality of individuals registered for participation in the virtual or online environment, wherein the preventing sharing occurs only after a fee is collected from the individual.

12. The computer implemented method of claim 11, wherein the verification source comprises a computer system that is controlled by an entity that is different from any of the plurality of individuals registered to participate in the virtual or online environment.

13. The computer implemented method of claim 11, wherein the verification indication that is shared or is prevented from being shared includes an indication of a confidence level for the at least one attribute value of the one or more attribute values of the individual.

14. The computer implemented method of claim 11, wherein the evidence concerning the at least one of the one or more attribute values of the individual comprises one or more images of one or more documents.

15. The computer implemented method of claim 11, wherein the virtual or online environment comprises a video game environment that has a video game world that is a 2-D computer-generated playing space.

16. The computer implemented method of claim 11, wherein the at least one of the one or more attribute values of the individual verified in the verifying step include one or more physical attribute values of the individual.

17. The computer implemented method of claim 11, wherein the at least one of the one or more attribute values of the individual verified in the verifying step include one or more non-physical attribute values of the individual.

18. The computer implemented method of claim 11, wherein the virtual or online environment comprises a video game environment that has a video game world that is a 3-D computer-generated playing space.

19. The computer implemented method of claim 11, wherein the virtual or online network comprises an online dating service.

20. The computer implemented method of claim 16, wherein the at least one of the one or more physical attribute values of the individual verified in the verifying step is for one or more attributes from the group consisting of age, gender, height, weight, hair color, and eye color.

21. The computer implemented method of claim 17, wherein the one or more nonphysical attribute values of the individual verified in the verifying step are for one or more attributes from the group consisting of geographic location, income, occupation, personal property ownership, marital status, membership in a club or organization, and affiliation with an academic institution, business, or union.

22. A computer implemented method which enables the sharing of information in a virtual or online environment, comprising the steps of:

registering a plurality of individuals for participation in a virtual or online environment that exists on one or more computers, wherein the virtual or online environment permits interactions between two or more individuals of the plurality of individuals within the virtual or online environment;

verifying one or more attribute values of an individual of the plurality of individuals registered for participation in the virtual or online environment by receiving evidence concerning at least one of the one or more attribute values of the individual, wherein the evidence concerning the at least one of the one or more attribute values originates from a verification source that exists outside the virtual or online environment, and wherein the verification source is not the individual, and thereafter setting one or more verification indications that comprise a separate verification indication related to each of the at least one of the one or more attribute values of the individual for which evidence was received;

receiving from the individual authorization to share at least one of the one or more verification indications with at least some of the plurality of individuals;

sharing with the at least some of the plurality of individuals registered for participation in the virtual or online environment that are different from the individual at least one verification indication related to at least one attribute value of the one or more attribute values of the individual, wherein each of the at least one verification indication that is shared is related to an attribute value of the individual that has been verified, wherein the at least one verification indication related to the at least one attribute value of the one or more attribute values of the individual that are shared are only from among the one or more verification indications that are authorized to be shared, and wherein the sharing is accomplished at least in part by using at least one of the one or more computers.

23. The computer implemented method of claim 22, wherein the verification source comprises a computer system that is controlled by an entity that is different from any of the plurality of individuals registered to participate in the virtual or online environment.

24. The computer implemented method of claim 22, wherein the evidence concerning the at least one of the one or more attribute values of the individual comprises one or more images of one or more documents.

25. The computer implemented method of claim 22, wherein the virtual or online environment comprises a video game environment that has a video game world that is a 3-D computer-generated playing space.

26. The computer implemented method of claim 22, wherein the virtual or online environment comprises an online social network.

27. A computer implemented method which enables the sharing of information in a virtual or online environment, comprising the steps of:

registering a plurality of individuals for participation in a virtual or online environment that exists on one or more computers, wherein the virtual or online environment permits interactions between two or more individuals of the plurality of individuals within the virtual or online environment;

receiving from an individual that is one of the plurality of individuals registered for participation in the virtual or online environment an indication of one or more attribute values of the individual that are authorized to be verified;

verifying at least one of the one or more attribute values of the individual that are authorized to be verified by receiving evidence concerning the at least one of the one or more attribute values of the individual that are authorized to be verified, wherein the evidence concerning the at least one of the one or more attribute values authorized to be verified originates from a verification source that exists outside the virtual or online environment or wherein the evidence concerning the at least one of the one or more attribute values authorized to be verified originates from a verification source that is not the individual for whom the at least one of the one or more attribute values is to be verified but is one or more of the plurality of individuals registered for participation in the virtual or online environment, and thereafter setting one or more verification indications that include a separate verification indication related to each of the one or more attribute values of the individual that are authorized to be verified for which evidence was received; and sharing with at least some of the plurality of individuals registered for participation in the virtual or online environment that are different from the individual at least one attribute value related to the individual, wherein the at least one attribute value related to the individual that is shared is only from among the one or more attribute values of the individual that are authorized to be verified, and wherein the sharing is accomplished at least in part by using at least one of the one or more computers.

28. The computer implemented method of claim 27, wherein the at least one of the one or more attribute values of the individual verified in the verifying step comprises one or more physical attribute values of the individual.

29. The computer implemented method of claim 27, wherein the at least one of the one or more attribute values of the individual verified in the verifying step comprises one or more non-physical attribute values of the individual.

30. The computer implemented method of claim 27, wherein the virtual or online environment comprises a video game environment.

\* \* \* \* \*